US011079596B2

(12) United States Patent
Hua et al.

(10) Patent No.: US 11,079,596 B2
(45) Date of Patent: Aug. 3, 2021

(54) 3-DIMENSIONAL ELECTRO-OPTICAL SEE-THROUGH DISPLAYS

(71) Applicant: THE ARIZONA BOARD OF REGENTS ON BEHALF OF THE UNIVERSITY OF ARIZONA, Tucson, AZ (US)

(72) Inventors: Hong Hua, Tucson, AZ (US); Sheng Liu, San Jose, CA (US)

(73) Assignee: THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 321 days.

(21) Appl. No.: 14/729,195

(22) Filed: Jun. 3, 2015

(65) Prior Publication Data

US 2016/0147067 A1   May 26, 2016

Related U.S. Application Data

(63) Continuation of application No. 12/807,868, filed on Sep. 14, 2010, now abandoned.

(60) Provisional application No. 61/276,578, filed on Sep. 14, 2009.

(51) Int. Cl.
*G02B 27/24* (2006.01)
*G02B 27/01* (2006.01)
(Continued)

(52) U.S. Cl.
CPC ....... *G02B 27/0172* (2013.01); *G02B 26/004* (2013.01); *G02B 27/017* (2013.01);
(Continued)

(58) Field of Classification Search
CPC ..... G06T 19/006; G06T 19/00; G02B 27/017; G02B 27/0172; G02B 27/2228;
(Continued)

(56) References Cited

U.S. PATENT DOCUMENTS 3,632,184 A   1/1972   King
3,992,084 A   11/1976   Nakamura
(Continued)

FOREIGN PATENT DOCUMENTS

CN   1252133 A   5/2000
CN   101359089 A   2/2009
(Continued)

OTHER PUBLICATIONS

US 9,207,443 B2, 12/2015, Cheng (withdrawn)
(Continued)

*Primary Examiner* — Stephone B Allen
*Assistant Examiner* — Jyotsna V Dabbi
(74) *Attorney, Agent, or Firm* — Niels Haun; Dann, Dorfman, Herrell & Skillman, P.C.

(57) ABSTRACT

An exemplary display is placed in an optical pathway extending from an entrance pupil of a person's eye to a real-world scene beyond the eye. The display includes at least one 2-D added-image source that is addressable to produce a light pattern corresponding to a virtual object. The source is situated to direct the light pattern toward the person's eye to superimpose the virtual object on an image of the real-world scene as perceived by the eye via the optical pathway. An active-optical element is situated between the eye and the added-image source at a location that is optically conjugate to the entrance pupil and at which the active-optical element forms an intermediate image of the light pattern from the added-image source. The active-optical element has variable optical power and is addressable to change its optical power to produce a corresponding change in perceived distance at which the intermediate image is formed, as an added image to the real-world scene, relative to the eye.

16 Claims, 27 Drawing Sheets

(51) Int. Cl.
  *G02B 30/34* (2020.01)
  *G06T 19/00* (2011.01)
  *H04N 13/322* (2018.01)
  *H04N 13/344* (2018.01)
  *H04N 13/383* (2018.01)
  *G02B 26/00* (2006.01)

(52) U.S. Cl.
  CPC ............ *G02B 30/34* (2020.01); *G06T 19/006* (2013.01); *H04N 13/322* (2018.05); *H04N 13/344* (2018.05); *H04N 13/383* (2018.05); *G02B 2027/014* (2013.01); *G02B 2027/0127* (2013.01); *G02B 2027/0132* (2013.01); *G02B 2027/0134* (2013.01); *G02B 2027/0145* (2013.01); *G02B 2027/0147* (2013.01); *G02B 2027/0187* (2013.01)

(58) Field of Classification Search
  CPC ........ G02B 26/004; G02B 2027/01127; G02B 2027/0132; G02B 2027/0134; G02B 2027/014; G02B 2027/0145; G02B 2027/0147; G02B 2027/0187; G06F 3/016; H04N 13/044; H04N 13/0484
  USPC ....... 345/633, 419, 8, 156; 348/E5.024, 169, 348/E7.085, E13.074, E13.075, E7.077, 348/143, 14.08, 159, 333.02, 47, 51, 61, 348/65; 705/14.53, 14.58, 1.1, 14.1, 705/14.25, 14.49, 14.71, 26.3, 26.61, 705/26.8, 3; 351/246, 159.39, 204, 210; 606/34, 33; 707/E17.014, E17.005, 707/E17.008, E17.019, E17.044, E17.056, 707/E17.058, 722, 748, 749, 769, 792, 707/803; 715/738, 757, 769, 716, 753, 715/760, 782, 810, 848; 359/471
  See application file for complete search history.

(56) References Cited

U.S. PATENT DOCUMENTS

| | | |
|---|---|---|
| 4,468,101 A | 8/1984 | Ellis |
| 4,669,810 A | 6/1987 | Wood |
| 4,753,522 A | 6/1988 | Nishina |
| 4,863,251 A | 9/1989 | Herloski |
| 5,109,469 A | 4/1992 | Duggan |
| 5,172,272 A | 12/1992 | Aoki |
| 5,172,275 A | 12/1992 | DeJager |
| 5,416,315 A | 5/1995 | Filipovich |
| 5,436,763 A | 7/1995 | Chen |
| 5,526,183 A | 6/1996 | Chen |
| 5,572,229 A | 11/1996 | Fisher |
| 5,621,572 A | 4/1997 | Fergason |
| 5,625,495 A | 4/1997 | Moskovich |
| 5,699,194 A | 12/1997 | Takahashi |
| 5,701,202 A | 12/1997 | Takahashi |
| 5,706,136 A | 1/1998 | Okuyama |
| 5,818,632 A | 10/1998 | Stephenson |
| 5,880,711 A | 3/1999 | Tamada |
| 5,880,888 A | 3/1999 | Schoenmakers |
| 5,917,656 A | 6/1999 | Hayakawa |
| 5,959,780 A | 9/1999 | Togino |
| 6,008,781 A | 12/1999 | Furness |
| 6,023,373 A | 2/2000 | Inoguchi et al. |
| 6,028,606 A | 2/2000 | Kolb |
| 6,034,823 A | 3/2000 | Togino |
| 6,198,577 B1 | 3/2001 | Kedar |
| 6,201,646 B1 | 3/2001 | Togino |
| 6,236,521 B1 | 5/2001 | Nanba |
| 6,239,915 B1 | 5/2001 | Takagi |
| 6,243,199 B1 | 6/2001 | Hansen |
| 6,271,972 B1 | 8/2001 | Kedar |
| 6,384,983 B1 | 5/2002 | Yamazaki |
| 6,396,639 B1 | 5/2002 | Togino |
| 6,404,561 B1 | 6/2002 | Isono |
| 6,404,562 B1 | 6/2002 | Ota |
| 6,433,376 B2 | 8/2002 | Kim |
| 6,433,760 B1 | 8/2002 | Vaissie |
| 6,493,146 B2 | 12/2002 | Inoguchi |
| 6,510,006 B1 | 1/2003 | Togino |
| 6,563,648 B2 | 5/2003 | Gleckman |
| 6,646,811 B2 | 11/2003 | Inoguchi |
| 6,653,989 B2 | 11/2003 | Nakanishi |
| 6,671,099 B2 | 12/2003 | Nagata |
| 6,731,434 B1 | 5/2004 | Hua |
| 6,829,113 B2 | 12/2004 | Togino |
| 6,963,454 B1 | 11/2005 | Martins |
| 6,999,239 B1 | 2/2006 | Martins |
| 7,152,977 B2 | 12/2006 | Ruda |
| 7,177,083 B2 | 2/2007 | Holler |
| 7,230,583 B2 | 6/2007 | Tidwell |
| 7,249,853 B2 | 7/2007 | Weller-Brophy |
| 7,336,244 B2* | 2/2008 | Suyama ............ G02B 27/2271 345/6 |
| 7,405,881 B2 | 7/2008 | Shimizu |
| 7,414,791 B2 | 8/2008 | Urakawa |
| 7,522,344 B1 | 4/2009 | Curatu |
| 8,467,133 B2 | 6/2013 | Miller |
| 8,503,087 B1 | 8/2013 | Amirparviz |
| 8,511,827 B2 | 8/2013 | Hua |
| 9,239,453 B2 | 1/2016 | Cheng |
| 9,310,591 B2 | 4/2016 | Hua |
| 9,720,232 B2 | 8/2017 | Hua |
| 9,874,760 B2 | 1/2018 | Hua |
| 2001/0009478 A1 | 7/2001 | Yamazaki |
| 2002/0015116 A1 | 2/2002 | Park |
| 2002/0060850 A1 | 5/2002 | Takeyama |
| 2002/0063913 A1 | 5/2002 | Nakamura |
| 2003/0076591 A1 | 4/2003 | Ohmori |
| 2003/0090753 A1 | 5/2003 | Takeyama |
| 2004/0136097 A1 | 7/2004 | Park |
| 2004/0164927 A1* | 8/2004 | Suyama ............ G02B 27/2271 345/32 |
| 2004/0196213 A1 | 10/2004 | Tidwell |
| 2004/0218243 A1 | 11/2004 | Yamazaki |
| 2004/0233551 A1 | 11/2004 | Takahashi |
| 2005/0036119 A1 | 2/2005 | Ruda |
| 2005/0179868 A1 | 8/2005 | Seo |
| 2005/0248849 A1 | 11/2005 | Urey |
| 2006/0028400 A1 | 2/2006 | Lapstun |
| 2006/0119951 A1 | 6/2006 | McGuire |
| 2007/0109505 A1 | 5/2007 | Kubara |
| 2007/0246641 A1 | 10/2007 | Baun |
| 2008/0036853 A1 | 2/2008 | Shestak |
| 2008/0094720 A1 | 4/2008 | Yamazaki |
| 2008/0291531 A1 | 11/2008 | Heimer |
| 2009/0115842 A1 | 5/2009 | Saito |
| 2009/0168010 A1 | 7/2009 | Vinogradov |
| 2010/0091027 A1 | 4/2010 | Oyama |
| 2010/0109977 A1 | 5/2010 | Yamazaki |
| 2010/0208372 A1 | 8/2010 | Heimer |
| 2010/0271698 A1 | 10/2010 | Kessler |
| 2010/0289970 A1 | 11/2010 | Watanabe |
| 2011/0037951 A1 | 2/2011 | Hua |
| 2011/0043644 A1 | 2/2011 | Munger |
| 2011/0075257 A1 | 3/2011 | Hua |
| 2011/0090389 A1 | 4/2011 | Saito |
| 2011/0221656 A1 | 9/2011 | Haddick et al. |
| 2012/0013988 A1 | 1/2012 | Hutchin |
| 2012/0019557 A1 | 1/2012 | Aronsson |
| 2012/0050891 A1 | 3/2012 | Seidl |
| 2012/0057129 A1 | 3/2012 | Durnell |
| 2012/0081800 A1 | 4/2012 | Cheng |
| 2012/0113092 A1 | 5/2012 | Bar-Zeev |
| 2012/0160302 A1 | 6/2012 | Citron |
| 2012/0162549 A1 | 6/2012 | Gao |
| 2012/0242697 A1 | 9/2012 | Border |
| 2013/0100524 A1 | 4/2013 | Magarill |
| 2013/0112705 A1 | 5/2013 | McGill |
| 2013/0182317 A1 | 7/2013 | Takahashi |
| 2013/0187836 A1 | 7/2013 | Cheng |
| 2013/0222896 A1 | 8/2013 | Komatsu |

(56) References Cited

U.S. PATENT DOCUMENTS

| | | |
|---|---|---|
| 2013/0258461 A1 | 10/2013 | Sato |
| 2013/0285885 A1 | 10/2013 | Nowatzyk |
| 2013/0286053 A1 | 10/2013 | Fleck |
| 2013/0300634 A1 | 11/2013 | White |
| 2013/0329304 A1 | 12/2013 | Hua |
| 2014/0009845 A1 | 1/2014 | Cheng |
| 2014/0071539 A1 | 3/2014 | Gao |
| 2014/0300869 A1 | 10/2014 | Hirsch |
| 2014/0361957 A1 | 12/2014 | Hua |
| 2015/0168802 A1 | 6/2015 | Bohn |
| 2015/0177445 A1 | 6/2015 | Takagi |
| 2015/0201176 A1 | 7/2015 | Graziosi |
| 2015/0208061 A1 | 7/2015 | Yang |
| 2015/0212321 A1 | 7/2015 | Zhao |
| 2015/0277129 A1 | 10/2015 | Hua |
| 2015/0346495 A1 | 12/2015 | Welch |
| 2015/0363978 A1 | 12/2015 | Maimone |
| 2016/0011419 A1 | 1/2016 | Gao |
| 2016/0085075 A1 | 3/2016 | Cheng |
| 2016/0239985 A1 | 8/2016 | Haddick et al. |
| 2016/0320620 A1 | 11/2016 | Maimone |
| 2017/0078652 A1 | 3/2017 | Hua |
| 2017/0102545 A1 | 4/2017 | Hua |
| 2017/0202633 A1 | 7/2017 | Liu |
| 2018/0045949 A1 | 2/2018 | Hua |

FOREIGN PATENT DOCUMENTS

| | | |
|---|---|---|
| CN | 101424788 A | 5/2009 |
| EP | 0408344 | 1/1991 |
| EP | 1102105 | 5/2001 |
| JP | H03101709 | 4/1991 |
| JP | H09218375 A | 8/1997 |
| JP | H09297282 | 11/1997 |
| JP | H1013861 | 1/1998 |
| JP | H10307263 | 11/1998 |
| JP | H11326820 A | 11/1999 |
| JP | 2000249974 | 9/2000 |
| JP | 2001013446 | 1/2001 |
| JP | 2001066543 A | 3/2001 |
| JP | 2001145127 | 5/2001 |
| JP | 2001238229 | 8/2001 |
| JP | 2002148559 | 5/2002 |
| JP | 2003241100 | 8/2003 |
| JP | 2006091333 | 4/2006 |
| JP | 2006276884 A | 10/2006 |
| JP | 2007101930 | 4/2007 |
| JP | 2010072188 | 4/2010 |
| JP | 2014505381 | 2/2014 |
| WO | 9923647 | 5/1999 |
| WO | 2004079431 A1 | 9/2004 |
| WO | 2007002694 A2 | 1/2007 |
| WO | 2007085682 | 8/2007 |
| WO | 2007002694 A3 | 12/2007 |
| WO | 2007140273 A2 | 12/2007 |
| WO | 2008089417 A2 | 7/2008 |
| WO | 2011134169 | 11/2011 |
| WO | 2012064546 | 5/2012 |
| WO | 2012118573 | 9/2012 |
| WO | 2013112705 | 8/2013 |
| WO | 2014062912 | 4/2014 |
| WO | 2015134738 | 9/2015 |
| WO | 2015134740 | 9/2015 |
| WO | 2016033317 | 3/2016 |
| WO | 2018052590 | 3/2018 |

OTHER PUBLICATIONS

US 9,213,186 B2, 12/2015, Cheng (withdrawn)
US 9,880,387 B2, 01/2018, Hua (withdrawn)
European Search Report dated Apr. 28, 2016 from EP application 13847218.8.
Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.
Akeley et al., "A Stereo Display Prototype with Multiple Focal Distances," ACM Trans. Graphics 23:804-813 (2004).
Azuma, R., et al., 'Recent advances in augmented reality', IEEE Computer Graphics App;. 21, 34-47 (2001).
Cruz-Neira et al., 'Surround-Screen Projection-Based Virtual Reality: the Design and Implementation of the CAVE,' Proceedings of the 20th Annual Conference on Computer Graphics and Interactive Techniques pp. 135-142, ACM SIGGRAPH, ACM Press (1993).
Davis et al., "Accommodation to Large Disparity Stereograms," Journal of AAPOS 6:377-384 (2002).
Downing et al., "A Three-Color, Solid-State, Three-Dimensional Display," Science 273:1185-1189 (1996).
Edgar et al., "Visual Accommodation Problems with Head-Up and Helmet-Mounted Displays?," Displays 15:68-75 (1994).
Favalora et al., "100 Million-Voxel Volumetric Display," Proc. SPIE 4712:300-312 (2002).
Graham-Rowe, "Liquid Lenses Make a Splash," Nature-Photonics pp. 2-4 (2006).
Heanue et al., "Volume Holographic Storage and Retrieval of Digital Data," Science 265:749-752 (1994).
Hua, "Merging the Worlds of Atoms and Bits: Augmented Virtual Environments," Optics and Photonics News 17:26-33 (2006).
Hua et al., 'Design of a Bright Polarized Head-Mounted Projection Display' Applied Optics 46:2600-2610 (2007).
Inoue et al., "Accommodative Responses to Stereoscopic Three-Dimensional Display," Applied Optics, 36:4509-4515 (1997).
Kuiper et al., "Variable-Focus Liquid Lens for Miniature Cameras," Applied Physics Letters 85:1128-1130 (2004).
Kuribayashi, et al., "A Method for Reproducing Apparent Continuous Depth in a Stereoscopic Display Using "Depth-Fused 3D" Technology" Journal of the Society for Information Display 14:493-498 (2006).
Liu et al., "An Optical See-Through head Mounted Display with Addressable Focal Planes," IEEE Computer Society, pp. 33-42 (2008).
Liu et al., "Time-Multiplexed Dual-Focal Plane Head-Mounted Display with a Liquid Lens," Optics Letters 34:1642-1644 (2009).
Liu et al., 'A Novel Prototype for an Optical See-Through Head-Mounted Display with Addressable Focus Cues,' IEEE Transactions on Visualization and Computer Graphics 16:381-393 (2010).
Liu et al., "A Systematic Method for Designing Depth-Fused Multi-Focal Plane Three-Dimensional Displays," Optics Express 18:11562-11573 (2010).
McQuaide et al., "A Retinal Scanning Display System That Produces Multiple Focal Planes with a Deformable Membrane Mirror," Displays 24:65-72 (2003).
Mon-Williams et al., "Binocular Vision in a Virtual World: Visual Deficits Following the Wearing of a Head-Mounted Display," Ophthalmic Physiol. Opt. 13:387-391 (1993).
"OLED-XL Microdisplays," eMagin 5 pages (2010).
Optical Research Associates, http://www.opticalres.com, 2 pages (obtained Jan. 26, 2011).
Rolland et al., "Multifocal Planes Head-Mounted Displays," Applied Optics 39:3209-3215 (2000).
Schowengerdt et al., "True 3-D Scanned Voxel Displays Using Single or Multiple Light Sources," J. Soc. Info. Display 14:135-143 (2006).
Sheedy et al., "Performance and Comfort on Near-Eye Computer Displays," Optometry and Vision Science 79:306-312 (2002).
Shibata et al., "Stereoscopic 3-D Display with Optical Correction for the Reduction of the Discrepancy Between Accommodation and Convergence," Journal of the Society for Information Display 13:665-671 (2005).
Shiwa et al., "Proposal for a 3-D Display with Accommodative Compensation: 3DDAC," Journal of the Society for Information Display 4:255-261 (1996).
Sullivan, "A Solid-State Multi-Planar Volumetric Display," SID Symposium Digest of Technical Papers 34:354-356 (2003).

(56) References Cited

OTHER PUBLICATIONS

Varioptic, "Video Auto Focus and Optical Image Stabilization," http://vvww.varioptic.com/en/home.html, 2 pages (2008).
Wann et al., Natural Problems for Stereoscopic Depth Perception in Virtual Environments, Vision Res. 35:2731-2736 (1995).
Watt et al., "Focus Cues Affect Perceived Depth," J Vision 5:834-862 (2005).
Love et al. (High Speed switchable lens enables the development of a volumetric stereoscopic display. Aug. 2009, Optics Express. vol. 17, No. 18, pp. 15716-15725.).
Hidenori Kuriyabashi, Munekazu Date, Shiro Suyama, Toyohiko HatadaJ. of the SID 14/5, 2006 pp. 493-498.
H. Hua, C. Gao, F. Biocca, and J. P. Rolland, "An ultra-light and compact design and implementation of head-mounted projective displays," in Proceedings of IEEE VR 2001, pp. 175-182.
'Fresnel Lenses' downloaded from http://www.fresneltech.com on Jun. 8, 2011. Copyright Fresnel Technologies, Inc., 2003.
Bajura, M., et al., "Merging virtual objects with the real world: seeing ultrasound imagery within the patient" in Proceedings of ACM SIGGRAPH (ACM, Chicago, 1992), pp. 203-210.
Biocca, et al., "Virtual eyes can rearrange your body: adapting to visual displacement in see-through, head-mounted displays", Presence: Teleoperators and Virtual Environments 7, 262-277 (1998).
Bunkenburg, J. 'Innovative Diffractive Eyepiece for Helmet-Mounted Display.' SPIE vol. 3430. pp. 41-49 Jul. 1998.
C. Curatu, H. Hua, and J. P. Rolland, "Projection-based headmounted display with eye-tracking capabilities," Proc. SPIE 5875, 587050J (2005).
Cakmakci, O., et al., 'Head-Worn Displays: A Review'. Journal of Display Technology, vol. 2, No. 3, Sep. 2006, pp. 199-216.
Caudell, T., et al., "Augmented reality: an application of heads-up display technology to manual manufacturing processes" in Proceedings of Hawaii International Conferences on Systems Sciences (Hawaii, 1992), pp. 659-669.
Examination Report dated Apr. 29, 2011 from corresponding GB Application No. GB1012165.5.
H. Hua, C. Gao, and J. P. Rolland, 'Study of the Imaging properties of retroreflective materials used in head-mounted projective displays (HMPDs),' Proc. SPIE4711, 194-201 (2002).
H. Hua, L. Brown, and C. Gao, "A new collaborative infrastructure: SCAPE," in Proceedings of IEEE VR 2003 (IEEE, 2003), pp. 171-179.
H. Hua, L. Brown, and C. Gao, "SCAPE: supporting stereoscopic collaboration in augmented and projective environments," IEEE Comput. Graphics Appl. 24, 66-75 (2004).
H. Hua, L. Brown, and C. Gao, "System and interface framework for SCAPE as a collaborative infrastructure," Presence: Teleoperators and Virtual Environments 13, 234-250 (2004).
H. Hua, Y. Ha, and J. P. Rolland, 'Design of an ultra-light and compact projection lens,' Appl. Opt. 42, 1-12 (2003), pp. 97-107.
H. Hua., A. Girardot, C. Gao. J. P. Rolland. 'Engineering of head-mounted projective displays'. Applied Optics. 39 (22), pp. 3814-3824. (2000).
H. Hua and C. Gao, "A polarized head-mounted projective display," in Proceedings of IEEE and ACM International Symposium on Mixed and Augmented Reality 2005 (IEEE, 2005), pp. 32-35.
Hua et al, "Compact eyetracked optical see-through head-mounted display", Proc. SPIE 8288, Stereoscopic Displays and Applications XXIII, 82881F (Feb. 9, 2012).
International Search Report dated Feb. 10, 2011 from PCT/CN2010/072376.
International Search Report dated Jun. 18, 2010 in corresponding international application PCT/US2010/031799.
International Search Report dated Mar. 9, 2009 with regard to International Patent Application No. PCT/US2009/031606.
J. E. Melzer's: 'Overcoming the field-of-view/resolution invariant in head-mounted displays' Proc. SPIE vol. 3362, 1998, p. 284.
J. L. Pezzaniti and R. A. Chipman, "Angular dependence of polarizing beam-splitter cubes," Appl. Opt. 33, 1916-1929 (1994).

J. P. Rolland, F. Biocca, F. Hamza-Lup, Y. Ha, and R. Martins, "Development of head-mounted projection displays for distributed, collaborative, augmented reality applications," Presence: Teleoperators and Virtual Environments 14, 528-549 (2005).
J. P. Rolland and Hong Hua. "Head-mounted display systems," in Encyclopedia of Optical Engineering. R. Barry Johnson and Ronald O. Driggers, Eds, (2005).
Jisoo Hong, et al., "Three-dimensional display technologies of recent interest: Principles, Status, and Issues," Applied Optics (Dec. 1, 2011) 50(34):106.
Krueerke, Daniel, "Speed May Give Ferroelectric LCOS Edge in Projection Race," Display Devices Fall '05. Copyright 2005 Dempa Publications, Inc. pp. 29-31.
L. Brown and H. Hua, "Magic lenses for augmented virtual environments," IEEE Comput. Graphics Appl. 26, 64-73 (2006).
L. Davis, J. P. Rolland, F. Hamza-Lup, Y. Ha, J. Norfleet, and C. Imielinska, 'Enabling a continuum of virtual environment experiences,' IEEE Comput. Graphics Appl. 23, pp. 10-12 Mar./Apr. 2003.
L. G. Brown's: 'Applications of the Sensics panoramic HMD' SID Symposium Digest vol. 39, 2008, p. 77.
M. Gutin: 'Automated design and fabrication of ocular optics' Proc. SPIE 2008, p. 7060.
M. Inami, N. Kawakami, and S. Tachi, 'Optical camouflage using retro-reflective projection technology,' in Proceedings of ISMAR 2003 {ISMAR, 2003).
M. Inami, N. Kawakami, D. Sekiguchi, Y. Yanagida, T. Maeda, and S. Tachi, "Visuo-haptic display using head-mounted projector," in Proceedings of IEEE Virtual Reality 2000, pp. 233-240.
M. Robinson. J. Chen, and G. Sharp, Polarization Engineering for LCD Projection. John Wiley & Sons, Ltd. England, 2005.
N. Kawakami, M. Inami, D. Sekiguchi, Y. Yangagida, T. Maeda, and S. Tachi, 'Object-oriented displays: a new type of display systemsfrom immersive display to object-oriented displays,' in Proceedings of IEEE SMC 1999, IEEE International Conference on Systems, Man, and Cybernetics, vol. 5, pp. 1066-1069.
R. Azuma, A Survey of Augmented Reality in Presence; Teleoperators and Virtual Environments 6. 4, 355-385, (1997).
R. Kijima, K. Haza, Y. Tada, and T. Ojika, "Distributed display approach using PHMD with infrared camera," in Proceedings of IEEE 2002 Virtual Reality Annual International Symposium (IEEE, 2002), pp. 1-8.
R. Kijima and T. Ojika, "Transition between virtual environment and workstation environment with projective headmounted display," in Proceedings of IEEE VR 1997 (IEEE, 1997), pp. 130-137.
R. Martins, V. Shaoulov, Y. Ha, and J. P. Rolland, "Projection based head-mounted displays for wearable computers," Proc. SPIE 5442, 104-110 (2004).
R. N. Berry, L. A. Riggs, and C. P. Duncan, "The relation of vernier and depth discriminations to field brightness," J. Exp. Psychol. 40, 349-354 (1950).
Rolland, J.P., et al., 'Optical versus video see-through head mounted displays in medical visualization', Presence Teleoperators and Virtual Environments 9, 287-309 (2000).
Winterbottom, M., et al., 'Helmet-Mounted Displays for use in Air Force Training and Simulation', Human Effectiveness Directorate, Nov. 2005, pp. 1-54.
Written Opinion dated Feb. 10, 2011 from PCT/CN2010/072376.
Written Opinion dated Jun. 18, 2010 in corresponding international application PCT/US2010/031799.
Written Opinion of the International Searching Authority dated Mar. 9, 2009 with regard to International Patent Application No. PCT/US2009/031606.
Y. Ha, H. Hua, R. Martins, and J. P. Rolland, "Design of a wearable wide-angle projection color display," in Proceedings of International Optical Design Conference 2002 (IODC, 2002), pp. 67-73.
Yamazaki et al, "Thin wide-field-of-view HMD with free-form-surface prism and applications", Proc. SPIE 3639, Stereoscopic Displays and Virtual Reality Systems VI, 453 (May 24, 1999).
Zhang, R., "8.3: Design of a Compact Light Engine for FLCOS Microdisplays in a p-HMPD system", Society for Information Display 2008 International Symposium, Seminar and Exhibition (SID2008), Los Angeles, CA, May 2008.

(56) References Cited

OTHER PUBLICATIONS

Zhang, R., et al., "Design of a Polarized Head-Mounted Projection Display Using Ferroelectric Liquid-Crystal-on-Silicon Microdisplays", Applied Optics, vol. 47, No. 15, May 20, 2008, pp. 2888-2896.
Zhang, R., et al., "Design of a Polarized Head-Mounted Projection Display using FLCOS Microdisplays", Proc. of SPIE vol. 6489, 64890B-1. (2007).
A. T. Duchowski, "Incorporating the viewer's Point-Of-Regard (POR) in gaze-contingent virtual environments", SPIE—Int. Soc. Opt. Eng. Proceedings of Spie—the International Society for Optical Engineering, vol. 3295, 1998, pp. 332-343.
T. Ando, K. Yamasaki, M. Okamoto, and E. Shimizu, "Head Mounted Display using holographic optical element," Proc. SPIE, vol. 3293, 183 (1998).
Curatu, C., J.P. Rolland, and Hong Hua, "Dual purpose lens for an eye-tracked projection head-mounted display," Proceedings of International Optical Design Conference, Vancouver, Canada, Jun. 2006.
D. Cheng, Y. Wang, H. Hua, and M. M. Talha, "Design of an optical see-through head-mounted display with a low f-number and large field of view using a freeform prism," Appl. Opt., 48(14):2655-2668, 2009.
D. Cheng, Y. Wang, H. Hua, J. Sasian, "Design of a wide-angle, lightweight head-mounted display using free-form optics tiling," Opt. Lett., 36(11):2098-100, 2011.
J. G. Droessler, D. J. Rotier, "Tilted cat helmet-mounted display," Opt. Eng., vol. 29, 849 (1990).
Duchowski, A., "Eyetracking Methodology: theory and practice," Publisher: Springer, 2003.
Duchowski, A.T., and A. Coltekin, "Foveated gaze-contingent displays for peripheral LOD management, 3D visualization, and stereo imaging," ACM Trans. on Mult. Comp., Comm., and App. 3, 1-21, (2007).
P. Gabbur, H. Hua, and K. Barnard, 'A fast connected components labeling algorithm for real-time pupil detection,' Mach. Vision Appl., 21(5):779-787, 2010.
Geisler, W.S., J.S. Perry and J. Najemnik, "Visual search: The role of peripheral information measured using gaze-contingent displays," J. Vision 6, 858-873 (2006).
H. Hoshi, N. Taniguchi, H. Morishima, T. Akiyama, S. Yamazaki and A. Okuyama, "Off-axial HMD optical system consisting of aspherical surfaces without rotational symmetry," SPIE vol. 2653, 234 (1996).
Hua, H. "Integration of eye tracking capability into optical see-through head-mounted displays," Proceedings of SPIE (Electronic Imaging 2001), pp. 496-503, Jan. 2001.
H. Hua, C. Pansing, and J.P. Rolland, "Modeling of an eye-imaging system for optimizing illumination schemes in an eye-tracked head-mounted display," Appl. Opt., 46(31):7757-75, Oct. 2007.
H. Hua, P. Krishnaswamy, and J.P. Rolland, 'Video-based eyetracking methods and algorithms in head-mounted displays,' Opt. Express, 14(10):4328-50, May 2006.
Hua, H., C. Pansing, and J. P. Rolland, "Modeling of an eye-imaging system for optimizing illumination schemes in an eye-tracked head-mounted display," Applied Optics, 46(32): Nov. 1-14, 2007.
J. P. Rolland, "Wide-angle, off-axis, see-through head-mounted display," Opt. Eng., vol. 39, 1760 (2000).
K. Iwamoto, K. Tanie, T. T. Maeda, "A head-mounted eye movement tracking display and its image display method", Systems & Computers in Japan, vol. 28, No. 7, Jun. 30, 1997, pp. 89-99. Publisher: Scripta Technica, USA.
K. Iwamoto, S. Katsumata, K. Tanie, "An eye movement tracking type head mounted display for virtual reality system:—evaluation experiments of a prototype system" Proceedings of 1994 IEEE International Conference on Systems, Man, and Cybernetics. Humans, Information and Technology (Cat. No. 94CH3571-5). IEEE. Part vol. 1, 1994, pp. 13-18 vol. 1. New York, NY, USA.
Laurence R. Young, David Sheena, "Survey of eye movement recording methods", Behavior Research Methods & Instrumentation, 7(5), 397-429, 1975.

Loschky, L.C. and Wolverton, G.S., "How late can you update gaze-contingent multiresolutional displays without detection?" ACM Trans. Mult. Comp. Comm. and App. 3, Nov. 2007.
M. D. Missig and G. M. Morris, "Diffractive optics applied to eyepiece design," Appl. Opt. 34, 2452-2461 (1995).
M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.
O. Cakmakci, B. Moore, H. Foroosh, and J. P. Rolland, "Optimal local shape description for rotationally non-symmetric optical surface design and analysis," Opt. Express 16, 1583-1589 (2008).
R.J. Jacob, "The use of eye movements in human-computer interaction techniques: what you look at is what you get", ACM Transactions on Information Systems, 9(2), 152-69, 1991.
Reingold, E.M., L.C. Loschky, G.W. McConkie and D.M. Stampe, "Gaze-contingent multiresolutional displays: An integrative review," Hum. Factors 45, 307-328 (2003).
Rolland, J. P., A. Yoshida, L. D. Davis and J. H. Reif, "High-resolution inset head-mounted display," Appl. Opt. 37, 4183-93 (1998).
Wartenberg, Philipp, "EyeCatcher, the Bi-directional OLED Microdisplay," Proc. of SID 2011.
GB Examination Report corresponding to GB 1012165.5 dated Jun. 28, 2011.
International Search Report dated Jan. 29, 2014 in corresponding international application PCT/US2013/065422.
Xinda Hu and Hong Hua, "High-resolution optical see-through multi-focal-plane head-mounted display using freeform optics," Optics Express,22(11): 13896-13903, Jun. 2014.
Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).
S. Hong, J. Jang, and B. Javidi," Three-dimensional volumetric object reconstruction using computational integral imaging," Journal of Optics Express, on-line Journal of the Optical Society of America, vol. 12, No. 3, pp. 483-491, Feb. 9, 2004.
R. Schulein, M. DaneshPanah, and B. Javidi, "3D imaging with axially distributed sensing," Journal of Optics Letters, vol. 34, Issue 13, pp. 2012-2014, Jul. 1, 2009.
S. Kishk and B. Javidi, "Improved Resolution 3D Object Sensing and Recognition using time multiplexed Computational Integral Imaging," Optics Express, on-line Journal of the Optical Society of America, vol. 11, No. 26, pp. 3528-3541, Dec. 29, 2003.
R. Schulein, C. Do, and B. Javidi, "Distortion-tolerant 3D recognition of underwater objects using neural networks," Journal of Optical Society of America A, vol. 27, No. 3, pp. 461-468, Mar. 2010.
C. Manh Do, R. Martinez-Cuenca, and B. Javidi, "Three-dimensional object-distortion-tolerant recognition for integral imaging using independent component analysis," Journal of Optical Society of America A 26, issue 2, pp. 245-251 (Feb. 1, 2009).
S. Hong and B. Javidi, "Distortion-tolerant 3D recognition of occluded objects using computational integral imaging," Journal of Optics Express, vol. 14, Issue 25, pp. 12085-12095, Dec. 11, 2006.
Christopher M. Bishop, Neural Networks for Pattern Recognition, Oxford University Press, Inc. New York, NY 1995.
M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.
Yano, S., Emoto, M., Mitsuhashi, T., and Thwaites, H., "A study of visual fatigue and visual comfort for 3D HDTV/HDTV images," Displays, 23(4), pp. 191-201, 2002.
D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).
C. B. Burckhardt, "Optimum parameters and resolution limitation of integral photography," J. Opt. Soc. Am. 58, 71-76 (1968).
T. Okoshi, "Optimum design and depth resolution of lens-sheet and projection-type three-dimensional displays," Appl. Opt. 10, 2284-2291 (1971).

(56) References Cited

OTHER PUBLICATIONS

F. Okano, H. Hoshino, J. Arai y l. Yuyama, "Real-time pickup method for a three-dimensional image based on integral photography," Appl. Opt. 36, 1598-1603 (1997).
J. Aran, "Depth-control method for integral imaging," Optics Letters, 33(3): 279-282, 2008.
H. Hua, "Sunglass-like displays become a reality with freeform optical technology," SPIE Newsroom, 2012.
H. Hua, X. Hu, and C. Gao, "A high-resolution optical see-through head-mounted display with eyetracking capability," Optics Express, Nov. 2013.
D. Cheng, Y.Wang, H. Hua, and M. M. Talha, Design of an optical see-through headmounted display with a low f-number and large field of view using a free-form prism, App. Opt. 48 (14), pp. 2655-2668, 2009.
A. Jones, I. McDowall, Yamada H., M. Bolas, P. Debevec, Rendering for an Interactive 360° Light Field Display ACM Transactions on Graphics (TOG)—Proceedings of ACM SIGGRAPH 2007, 26(3), 2007.
Tibor Balogh, "The HoloVizio System," Proceedings of SPIE, VOI 6055, 2006.
Y. Takaki, Y. Urano, S. Kashiwada, H. Ando, and K. Nakamura, "Super multi-view winshield display for long-distance image information presentation," Opt. Express, 19, 704-16, 2011.
Blundell, B. G., and Schwarz, A. J., "The classification of volumetric display systems: characteristics and predictability of the image space," IEEE Transaction on Visualization and Computer Graphics, 8 (1), pp. 66-75, 2002.
Schowengerdt, B. T., and Seibel, E. J., "True 3-D scanned voxel displays using single or multiple light sources," Journal of SID, 14(2), pp. 135-143, 2006.
X. Hu and H. Hua, "Design and assessment of a depth-fused multi-focal-plane display prototype," Journal of Display Technology, Dec. 2013.
Suyama, S., Ohtsuka, S., Takada, H., Uehira, K., and Sakai, S., "Apparent 3D image perceived from luminance-modulated two 2D images displayed at different depths," Vision Research, 44: 785-793, 2004.
J. Hong, S. Min, and B. Lee, "Integral floating display systems for augmented reality," Applixed Optics, 51(18):4201-9, 2012.
A. Malmone, and H. Fuchs, "Computational augmented reality eyeglasses," Proc. of ISMAR 2012.
H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.
M. Martinez-Corral, H. Navarro, R. Martínez-Cuenca, G. Saavedra, and B. Javidi, "Full parallax 3-D TV with programmable display parameters," Opt. Phot. News 22, 50-50 (2011).
J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).
Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.
Xiao Xiao, Bahram Javidi, Manuel Martinez-Corral, and Adrian Stern , "Advances in Three-Dimensional Integral Imaging: Sensing, Display, and Applications," Applied Optics, 52(4):. 546-560,2013.
J. S. Jang, F. Jin, and B. Javidi, "Three-dimensional integral imaging with large depth of focus by use of real and virtual image fields," Opt. Lett. 28:1421-23, 2003.
S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.
M. Lucente, "Interactive three-dimensional holographic displays: seeing the future in depth," Computer Graphics, 31(2), pp. 63-67, 1997.

P. A. Blanche, et al, "Holographic three-dimensional telepresence using large-area photorefractive polymer" , Nature, 468, 80-83, Nov. 2010.
G. Wetzstein et al., "Tensor Displays: Compressive light field synthesis using multilayer displays with directional backlighting," ACM Transactions on Graphics, 31(4), 2012.
J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.
R. Martinez-Cuenca, H. Navarro, G. Saavedra, B. Javidi, and M. Martinez-Corral, "Enhanced viewing-angle integral imaging by multiple-axis telecentric relay system," Optics Express, vol. 15, Issue 24, pp. 16255-16260, Nov. 21, 2007.
A. Castro, Y. Frauel, and B. Javidi, "Integral imaging with large depth of field using an asymmetric phase mask," Journal of Optics Express, vol. 15, Issue 16, pp. 10266-10273 (Aug. 2007).
S. Feiner, 2002, "Augmented reality: A new way of seeing," Scientific American, No. 54, 2002.
K. Ukai and P.A. Howardth, "Visual fatigue caused by viewing stereoscopic motion images: background, theories, and observations," Displays, 29(2), pp. 106-116, 2008.
B. T. Schowengerdt, M. Murari, E. J. Seibel, "Volumetric display using scanned fiber array," SID Symposium Digest of Technical Papers, 2010.
H. Hua and B. Javidi, "A 3D integral imaging optical see-through head-mounted display", Optics Express, 22(11): 13484-13491, 2014.
W. Song, Y. Wang. D. Cheng, Y. Liu, "Light field head-mounted display with correct focus cue using micro structure array," Chinese Optics Letters, 12(6): 060010, 2014.
T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.
Hu, X., Development of the Depth-Fused Multi-Focal Plane Display Technology, Ph.D. Dissertation, College of Optical Sciences, University of Arizona, 2014.
S. Ravikumar, K. Akeley, and M. S. Banks, "Creating effective focus cues in multi-plane 3D displays," Opt. Express 19, 20940-20952, 2011.
X. Hu and H. Hua, "Design and tolerance of a free-form optical system for an optical see-hrough multi-focal-plane display," Applied Optics, 54(33): 9990-9, 2015.
Hu and Hua, "Design and tolerance of a freeform optical system for an optical see-through multi-focal plane display," Applied Optics, 2015.
A. Yabe, "Representation of freeform surface suitable for optimization," Applied Optics, 2012.
Armitage, David, Ian Underwood, and Shin-Tson Wu. Introduction to Microdisplays. Chichester, England: Wiley, 2006.
Hoshi, et al, "Off-axial HMD optical system consisting of aspherical surfaces without rotational symmetry," Proc. SPIE 2653, Stereoscopic Displays and Virtual Reality Systems III, 234 (Apr. 10, 1996).
International Search Report and Written Opinion dated Nov. 24, 2015 in corresponding PCT application PCT/US2015/047163.
Xin et al., "Design of Secondary Optics for IRED in active night vision systems," Jan. 10, 2013, vol. 21, No. 1, Optics Express, pp. 1113-1120.
S. Nikzad, Q. Yu, A. L. Smith, T. J. Jones, T. A. Tombrello, S. T. Elliott, "Direct detection and imaging of low-energy electrons with delta-doped charge-coupled devices," Applied Physics Letters, vol. 73, p. 3417, 1998.
European Search Report dated Aug. 14, 2015 in corresponding EP application No. 13740989.2.
Dewen Cheng et al.; "Large field-of-view and high resolution free-form head-mounted display"; SPIE-OSA/ vol. 7652 Jun. 2018.
Huang et al., "An integral-imaging-based head-mounted light field display using a tunable lens ,;1nd aperture array." Journal of the Society for Information Display Mar. 1, 2017; p. 199-201.
G. Lippmann, "Epreuves reversibles donnant la sensation du relief," Journal of Physics (Paris) 7, 821-825 (1908).

(56) References Cited

OTHER PUBLICATIONS

Cheol-Joong Kim et al, "Depth plane adaptive integral imaging using a varifocal liquid lens array", Applied Optics, OSA, vol. 54, No. 10, Apr. 1, 2015 (Apr. 1, 2015), pp. 2565-2571.

Xin Shen et al: "Large depth of focus dynamic micro integral imaging for optical see-through augmented reality display using a focus-tunable lens", Applied Optics, vol. 57, No. 7, Mar. 1, 2018 (Mar. 1, 2018), p. B184.

Martinez-Cuenca R et al: "Progress in 3-D Multiperspective Display by Integral Imaging", Proceedings of the IEEE, IEEE. New York, us, vol. 97, No. 6, Jun. 1, 2009 (Jun. 1, 2009), pp. 1067-1077.

Kim Cheoljoong et al: "Depth-enhanced integral imaging display system with time-multiplexed depth planes using a varifocal liquid lens array", Proceedings of SPIE, IEEE, US, vol. 9385, Mar. 11, 2015 (Mar. 11, 2015), pp. 93850D-93850D.

Huan Deng et al: "The Realization of Computer Generated Integral Imaging Based on Two Step Pickup Method", Photonics and Optoelectronic (SOPO), 2010 Symposium on, IEEE, Piscataway, NJ, USA, Jun. 19, 2010 (Jun. 19, 2010), pp. 1-3.

B. Liu, X. Sang, X. Yu, X. Gao, L. Liu, C. Gao, P. Wang, Y. Le, and J. Du, "Time-multiplexed light field display with 120-degree wide viewing angle". Opt. Express 27(24), pp. 35728-35739 (2019).

D. Lanman and D. Luebke, "Near-eye light field displays," ACM Trans. Graph. 32(6), 1-10 (2013).

G. E. Favalora, "Volumetric 3D displays and application infrastructure," Computer, 38(8), 37-44 (2005).

G. Li, D. Lee, Y. Jeong, J. Cho, and B. Lee, "Holographic display for see-through augmented reality using mirror-lens holographic optical element," Opt. Letters 41(11), 2486-2489 (2016).

H. Hua, "Enabling focus cues in head-mounted displays," Proceedings of the IEEE 105(5), 805-824 (2017).

H. Huang and H. Hua, "Generalized methods and strategies for modeling and optimizing the optics of 3D head-mounted light field displays," Opt. Express 27(18), 25154-25171 (2019).

H. Huang and H. Hua, "High-performance integral-imaging-based light field augmented reality display using freeform optics," Opt. Express 26(13), 17578-17590 (2018).

H. Huang and H. Hua, "Systematic characterization and optimization of 3D light field displays," Opt. Express 25(16), 18508-18525 (2017).

H. Yu, K. Lee, J. Park, and Y. Park, "Ultrahigh-definition dynamic 3D holographic display by active control of volume speckle fields," Nature Photonics 11(3), 186 (2017).

J. H. Park, S. W. Min, S. Jung, and B. Lee. "Analysis of viewing parameters for two display methods based on integral photography." Applied Optics 40, No. 29 5217-5232 (2001).

Jason Geng: "Three-dimensional display technologies", Advances in Optics and Photonics, vol. 5, No. 4, Nov. 22, 2013 (Nov. 22, 2013), pp. 456-535.

M. Xu and H. Hua, "Finite-depth and varifocal head-mounted display based on geometrical lightguide," Opt. Express 28(8), 12121-12137 (2020).

S. B. Kim and J. H. Park, "Optical see-through Maxwellian near-to-eye display with an enlarged eyebox," Opt. Letters 43(4), 767-770 (2018).

X. Wang, and H. Hua. "Digitally Switchable Micro Lens Array for Integral Imaging." SID Symposium Digest of Technical Papers. vol. 51. No. 1. (2020).

X. Wang, Y. Qin, H. Hua, Y. H. Lee, and S. T. Wu. "Digitally switchable multi-focal lens using freeform optics." Opt. Express 16;26(8):11007-17(2018).

* cited by examiner

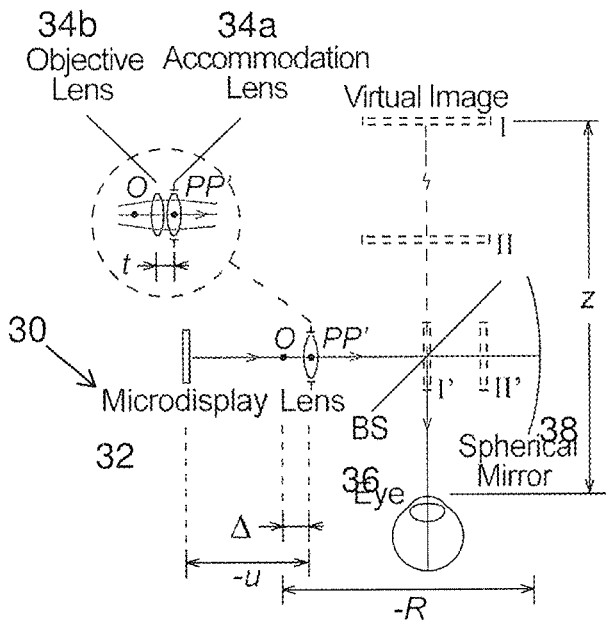
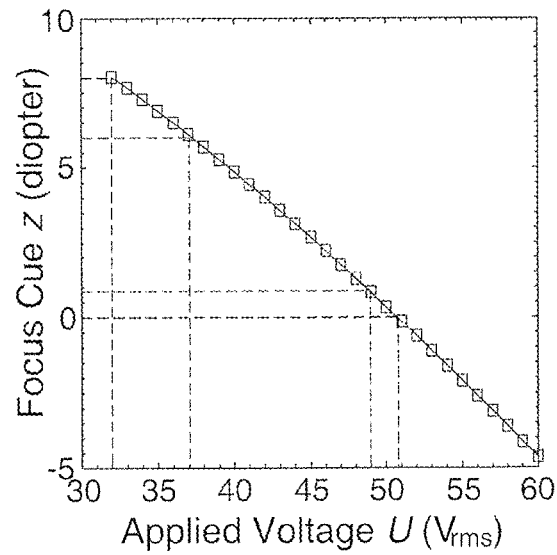
FIG. 9(a)  FIG. 9(b)
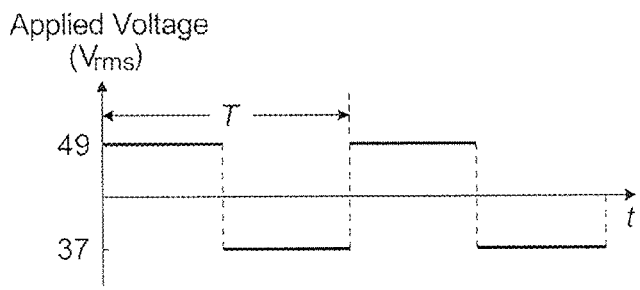
FIG. 10(a)
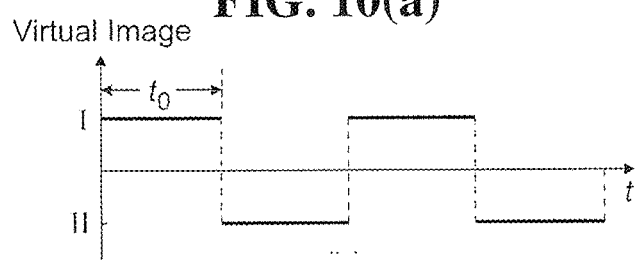
FIG. 10(b)
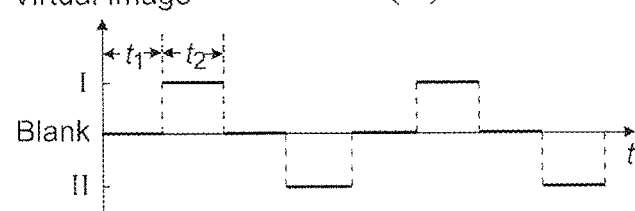
FIG. 10(c)
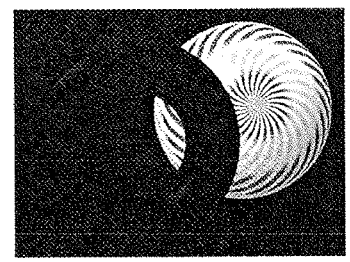
Frame I
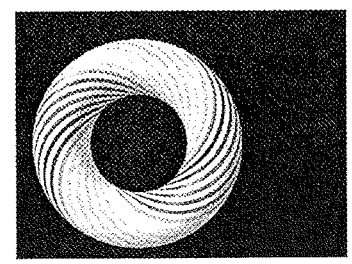
Frame II

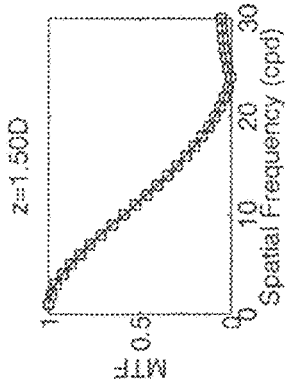
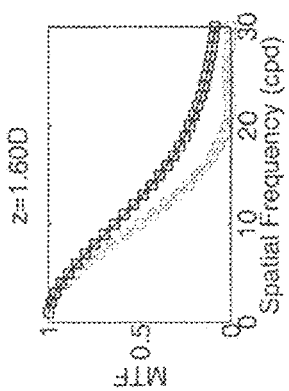
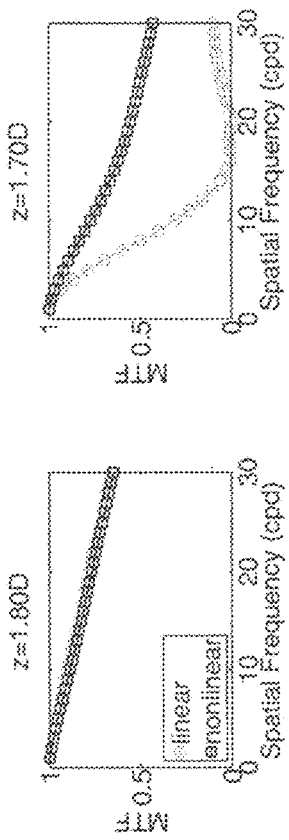
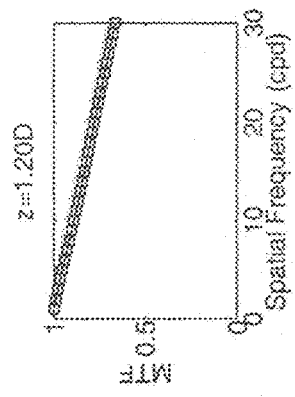
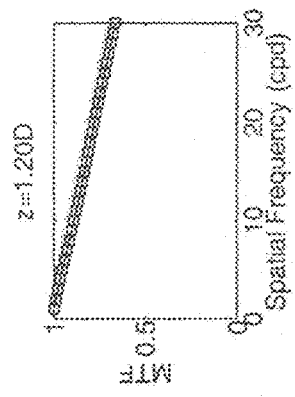
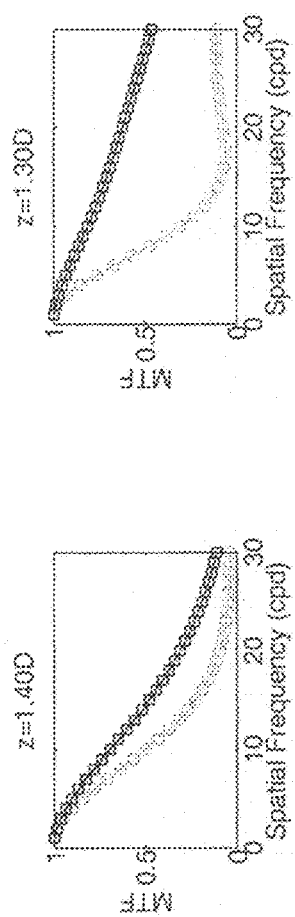
FIG. 21(a) FIG. 21(b) FIG. 21(c) FIG. 21(d) FIG. 21(e) FIG. 21(f) FIG. 21(g)

3-DIMENSIONAL ELECTRO-OPTICAL SEE-THROUGH DISPLAYS

CROSS-REFERENCE TO RELATED APPLICATION

This is a continuation application of U.S. application Ser. No. 12/807,868, filed Sep. 14, 2010, which in turn claims the benefit of priority of U.S. Provisional Application No. 61/276,578, filed Sep. 14, 2009, the entire contents of which application(s) are incorporated herein by reference.

ACKNOWLEDGMENT OF GOVERNMENT SUPPORT

This invention was made with government support under Grant Nos. 0534777 and 0915035 awarded by NSF. The government has certain rights in the invention.

FIELD

This disclosure pertains to, inter alia, three-dimensional electro-optical displays that can be head-worn or otherwise placed relative to a person's eyes in a manner allowing the person to view images rendered by the display.

BACKGROUND

Interest in 3-dimensional (3-D) displays is long-standing and spans various fields including, for example, flight simulation, scientific visualization, education and training, tele-manipulation and tele-presence, and entertainment systems. Various types of 3-D displays have been proposed in the past, including head-mounted displays (HMDs) (Hua and Gao, *Applied Optics* 46:2600-2610, May 2007; Rolland et al., *Appl. Opt.* 39:3209-3215, July 2000; Schowengerdt and Seibel, *J. Soc. Info. Displ.* 14:135-143, February 2006); projection-based immersive displays (Cruz-Neira et al., *Proc.* 20th *Ann. Conf Comp. Graphics Interactive Techniques*, pp 135-142, ACM SIGGRAPH, ACM Press, September 1993); volumetric displays (Sullivan, *SID Symp. Dig. Tech. Papers* 34:1531-1533, May 2003; Favalora et al., *Proc. SPIE*, 4712:300-312, August 2002; Downing et al., *Science* 273:1185-1189, August 1996); and holographic displays (Heanue et al., *Science* 265:749-752, August 1994). HMDs are desirable from the standpoints of cost and technical capabilities. For instance, HMDs provide mobile displays for wearable computing. For use in augmented reality, they can merge images of virtual objects with actual physical scenes. (Azuma et al., *IEEE Comp, Graphics and Applies.* 21:34-47, November/December 2001; Hua, *Opt. Photonics News* 17:26-33, October 2006.)

Despite ongoing advances in stereoscopic displays, many persistent technical and usability issues prevent the current technology from being widely accepted for demanding applications and daily usage. For example, various visual artifacts and other problems are associated with long-term use of stereoscopic displays, particularly HMDs, such as apparent distortions and inaccuracies in perceived depth, visual fatigue, diplopic vision, and degradation of oculomotor responses. Although at least some of these artifacts may arise from engineering-related aspects of the display itself, such as poor image quality, limited eye relief, and inappropriate inter-pupillary distance (IPD), a key factor is the discrepancy between accommodation and convergence associated with use of a conventional display. Mon-Williams et al., *Ophth. Physiol. Opt.* 13:387-391, October 1993; Wann et al., *Vis. Res.* 35:2731-2736, October 1995.

In most people, accommodation and convergence are normally tightly coupled with each other so that convergence depth coincides with accommodation depth as required for three-dimensional (3-D) depth perception. Conventional stereoscopic displays, however, lack the ability to render focus cues correctly because such displays present stereoscopic images on a fixed image plane while forcing the eyes to converge at different distances to perceive objects at different depths. In other words, contrary to natural vision, whenever a viewer is using a conventional stereoscopic display, all objects (regardless of their actual locations relative to the viewer's eyes) are perceived to be in focus if the viewer focuses his eyes on the image plane of the display. Also, all objects (regardless of their actual locations relative to the viewer's eyes) are perceived as blurred if the viewer's accommodation varies with convergence. This results in a forced, and unnatural, decoupling of the accommodation and convergence cues, which results in an erroneous focus cue. An erroneous focus cue induces incorrect blurring of images formed on the retina that do not vary with the rendered depth of a virtual scene. As a result, unfaithful focus cues can cause, for example, under-estimation or mis-estimation of the rendered depth of a 3-D scene and visual fatigue after prolonged exposure to the stereoscopic environment produced by the display.

Significant interest has arisen in developing 3-D displays that can provide correct or nearly correct focus cues. One conventional approach is a "volumetric" display that portrays a large number (e.g., millions) of voxels within a physical volume. Volumetric displays are conventionally classified as "true" 3-D displays. The practical implementation of such technology, however, has been hindered by several technical challenges, such as its low efficiency with which the large number of calculations are made to update all the voxels, its limited rendering volume, and its poor ability to render view-dependent lighting effects correctly such as occlusions, specular reflection, and shading.

Another conventional approach is a "multi-focal plane" display that renders respective focus cues for virtual objects at different "depths" by forming respective images of light patterns produced at multiple focal planes by respective 2-D micro-displays located at respective discrete "depths" from the eyes. Rolland et al., *Appl. Opt.* 39:3209-3215, 2000; Akeley et al., *ACM Trans. Graphics* 23:804-813, July 2004. (As used herein, "depth" in this context means the optical-path distance from the viewer's eyes.) Each of the focal planes is responsible for rendering 3-D virtual objects at respective nominal depth ranges, and these discrete focal planes collectively render a volume of virtual 3-D objects with focus cues that are specific to a given viewpoint.

A multi-focal-plane display may be embodied via a "spatial-multiplexed" approach which uses multiple layers of 2-D micro-displays. For example, Rolland (cited above) proposed use of a thick stack of fourteen equally spaced planar (2-D) micro-displays to form respective focal planes in an head-mounted display that divided the entire volumetric space from infinity to 2 diopters. Implementation of this approach has been hindered by the lack of practical technologies for producing micro-displays having sufficient transmittance to allow stacking them and passing light through the stack, and by the displays' demands for large computational power to render simultaneously a stack of 2-D images of a 3-D scene based on geometric depth.

Another conventional approach is a "time-multiplexed" multi-focal-plane display, in which multiple virtual focal planes are created time sequentially and synchronously with the respective depths of the objects being rendered. See, e.g., Schowengerdt and Seibel, *J. Soc. Info. Displ.* 14:135-143, February 2006; McQuaide et al., *Displays* 24:65-72, August 2003. For example, in the work cited here, a see-through retinal scanning display (RSD) including a deformable membrane mirror (DMM) was reported in which a nearly collimated laser beam is modulated and scanned across the field of view (FOV) to generate pixels on the retina. Meanwhile, correct focusing cues are rendered on a pixel-by-pixel basis by defocusing the laser beam through the DMM. To achieve a practical full-color and flicker-free multi-focal-plane stereo display, extremely fast address speeds of both the laser beam and the DMM are required, up to MHz. Rendering each pixel by a beam-scanning mechanism limits the compatibility of the system with existing 2-D displays and rendering techniques.

Yet another conventional approach is a variable-focal-plane display, in which the focal distance of a 2-D micro-display is controllably changed synchronously with the respective depths of the objects correlated with the region of interest (ROI) of the viewer. The region of interest of a viewer may be identified through a user feedback interface. See, e.g., Shiwa et al., *J. Soc. Info. Dispi.* 4:255-261, December 1996; Shibata et al., *J. Soc. Info. Dispi.* 13:665-671, August 2005. Shiwa's device included a relay lens that, when physically displaced, changed the perceived depth position of a rendered virtual object. Shibata achieved similar results by axially displacing the 2-D micro-display mounted using a micro-controlled stage on which the micro-display was mounted. Although these approaches were capable of rendering adaptive accommodation cues, they were unable to render retinal blur cues in 3-D space and requires a user input to determine the ROI in real time.

Despite all the past work on 3-D displays summarized above, none of the conventional displays, including conventional addressable-focus displays, has the capability of incorporating variable-focal-plane, multiple-focal plane, and depth-fused 3-D techniques into a cohesively integrated system allowing the flexible, precise, and real-time addressability of focus cues. There is still a need for a see-through display with addressable focal planes for improved depth perceptions and more natural rendering of accommodation and convergence cues. There is also a need for such displays that are head-mounted.

SUMMARY

In view the limitations of conventional displays summarized above, certain aspects of the invention are directed to stereoscopic displays that can be head-mounted and that have addressable focal planes for improved depth perceptions but that require substantially less computational power than existing methods summarized above while providing more accurate focus cues to a viewer. More specifically, the invention provides, inter alia, vari-focal or time-multiplexed multi-focal-plane displays in which the focal distance of a light pattern produced by a 2-D "micro-display" is modulated in a time-sequential manner using a liquid-lens or analogous active-optical element. An active-optical element configured as, for example, a "liquid lens" provides addressable accommodation cues ranging from optical infinity to as close as the near point of the eye. The fact that a liquid lens is refractive allows the display to be compact and practical, including for head-mounted use, without compromising the required accommodation range. It also requires no moving mechanical parts to render focus cues and uses conventional micro-display and graphics hardware.

Certain aspects of the invention are directed to see-through displays that can be monocular or binocular, head-mounted or not. The displays have addressable means for providing focus cues to the user of the display that are more accurate than provided by conventional displays. Thus, the user receives, from the display, images providing improved and more accurate depth perceptions for the user. These images are formed in a manner that requires substantially less computational power than conventional displays summarized above. The displays are for placement in an optical pathway extending from an entrance pupil of a person's eye to a real-world scene beyond the eye.

One embodiment of such a display comprises an active-optical element and at least one 2-D added-image source. The added-image source is addressable to produce a light pattern corresponding to a virtual object and is situated to direct the light pattern toward the person's eye to superimpose the virtual object on an image of the real-world scene as perceived by the eye via the optical pathway. The active-optical element is situated between the eye and the added-image source at a location that is optically conjugate to the entrance pupil and at which the active-optical element forms an intermediate image of the light pattern from the added-image source. The active-optical element has variable optical power and is addressable to change its optical power to produce a corresponding change in perceived distance at which the intermediate image is formed, as an added image to the real-world scene, relative to the eye.

An exemplary added-image source is a micro-display comprising a 2-D array of light-producing pixels. The pixels, when appropriately energized, produce a light pattern destined to be the virtual object added to the real-world scene.

In some embodiments the active-optical element is a refractive optical element, such as a lens that, when addressed, exhibits change in optical power or a change in refractive index. An effective type of refractive optical element is a so-called "liquid lens" that operates according to the "electrowetting" effect, wherein the lens addressed by application thereto of a respective electrical voltage (e.g., an AC voltage) exhibits a change in shape sufficient to effect a corresponding change in optical power. Another type of refractive optical element is a liquid-crystal lens that is addressed by application of a voltage causing the liquid-crystal material to exhibit a corresponding change in refractive index. The refractive active-optical element is situated relative to the added-image source such that light from the added-image source is transmitted through the optical element. A liquid lens, being refractive, allows the display to be compact and practical, including for head-mounted use, without compromising the required accommodation range. It also requires no moving mechanical parts to render focus cues and uses conventional micro-display and graphics hardware.

In other embodiments the active optical element is a reflective optical element such as an adaptive-optics mirror, a deformable membrane mirror, a micro-mirror array, or the like. The reflective active-optical element desirably is situated relative to the added-image source such that light from the added-image source is reflected from the optical element. As the reflective optical element receives an appropriate address, it changes its reflective-surface profile sufficiently to change its optical power as required or desired.

A refractive active-optical element is desirably associated with an objective lens that provides most of the optical power. The objective lens typically operates at a fixed optical power, but the optical power can be adjustable. The objective lens desirably is located adjacent the active-optical element on the same optical axis. Desirably, this optical axis intersects the optical pathway. The added-image source also can be located on this optical axis. In an example embodiment a beam-splitter is situated in the optical pathway to receive light of the intermediate image from the active-optical element along the optical axis that intersects the optical pathway at the beam-splitter.

If the active-optical element is on a first side of the beam-splitter, then a mirror can be located on the axis on a second side of the beam-splitter to reflect light back to the beam-splitter that has passed through the beam-splitter from the active-optical element. This mirror desirably is a condensing mirror, and can be spherical or non-spherical. If the mirror has a center of curvature and a focal plane, then the active-optical element can be situated at the center of curvature to produce a conjugate exit pupil through the beam-splitter.

As the active-optical element addressably changes its optical power, the intermediate image is correspondingly moved along the optical pathway relative to the focal plane to produce a corresponding change in distance of the added image relative to the eye. The distance at which the added image is formed can serve as an accommodation cue for the person with respect to the intermediate image.

The following definitions are provided for respective terms as used herein:

A "stereoscopic" display is a display configured for use by both eyes of a user, and to display a scene having perceived depth as well as length and width.

"Accommodation" is an action by an eye to focus, in which the eye changes the shape of its crystalline lens as required to "see" objects sharply at different distances from the eye.

"Convergence" is an action by the eyes to rotate in their sockets in a coordinated manner to cause their respective visual axes to intersect at or on an object at a particular distance in 3-D space.

An "accommodation cue" is a visual stimulus (e.g., blurred image) that is perceived by a viewer to represent an abnormal accommodation condition and that, when so perceived, urges the eyes to correct the accommodation condition by making a corresponding accommodation change.

A "convergence cue" is a visual stimulus (e.g. binocular disparity, i.e., slightly shifted image features in a stereoscopic image pair) that is perceived by a viewer to represent an abnormal convergence condition and that, when so perceived, urges the eyes to correct the convergence condition by making a corresponding convergence change.

A "retinal blur cue" is visual stimulus (e.g., blurred image) that is perceived by a viewer to represent an out-of-focus condition and that, when so perceived, provides the eyes information for depth judgment and may urge the eyes to correct the accommodation condition by making a corresponding change. (Note, the eyes do not necessarily make accommodation change, in many cases the retinal blur cue provides a sense of how far the appeared blurred object is from in-focus objects.)

Normally, a combination of an accommodation cue and a retinal blur cue provides a "focus cue" used by a person's eyes and brain to sense and establish good focus of respective objects at different distances from the eyes, thereby providing good depth perception and visual acuity.

An "addressable" parameter is a parameter that is controlled or changed by input of data and/or command(s). Addressing the parameter can be manual (performed by a person using a "user interface") or performed by machine (e.g., a computer or electronic controller). Addressable also applies to the one or more operating modes of the subject displays. Upon addressing a desired mode, one or more operating parameters of the mode are also addressable.

An "accommodation cue" is a stimulus (usually an image) that stimulates the eye(s) to change or adjust its or their accommodation distance.

A "see-through" display allows a user to receive light from the real world, situated outside the display, wherein the light passes through the display to the user's eyes. Meanwhile, the user also receives light corresponding to one or more virtual objects rendered by the display and superimposed by the display on the image of the real world.

A "virtual object" is not an actual object in the real world but rather is in the form of an image artificially produced by the display and superimposed on the perceived image of the real world. The virtual object may be perceived by the eyes as being an actual real-world object, but it normally does not have a co-existing material counterpart, in contrast to a real object.

An "added-image source" is any of various 2-D devices that are addressable to produce a light pattern corresponding to at least one virtual object superimposed by the display on the real-world view, as perceived by the user of the display. In many embodiments the added-image source is a "microdisplay" comprising an X-Y array of multiple light-producing pixels that, when addressed, collectively produce a light pattern. Other candidate added-image sources include, but are not limited to, digital micro-mirror devices (DMDs) and ferroelectric liquid-crystal-on-silicon (FLCOS) devices.

For producing accommodation cues, the displays address focal distances in at least two possible operational modes. One mode involves a single but variable-distance focal plane, and the other mode involves multiple focal planes at respective distances. The latter mode addresses the active-optical element and a 2-D virtual-image source in a time-sequential manner. Compared to a conventional time-multiplexed RSD that depends upon pixel-by-pixel rendering, the presenting of multiple full-color 2 D images by a subject display from a 2-D added-image source in a time-sequential, image-by-image manner substantially reduces the address speed (from MHz to approximately 100 Hz) required for addressing all the pixels and the active-optical element(s). As the response speed of the active-optical element is increased (e.g., from about 75 ms to less than 10 ms), the efficiency of the display is correspondingly increased.

The foregoing and additional advantages and features of the invention will be more apparent from the following detailed description, which proceeds with reference to the accompanying drawings.

BRIEF DESCRIPTION OF THE DRAWINGS

FIG. 9(a) is a schematic optical diagram of a display according to the second representative embodiment.

FIG. 9(b) is a plot of the focus cue (z) as a function of voltage (U) applied to the liquid lens of the second representative embodiment.

FIG. 10(a) is a time plot of an exemplary square wave of voltage applied to the liquid lens in the second representative embodiment, with fast switching between 49 and 37 $V_{rms}$ so as to time-multiplex the focal planes at 1 D and 6 D, respectively, in the second representative embodiment.

FIG. 10(b) is a time plot of an exemplary rendering and display of images (Frame I and Frame II) of an object (torus) synchronously with energization of the liquid lens in the second representative embodiment. The accompanying Frame I shows the superposition of a sphere and a mask for a torus in front of the sphere. Frame II is a full image of the torus, with the sphere masked out.

FIG. 10(c) is a time plot of a square wave, synchronous with energization of the liquid lens, including respective blank frames per cycle.

In FIG. 11(a), when the camera was focused at the bar target at 6 D, the torus (rendered at 6 D) appears to be in focus while the sphere is blurred. FIG. 11(b) shows an image in which the camera was focused on the sphere at 1 D, causing the sphere to appear in substantial focus.

FIG. 14(a) is a rendered image of a virtual scene (rabbits) obtained using a standard pin-hole camera. FIG. 14(b) is a virtual image post-processed by applying a blur filter. FIGS. 14(c) and 14(e) are degree-of-blur maps of the virtual scene with the eye focused at 3 D and 1 D, respectively. FIGS. 14(d) and 14(f) are final rendered images of the 3-D scene with corresponding focus cues when the eye is focused at 3 D and 1 D, respectively.

FIG. 15(a) is a plot of eye-tracked convergence distances versus time. FIG. 15(b) is a real-time rendering of focus cues while tracking the convergence distance. FIGS. 15(c) and 15(d) are optical see-through images of the VC-GCD captured with a camera, placed at the eye-pupil position, focused at 3 D and 1 D, respectively, while the optical power of the liquid lens was updated accordingly to match the focal distance of the display with the convergence distance.

FIG. 20(a) is a depth map of the scene rendered by shaders.

FIGS. 21(a)-21(g) are comparative plots of MTFs in a dual-focal-plane DFD display using liner and non-linear depth-weighted fusing functions, respectively. Front and back focal planes are assumed at $z_1=1.8$ D and $z_2=1.2$ D, respectively. Accommodation distance is z=1.8 D (FIG. 21(a)), 1.7 D (FIG. 21(b)), 1.6 D (FIG. 21(c)), 1.5 D (FIG. 21(d)), 1.4 D (FIG. 21(e)), 1.3 D (FIGS. 21(f)), and 1.2 D (FIG. 21(g)), respectively.

DETAILED DESCRIPTION

Figure 1:
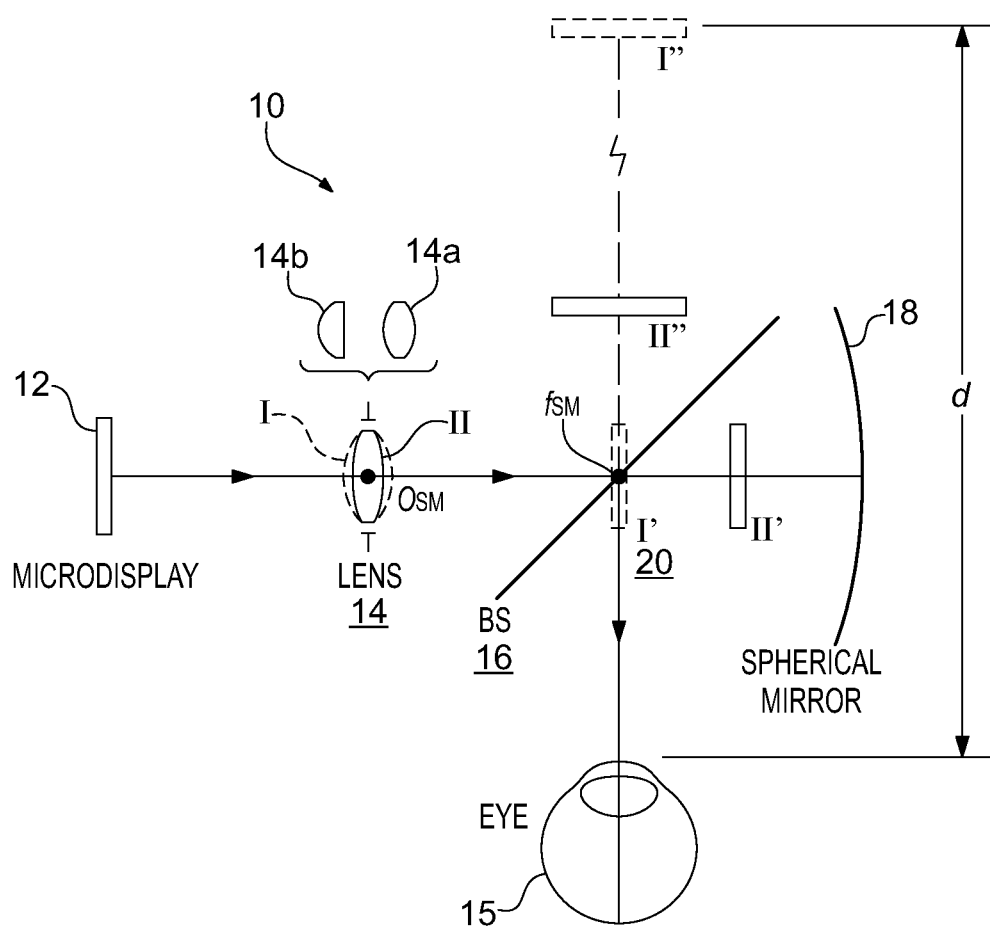
FIG. 1 is a schematic diagram of a display according to a first representative embodiment. The depicted display can be used as either a monocular or binocular display, the latter requiring an additional assembly as shown for a user's second eye (not shown).

The following disclosure is presented in the context of representative embodiments that are not to be construed as being limiting in any way. This disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Although the operations of the disclosed methods are described in a particular, sequential order for convenient presentation, it should be understood that this manner of description encompasses rearrangement of the operations, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other things and methods.

The following explanations of terms are provided to better describe the present disclosure and to guide those of ordinary skill in the art in the practice of the present disclosure.

This disclosure sometimes uses terms like "produce," "generate," "select," "receive," "exhibit," and "provide" to describe the disclosed methods. These terms are high-level abstractions of the actual operations that are performed. The actual operations that correspond to these terms may vary depending on the particular implementation and are readily discernible by one of ordinary skill in the art.

The singular forms "a," "an," and "the" include the plural forms unless the context clearly dictates otherwise. The term "includes" means "comprises." Unless the context dictates otherwise, the term "coupled" means mechanically, electrically, or electromagnetically connected or linked and includes both direct connections or direct links and indirect connections or indirect links through one or more intermediate elements not affecting the intended operation of the described system.

Certain terms may be used such as "up," "down," "upper," "lower," and the like. These terms are used, where applicable, to provide some clarity of description when dealing with relative relationships. But, these terms are not intended to imply absolute relationships, positions, and/or orientations.

The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about" or "approximately." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

The various embodiments of displays address multiple focal planes in an optical see-through display. A particularly desirable display configuration is head-mountable; however, head-mountability is not a mandatory feature. For example, contemplated as being within the scope of the invention are displays relative to which a viewer simply places his or her head or at least his or her eyes. The displays include binocular (intended and configured for use with both eyes) as well as monocular displays (intended and configured for use with one eye).

Each of the various embodiments of displays described herein comprises an active-optical element that can change its focal length by application of an appropriate electrical stimulus (e.g., voltage) or command. An active-optical element can be refractive (e.g., a lens) or reflective (e.g., a mirror).

A practical active-optical element in this regard is a so-called "liquid lens." A liquid lens operates according to the electrowetting phenomenon, and can exhibit a wide range of optical power. Electrowetting is exemplified by placement of a small volume (e.g., a drop) of water on an electrically conductive substrate, wherein the water is covered by a thin layer of an electrical insulator. A voltage applied to the substrate modifies the contact angle of the liquid drop relative to the substrate. Currently available liquid lenses actually comprise two liquids having the same density. One liquid is an electrical insulator while the other liquid (water) is electrically conductive. The liquids are not miscible with each other but contact each other at a liquid-liquid interface. Changing the applied voltage causes a corresponding change in curvature of the liquid-liquid interface, which in turn changes the focal length of the lens. One commercial source of liquid lenses is Varioptic, Inc., Lyon, France. In one example embodiment the respective liquid lens exhibits an optical power ranging from −5 to +20 diopters (−5 D to 20 D) by applying an AC voltage ranging from 32 $V_{rms}$ to 60 $V_{rms}$, respectively. Such a lens is capable of dynamically controlling the focal distance of a light pattern produced by a 2-D micro-display from infinity to as close as the near point of the eye.

First Representative Embodiment

A representative embodiment of a stereoscopic display 10 is shown in FIG. 1, which depicts half of a binocular display. The depicted display 10 is used with one eye while the other half (not shown) is used with the viewer's other eye. The two halves are normally configured as mirror images of each other. The display 10 is configured as an optical see-through (OST) head-mounted display (HMD) having multiple addressable focal planes. "See-through" means the user sees through the display to the real world beyond the display. Superimposed on the image of the real world, as seen through the display, is one or more virtual objects formed and placed by the display.

The display 10 comprises a 2-D micro-display 12 (termed herein an "added-image source"), a focusing lens 14, a beam-splitter (BS) 16, and a condensing (e.g., concave spherical) mirror 18. The added-image source 12 generates a light pattern intended to be added, as an image, to the view of the "real world" being perceived by a user wearing or otherwise using the display 10.

To illustrate generally the operation of the display 10, reference is made to FIGS. 2(*a*)-2(*d*). FIG. 2(*a*) depicts normal viewing of the real world; FIG. 2(*b*) depicts viewing using a conventional stereoscopic display; and FIGS. 2(*c*) and 2(*d*) depict viewing using this embodiment. For simplicity, only two objects (configured as boxes) located near (Box A) and far (Box B) are shown. In the real-world viewing situation (FIG. 2(*a*)), the eyes alternatingly adjust focus between near and far distances while natural focus cues are maintained. As used herein, "distance" is outward along the optical axis of the display, as measured from the exit pupil of the eye. The accommodation and convergence distances are normally coupled to each other, and an object out of the current focal distance will appear blurred, as indicated by the simulated retinal images in the inset to the right. In a conventional stereoscopic display (FIG. 2(*b*)), assuming the image plane is fixed at a far distance, converging at the near distance will cause an unnatural conflict between convergence and accommodation, causing both rendered boxes to appear either in focus or blurred as the eyes accommodate at the far or near distance, respectively. This situation yields incorrect focus cues as shown in the corresponding inset images in FIG. 2(*b*). In contrast, the subject display 10 approximates the viewing condition of the real world, as shown in FIGS. 2(*c*) and 2(*d*). When the eyes converge at the near distance (Box A), the display's image plane is moved to the near distance accordingly, thereby rendering Box A in focus and rendering Box B with appropriate blur. When the eyes converge at the far distance (Box B), the image plane is translated to the far distance, thereby rendering Box B in focus and rendering Box A with appropriate blur. Therefore, the retinal images shown in the insets of FIGS. 2(*c*) and 2(*d*) simulate those of the real world situation by concurrently adjusting the focal distance of the display to match with the user's convergence distance and rendering retinal blur cues in the scene according to the current focal status of the eyes.

The focusing lens 14 is drawn as a singlet in FIG. 1, but it actually comprises, in this embodiment, an "accommodation lens" (i.e., the liquid lens) 14a with variable optical power $\Phi_A$, and an objective lens 14b having a constant optical power $\Phi_0$. The two lenses 14a, 14b form an intermediate image 20 of the light pattern produced by the added-image source 12 on the left side of the mirror 18. (The objective lens provides most of the optical power and aberration control for forming this intermediate image.) The liquid lens 14a is optically conjugate to the entrance pupil of the eye 15, which allows accommodative changes made by the eye 15 to be adaptively compensated by optical-power changes of the liquid lens. The mirror 18 relays the intermediate image 20 toward the viewer's eye through the beam-splitter 16. Since the liquid lens 14a is the limiting aperture of the display optics, it desirably is placed at the center of curvature ($O_{SM}$) of the mirror 18 so that a conjugate exit pupil is formed through the beam-splitter 16. The viewer, by positioning an eye 15 at the conjugate exit pupil, sees both the added image of the light pattern produced by the added-image source 12 and an image of the real world through the beam-splitter 16. Indicated by the dashed and solid lines, respectively, as the accommodation lens 14a changes its optical power from high (I) to low (II), the intermediate image 20 produced by the accommodation lens is displaced toward (I') or away from (II'), respectively, the focal plane ($f_{SM}$) of the mirror 18. Correspondingly, the added image is formed either far (I'') or close (II''), or in between, to the eye 15. Since the liquid lens 34a is located optically conjugate to the entrance pupil, any change in power produced by the liquid lens does not change the apparent field of view.

Thus, the two lenses 14a, 14b together form an intermediate image of the light pattern produced by the added-image source 12, and the mirror 18 relays and directs the intermediate image toward the viewer's eye via the beam-splitter 16. The mirror 18 is configured to ensure a conjugate exit pupil is formed at the eye of a person using the display 10. By placing the eye at the conjugate pupil position, the viewer sees both the image of the light pattern produced by the added-image source 12 and a view of the real world. Although the mirror 18 in this embodiment is spherically concave, it will be understood that it alternatively could be aspherical-concave.

In certain alternative configurations, the mirror 18 can be omitted. The main benefit of the mirror is its ability to fold the optical pathway and provide a compact optical system in the display. In certain situations such compactness may not be necessary.

The accommodation lens 14a is a liquid lens in this embodiment, which is an example of a refractive active-optical element. It will be understood that any of several other types of refractive active-optical elements can alternatively be used, such as but not limited to a liquid-crystal lens. Further alternatively, the accommodation lens can be a reflective active-optical element, such as an actively deformable mirror. In other words, any of various optical elements can be used that have the capability of changing their focal length upon being addressed (i.e., upon command).

Based on first-order optics and use of a liquid lens as an active-optical element, the accommodation cue, d, of the display 10 (i.e., the distance from the eye 15 to the image plane of the virtual object produced by the added-image source 12) is determined by:

$$d = \frac{-uR}{2u + R + uR\Phi} \quad (1)$$

where $\Phi=\Phi_O+\Phi_A-\Phi_O\Phi_A t$ is the combined optical power of the focusing lens, t is the axial separation between the objective lens 14b and the accommodation lens 14a, u is the axial distance from the 2-D added-image source 12 to the focusing lens 14, and R is the radius of curvature of the mirror 18. All distances are defined by the sign convention in optical designs.

Figure 3:
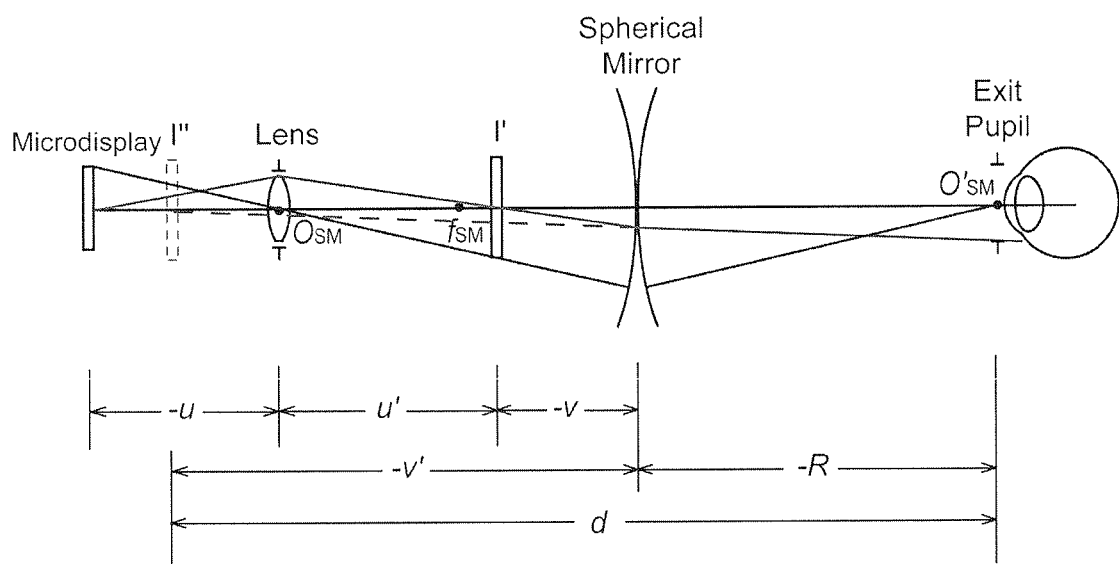
FIG. 3 is an unfolded optical diagram of the display of FIG. 1.

This display 10 has multiple addressable focal planes for improved depth perceptions. Similarly to the accommodative ability of the crystalline lens in the human visual system, the liquid lens 14a or other refractive active-optical element provides an addressable accommodation cue that ranges from infinity to as close as the near-point of the eye. Unlike mechanical focusing methods, and unlike retinal scanning displays (RSDs) based on reflective deformable membrane mirrors (DMMs), the transmissive nature of the liquid lens 14a or other refractive active-optical element allows for a compact and practical display that has substantially no moving mechanical parts and that does not compromise the accommodation range. FIG. 3 shows the unfolded optical path of the schematic diagram in FIG. 1.

Focus cues are addressable with this embodiment in at least one of two modes. One mode is a variable-single-focal-plane mode, and the other in a time-multiplexed multi-focal-plane mode. In the variable-single-focal-plane mode, the accommodation cue of a displayed virtual object is continuously addressed from far to near distances and vice versa. Thus, the accommodation cue provided by a virtual object can be arbitrarily manipulated in a viewed 3-D world. In the time-multiplexed multi-focal-plane mode, the active-optical element, operating synchronously with graphics hardware and software driving the added-image source, is driven time-sequentially to render both accommodation and retinal blur cues for virtual objects at different depths. In comparison to the conventional time-multiplexed RSD approach using individually addressable pixels, use in this embodiment of the 2-D added-image source to render multiple full-color 2-D images on a frame-sequential basis substantially eliminates any requirement for high addressing speeds.

Figure 27:
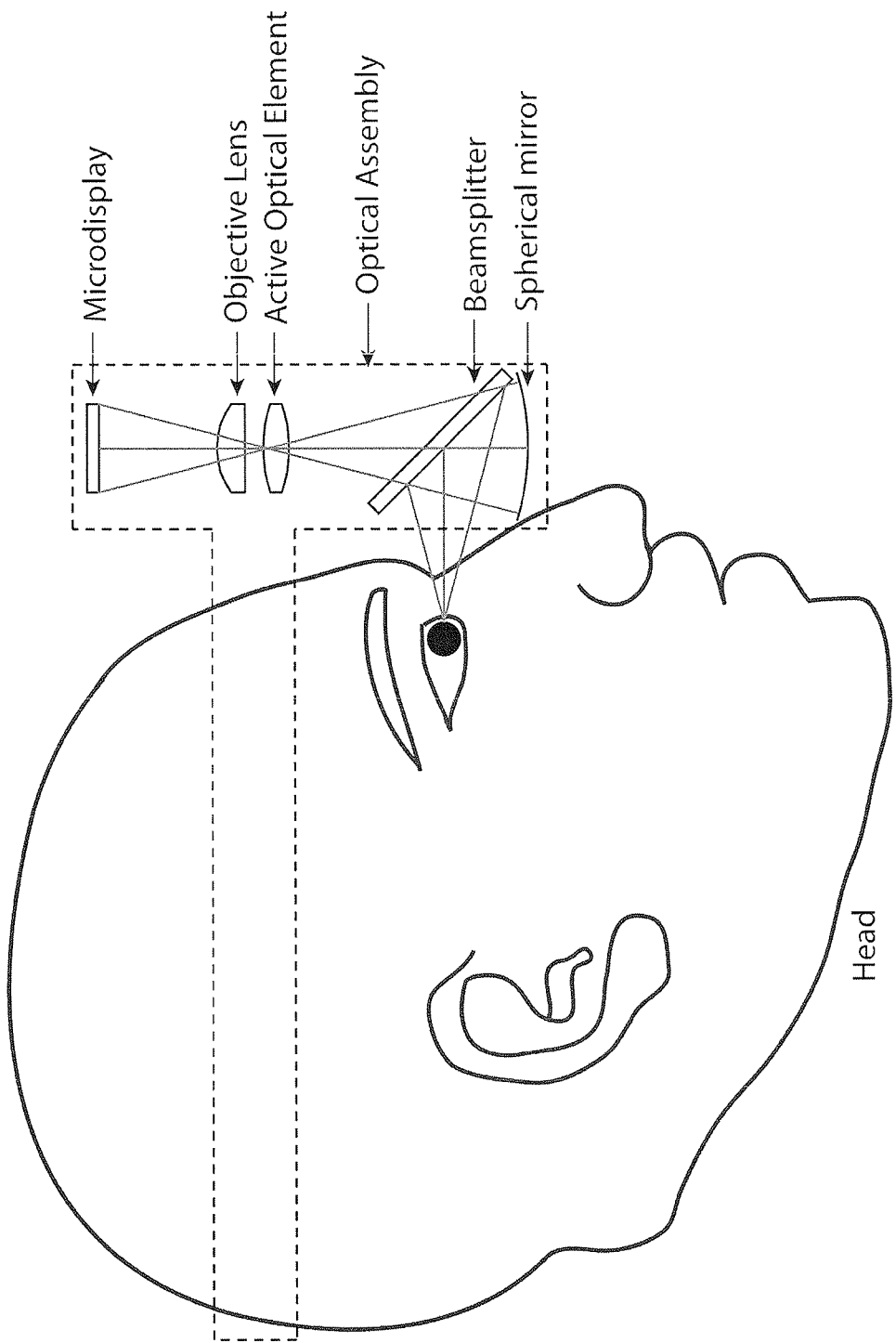
FIG. 27 is a schematic diagram showing the first representative embodiment configured for use as a head-mounted display.

This embodiment is head-mountable, as shown, for example, in FIG. 27, in which the dashed line indicates a housing and head-band for the display.

Figure 28:
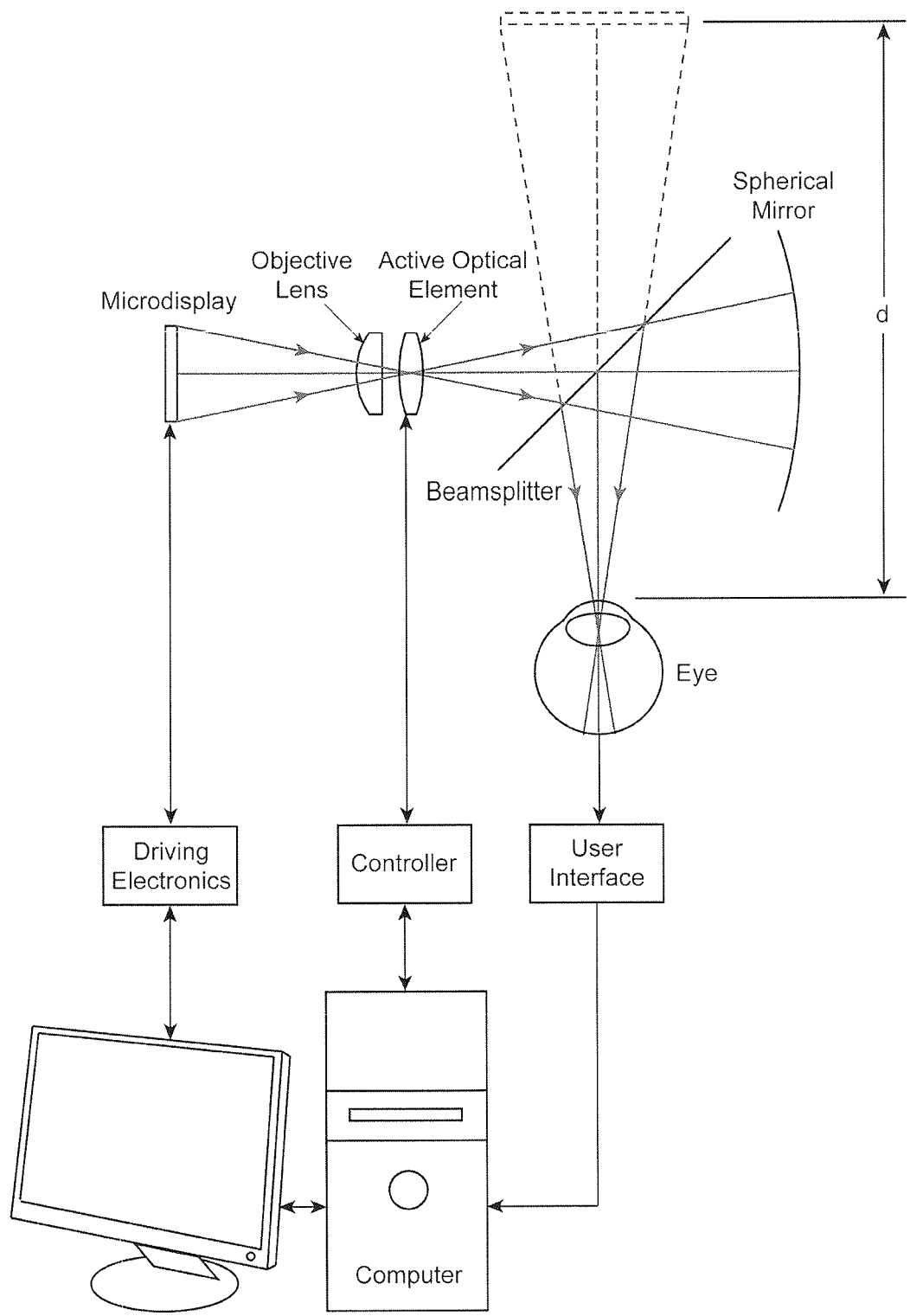
FIG. 28 is a schematic diagram of the first representative embodiment including driving electronics, controller, and user interface.
Figure 29:
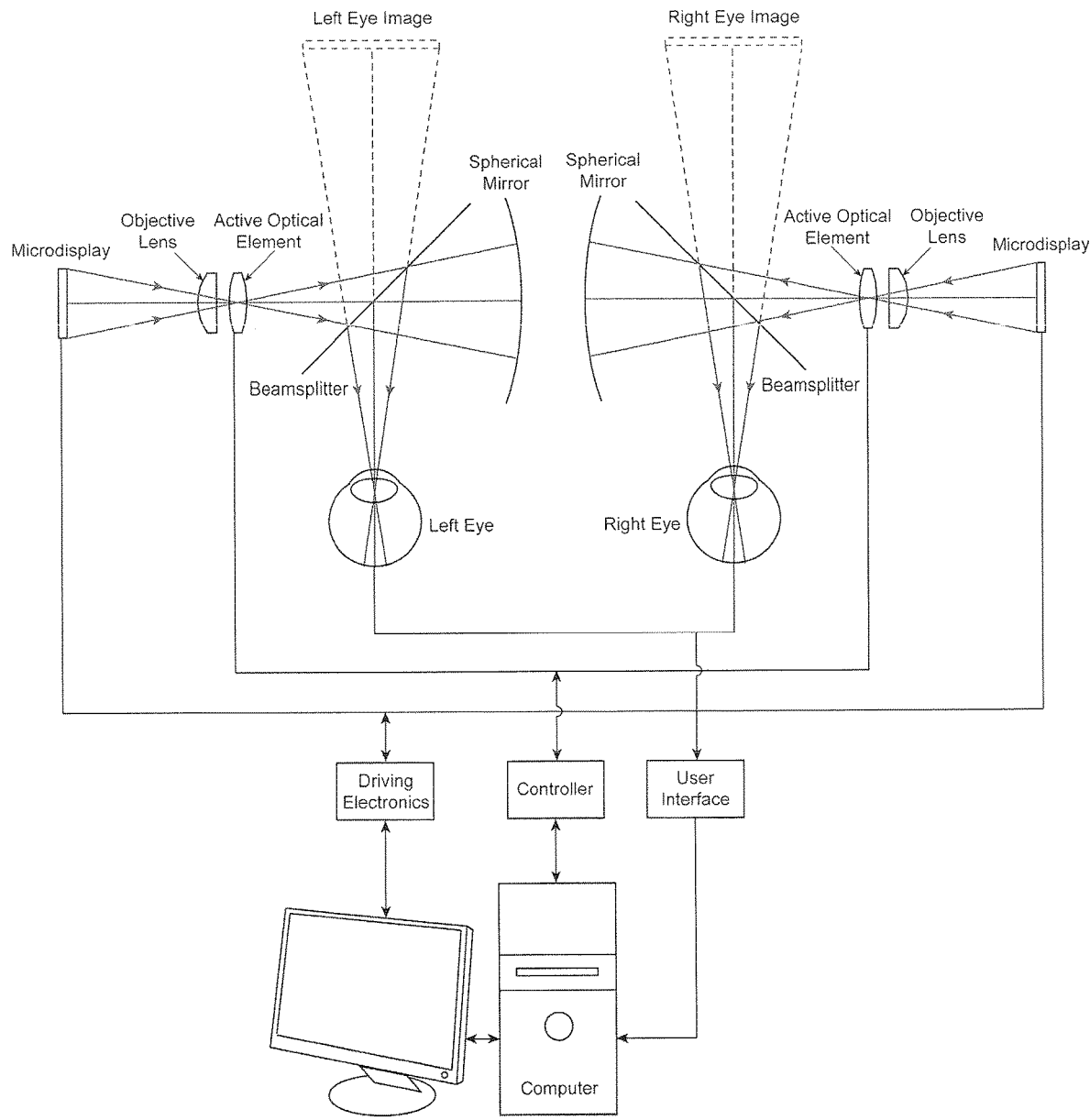
FIG. 29 is similar to FIG. 28, but depicting a binocular display.

FIG. 1 depicts a monocular display, used with one of a person's eyes. The monocular display is also shown in FIG. 28, which also depicts driving electronics connected to the "microdisplay" (added-image source), and a controller connected to the active-optical element. As described in more detail below, also shown is a "user interface" that is manipulated by the user. The driving electronics, controller, and user interface are shown connected to a computer, but it will be understood that the controller can be used for top-level control without having also to use a computer. A corresponding binocular display is shown in FIG. 29.

Example 1

In this example a monocular display was constructed, in which the accommodation lens 14a was a liquid lens ("Arctic 320" manufactured by Varioptic, Inc., Lyon, France) having a variable optical power from −5 to +20 diopters by applying an AC voltage from 32 $V_{rms}$ to 60 $V_{rms}$, respectively. The liquid lens 14a, having a clear aperture of 3 mm, was coupled to an objective lens 14b having an 18-mm focal length. The source of images to be placed in a viewed portion of the real world was an organic-LED, full-color, 2-D added-image source ("micro-display," 0.59 inches square) having 800×600 pixels and a refresh rate of up to 85 Hz (manufactured by eMagin, Inc., Bellevue, Wash.). The mirror 18 was spherically concave, with a 70-mm radius of curvature and a 35-mm clear aperture. Based on these parametric combinations, the display had an exit-pupil diameter of 3 mm, an eye-relief of 20 mm, a diagonal field of view (FOV) of about 28°, and an angular resolution of 1.7 arcmins. The 28° FOV was derived by accounting for the chief-ray angle in the image space.

Figure 4A:
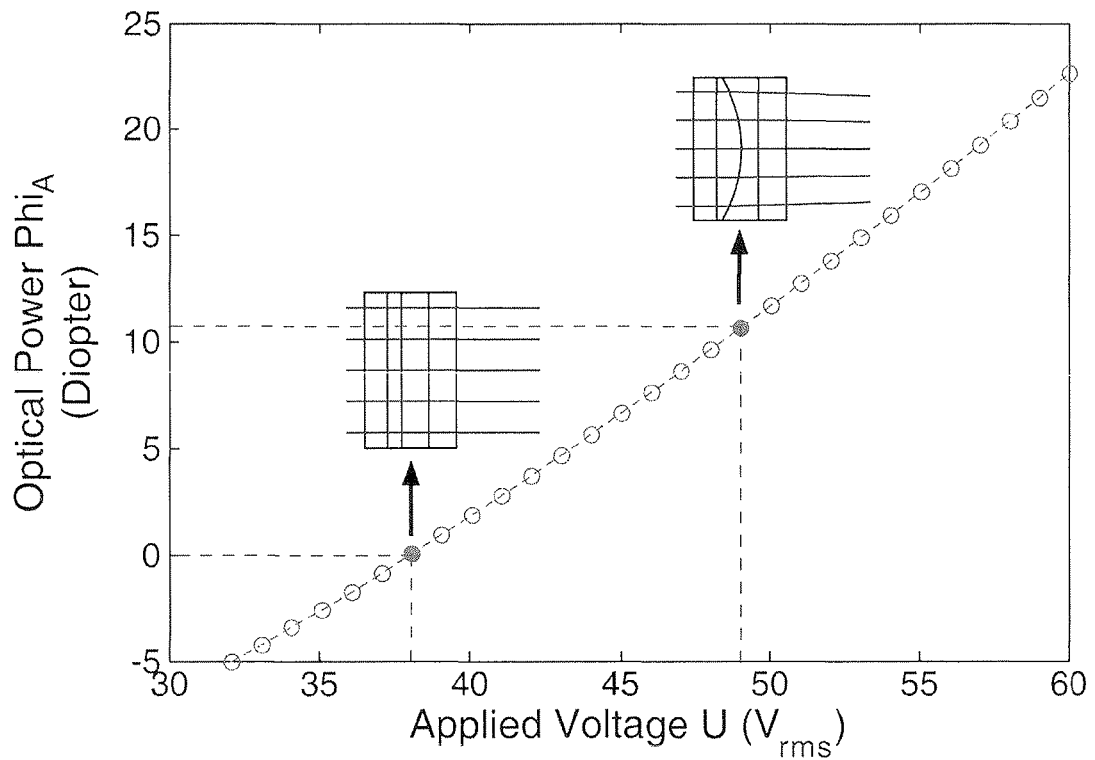
FIG. 4(a) is a plot of the optical power of the liquid lens used in Example 1, as a function of applied voltages.

FIG. 4(a) is an exemplary plot of the optical power of the liquid lens 14a of this example as a function of applied voltages. The curve was prepared by entering specifications of the liquid lens 14a, under different driving voltages, into an optical-design software, CODE V (http://www.optical-res.com). Two examples are shown in FIG. 4(a). At 38 $V_{rms}$ of applied voltage, the liquid lens 14a produced 0 diopter of optical power, as indicated by the planarity of the liquid interface (lower inset). At 49 $V_{rms}$ the liquid lens 14a produced 10.5 diopters of optical power, as indicated by the strongly curved liquid interface (upper inset).

Figure 4B:
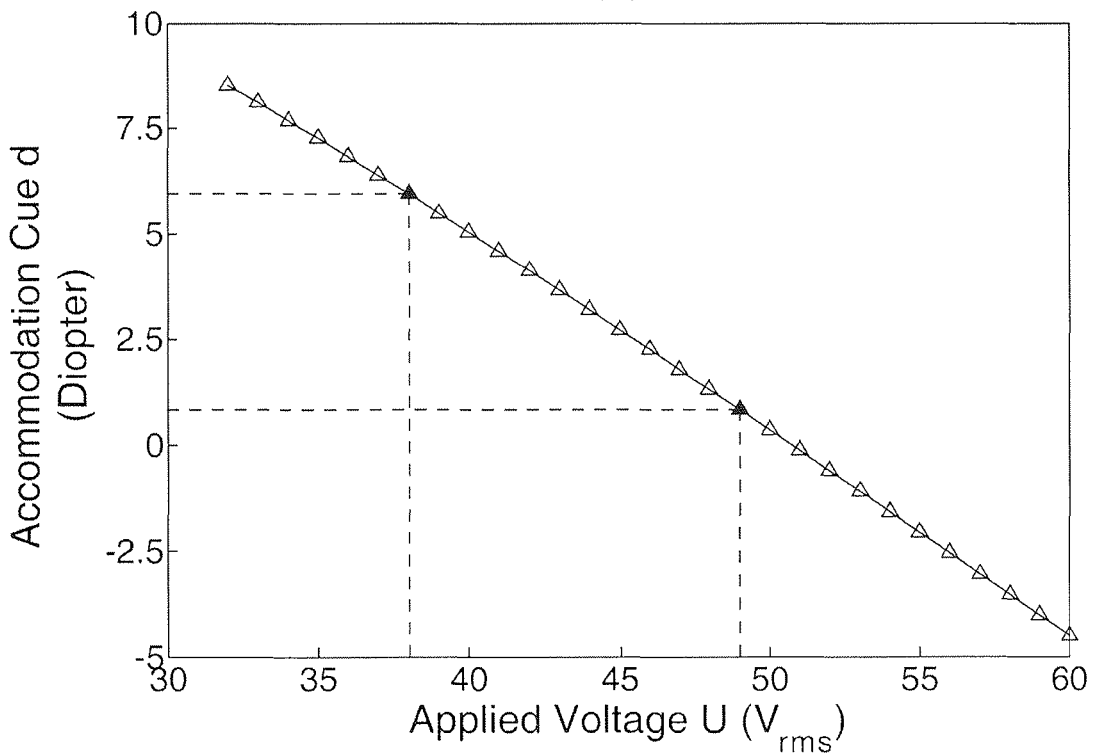
FIG. 4(b) is a plot of the accommodation cue produced by the display of Example 1, as a function of the voltage applied to the liquid lens.

Based on the parametric selections in this example and on Eq. (1), FIG. 4(b) is a plot of the accommodation cue produced by the display as a function of the voltage applied to the liquid lens 14a. As denoted by two solid-triangular markers in FIG. 4(b), driving the liquid lens at 38 $V_{rms}$ and 49 $V_{rms}$ produced accommodation cues at 6 diopters and 1 diopter, respectively. Changing the applied voltage of 32 $V_{rms}$ to 51 $V_{rms}$ changed the accommodation cue of the display from 12.5 cm (8 diopters) to infinity (0 diopter), respectively, thereby covering almost the entire accommodative range of the human visual system.

As indicated by FIGS. 4(a)-4(b), addressing the accommodation cue being produced by the display is achieved by addressing the liquid lens 14a. I.e., addressing the optical power of the liquid lens 14a addresses the corresponding accommodation cue produced by the display. The display 10 can be operated in at least one of two modes: variable-single-focal-plane mode and time-multiplexed multi-focal-plane mode. The variable single-focal-plane mode meets specific application needs, for instance, matching the accommodation cue of virtual and real objects in mixed and augmented realities.

In the multi-focal plane mode, the liquid lens 14a is fast-switched among between multiple discrete driving voltages to provide multiple respective focal distances, such as I" and II" in FIG. 1, in a time-sequential manner. Synchronized with this switching of the focal-plane, the electronics used for driving the 2-D added-image source 12 are updated as required to render the added virtual object(s) at distances corresponding to the rendered focus cues of the display 10. The faster the response speed of the liquid lens 14a and the higher the refresh rate of the added-image source 12, the more focal planes that can be presented to the viewer at a substantially flicker-free rate.

Figure 2A:
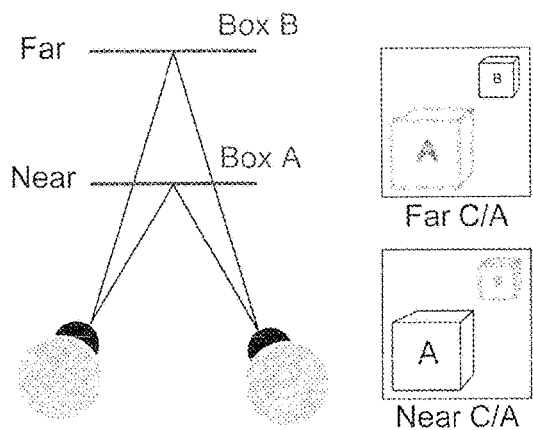
FIGS. 2(a)-2(d) depict respective binocular viewing situations, including real-world (FIG. 2(a)), use of a conventional stereoscopic display (FIG. 2(b)), use of the embodiment for near convergence and accommodation (FIG. 2(c)), and use of the embodiment for far convergence and accommodation (FIG. 2(d)).
Figure 2B:
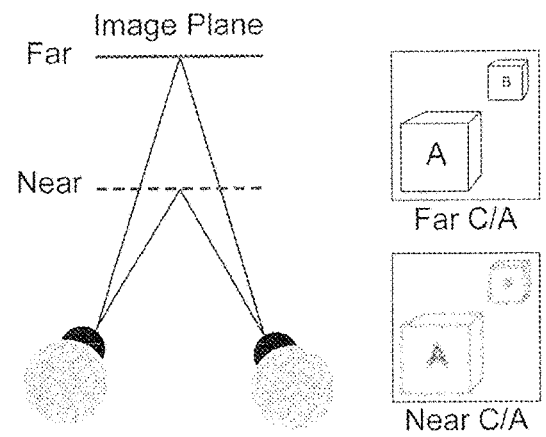
Figure 2C:
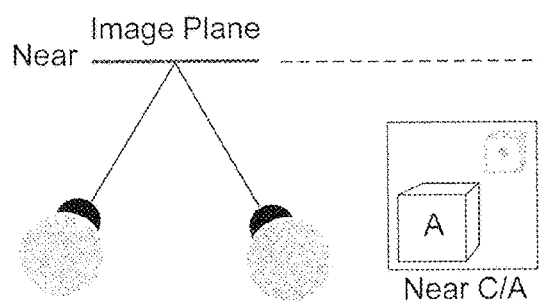
Figure 2D:
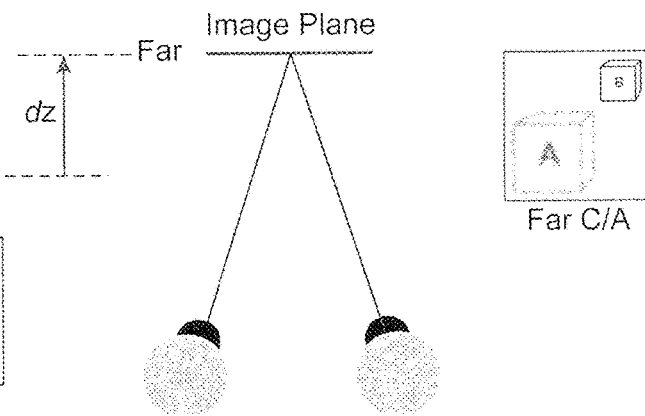
Figure 2E:
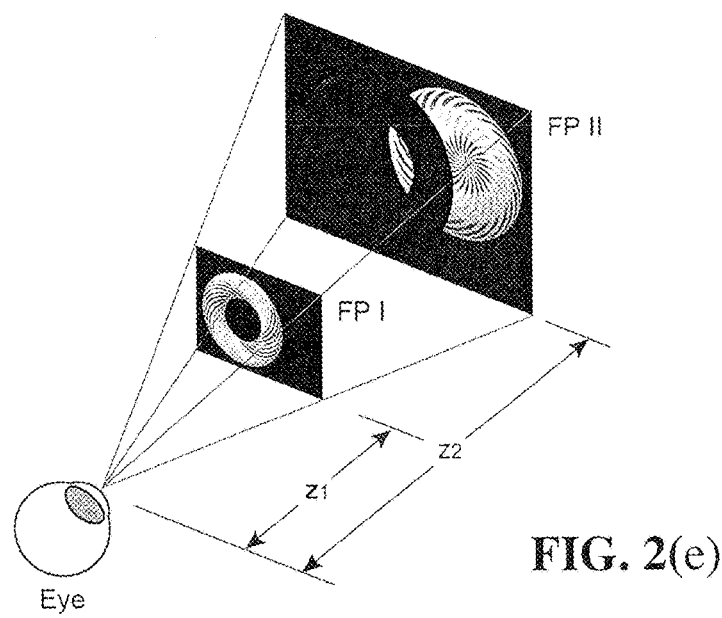
FIG. 2(e) is a perspective depiction of operation in a multi-focal-plane mode. In this example, there are two selectable focal planes.

FIG. 2(e) is a perspective view of the display of this embodiment used in the multi-focal-plane mode, more specifically a dual-focal-plane mode. The liquid lens is switched between two discrete operating voltages to provide two focal planes FPI and FPII. The eye perceives these two focal planes at respective distances $z_1$ and $z_2$. The added images are similar to those shown in the insets in FIGS. 10(a) and 10(b), discussed later below.

In the multi-focal-plane mode, the dioptric spacing between adjacent focal planes and the overall range of accommodation cues can be controlled by changing the voltages applied to the liquid lens 14a. Switching among various multi-focal-plane settings, or between the variable-single-focal-plane mode and the multi-focal-plane mode, does not require any hardware modifications. These distinctive capabilities provide a flexible management of focus cues suited for a variety of applications, which may involve focal planes spanning a wide depth range or dense focal planes within a relatively smaller depth range for better accuracy.

Certain embodiments are operable in a mode that is essentially a combination of both operating modes summarized above.

Variable-Single-Focal-Plane Mode

Operating the system under the variable-single-focal-plane mode allows for the dynamic rendering of accommodation cues which may vary with the viewer's position of interest in the viewing volume. Operation in this mode usually requires some form of feedback and thus some form of feedback control. The feedback control need not be automatic. The feedback can be generated by a user using the display and responding to accommodation and/or convergence cues provided by the display and feeding back his responses using a user interface. Alternatively, the feedback can be produced using sensors producing data that are fed to a computer or processor controlling the display. A user interface also typically requires a computer or processor to interpret commands from the interface and produce corresponding address commands for the active-optical element.

In this mode the added-image source 12 produces a light pattern corresponding to a desired image to be added, as a virtual object, to the real-world view being produced by the display 10. Meanwhile, the voltage applied to the liquid lens 14a is dynamically adjusted to focus the added image of the light pattern at different focal distances, from infinity to as close as the near point of the eye, in the real-world view. This dynamic adjustment can be achieved using a "user interface," which in this context is a device manipulated by a user to produce and input data and/or commands to the display. An example command is the particular depth at which the user would like the added image placed in the real-world view. The image of the light pattern produced by the added-image source 12 is thus contributed, at the desired depth, to the view of the "real" world being provided by the display 10. Another user interface is a 3-D eye-tracker, for example, that is capable of tracking the convergence point of the left and right eyes in 3-D space. A hand-held device offers easy and robust control of slowly changing points of interest, but usually lacks the ability to respond to rapidly updating points of interest at a pace comparable to the speed of moderate eye movements. An eye-tracker interface, which may be applicable for images of virtual objects graphically rendered with the depth-of-field effects, enables synchronous action between the focus cues of the virtual images and the viewer's eye movements. In various experiments we adopted a hand-held device, e.g., "SpaceTraveler" (3 DConnexion, Inc., Fremont, Calif.) for manipulating accommodation cues of the display in 3-D space.

The variable-single-focal-plane mode meets specific application needs, such as substantially matching the accommodation cues of virtual and real objects in mixed and augmented realities being perceived by the user of the display. The accommodation and/or focus cues can be pre-programmed, if desired, to animate the virtual object to move in 3-D space, as perceived by the user.

To demonstrate the addressability of focus cues in the variable-single-focal-plane mode, three bar-type resolution targets were placed along the visual axis of an actually constructed display. The targets served as references to the virtual image with variable focus cues. As shown on the left side of each sub-image in FIGS. 5(a)-5(c), the bar targets were placed at 16 cm (largest target), 33 cm (mid-sized target), and 100 cm (smallest target), respectively, away from the exit pupil of the display (i.e., the eye position). The periods of the bar targets were inversely proportional to their respective distances from the eye so that the subtended angular resolution of the grating remained constant among all targets. A digital camcorder, with which the images in FIGS. 5(a)-5(d) were obtained, was situated at the eye position.

The added-image source 12 was addressed to produce an image of a torus and to place the image of the torus successively, at a constant rate of change, along the visual axis of the display at 16 cm, 33 cm, and 100 cm from the eye, or in reverse order. Meanwhile, the voltage applied to the liquid lens 14a was changed synchronously with the rate of change of the distance of the virtual torus from the eye. By varying the voltage between 38 $V_{rms}$ and 49 $V_{rms}$, the accommodation cue of the displayed torus image was varied correspondingly from 6 diopters to 1 diopter.

Figures 5A, 5B, 5C:
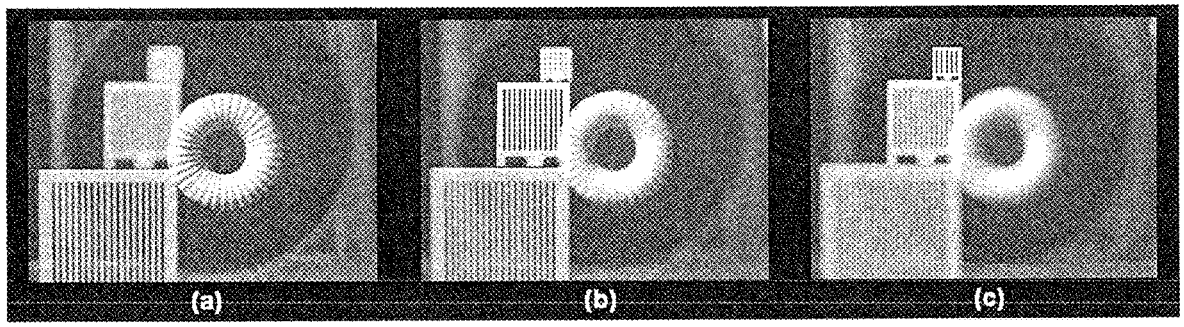
FIGS. 5(a)-5(c) are respective images captured by a camcorder fitted to a display operating in the variable-single-focus-plane mode, showing the change in focus of a virtual torus achieved by changing the voltage applied to the liquid lens.

Meanwhile, the digital camcorder captured the images shown in FIGS. 5(a)-5(c). Comparing these figures, the virtual torus in FIG. 5(a) only appears in focus whenever the voltage applied to the liquid lens was 38 $V_{rms}$ (note, the camcorder in FIG. 5(a) was constantly focused at 16 cm, or 6 diopters, distance). Similarly, the virtual torus in each of FIGS. 5(b) and 5(c) only appears in focus whenever the driving voltage was 45 $V_{rms}$ and 49 $V_{rms}$, respectively. These images clearly demonstrate the change of accommodation cue provided by the virtual object.

Figure 6A:
FIGS. 6(a)-6(d) are respective images of a simple mixed-reality application of a display operating in the variable-single-focus-plane mode. Sharp images of the COKE can (virtual object) and coffee cup (real world) were obtained whenever the accommodation cue was matched to actual distance (rendered "depth" of the can is 40 cm in FIGS. 6(a) and 6(b) and 100 cm in FIGS. 6(c) and 6(d)), and the camera obtaining the images was focused at 40 cm in FIGS. 6(a) and 6(d) and at 100 cm in FIGS. 6(b) and 6(c).
Figure 6B:
Figure 6C:
Figure 6D:
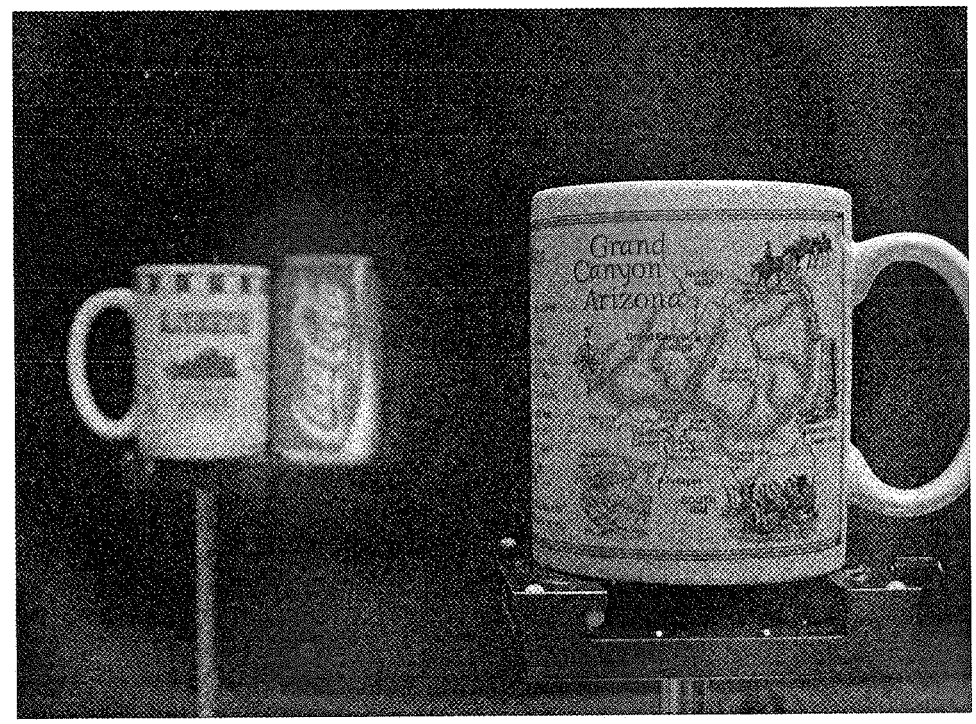

FIGS. 6(a)-6(d) shows a simple mixed-reality application in the variable-single-focal-plane mode. The real scene is of two actual coffee mugs, one located 40 cm from the viewer and the other located 100 cm from the viewer (exit pupil). The virtual image was of a COKE® can rendered at two different depths, 40 cm and 100 cm, respectively. A digital camera placed at the exit pupil served as the "eye." In FIG. 6(a) the digital camera was focused on the mug at 40 cm while the liquid lens was driven (at 49 $V_{rms}$) to render the can at a matching depth of 40 cm. Whenever the accommodation cue was matched to actual distance, a sharp image of the can was perceived. In FIG. 6(b) the digital camera was focused on the mug at 100 cm while the liquid lens was driven (at 49 $V_{rms}$) to render the can at a depth of 40 cm. The resulting mismatch of accommodation cue to actual distance produced a blurred image of the can. In FIG. 6(c) the camera was focused on the mug at 100 cm while the liquid lens was driven (at 46 $V_{rms}$) to render the can at a depth of 100 cm. The resulting match of accommodation cue to actual distance yielded a sharp image of the can. In FIG. 6(d) the camera was focused on the mug at 40 cm while the liquid lens was driven (at 46 $V_{rms}$) to render the can at a depth of 100 cm. The resulting mismatch of accommodation cue to actual distance produced a blurred image of the can. Thus, by applying 46 $V_{rms}$ or 49 $V_{rms}$, respectively, to the liquid lens, the virtual image of the COKE can appeared realistically (in good focus) with the two mugs at a near and far distance, respectively. In this example, while a user is interacting with the virtual object, the focusing cue may be dynamically modified to match its physical distance to the user, yielding a realistic augmentation of a virtual object or scene with a real scene. Thus, accurate depth perceptions are produced in an augmented reality application.

A series of focus cues can be pre-preprogrammed to animate a virtual object in the real-world view to move smoothly in the view in three-dimensional space.

Multi-Focal-Plane Mode

Although the variable-single-focal-plane mode is a useful mode for many applications, the multi-focal-plane mode addresses needs for a true 3-D display, in which depth perceptions are not limited by a single or a variable focal plane that may need an eye tracker or the like to track a viewer's point of interest in a dynamic manner. In other words, the multi-focal-plane mode can be used without the need for feedback or feedback control. Compared to the volumetric displays, a display operating in the multi-focal-plane mode balances accuracy of depth perception, practicability for device implementation, and accessibility to computational resources and graphics-rendering techniques.

In the multi-focal-plane mode, the liquid lens 14a is rapidly switched among multiple selectable driving voltages to provide multiple respective focal distances, such as I" and II" in FIG. 1, in a time-sequential manner. Synchronously with switching of the focal-plane, the pattern produced by the added-image source 12 is updated ("refreshed") as required to render respective virtual objects at distances approximately matched to the respective accommodation cues being provided by the display, as produced by the liquid lens 14a. The faster the response speed of the liquid lens 14a and the higher the refresh rate of the added-image source 12, the greater the number of focal planes that can be presented per unit time. The presentation rate of focal planes can be sufficiently fast to avoid flicker. In the multi-focal-plane mode, the dioptric spacing between adjacent focal planes and the overall range of accommodation cue can be controlled by changing the respective voltages applied to the liquid lens 14a. This distinctive capability enables the flexible management of accommodation cues as required by a variety of applications requiring either focal planes spanning a wide depth range or dense focal planes within a relatively smaller depth range for better accuracy.

Use of the display in the time-multiplexed multi-focal-plane mode is made possible, for example, by using the liquid lens 14a as an active-optical element to control the accommodation cue. There are a few major differences between this mode as used with certain of the displays described herein versus the conventional retinal scanning display (RSD) technique. Firstly, the subject embodiments of the display 10 use a liquid lens 14a (a refractive active-optical element), rather than a reflective DMM device. Use of the liquid lens 14a provides a compact and practical display without compromising the range of accommodation cues. Secondly, instead of addressing each pixel individually by a laser-scanning mechanism as in the RSD technique, the subject embodiments use a 2-D added-image source 12 to generate and present high-resolution, images (typically in full color) in a time-sequential, image-by-image manner to respective focal planes. Consequently, the subject embodiments do not require the very high addressing speed (at the MHz level) conventionally required to render images pixel-by-pixel. Rather, the addressing speeds of the added-image source 12 and of the active-optical element 14a are substantially reduced to, e.g., the 100-Hz level. In contrast, the pixel-sequential rendering approach used in a conventional RSD system requires MHz operation speeds for both the DMM device and the mechanism for scanning multiple laser beams.

Figure 7A:
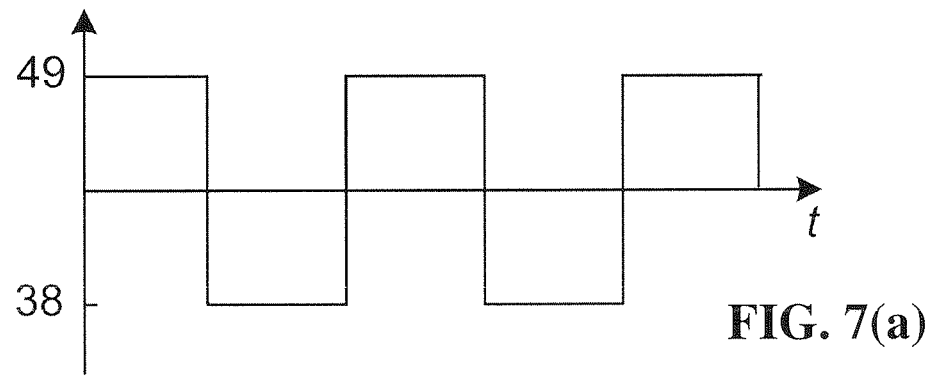
FIGS. 7(a)-7(b) are plots of a square-wave signal for driving the liquid lens of a display operating in the multi-focal-plane mode (FIG. 7(a)) and the resulting rendering of the virtual object (FIG. 7(b)). In this example, the liquid lens is fast-switched between two selected driving voltages as separate image frames are displayed sequentially in a synchronous manner.
Figure 7B:
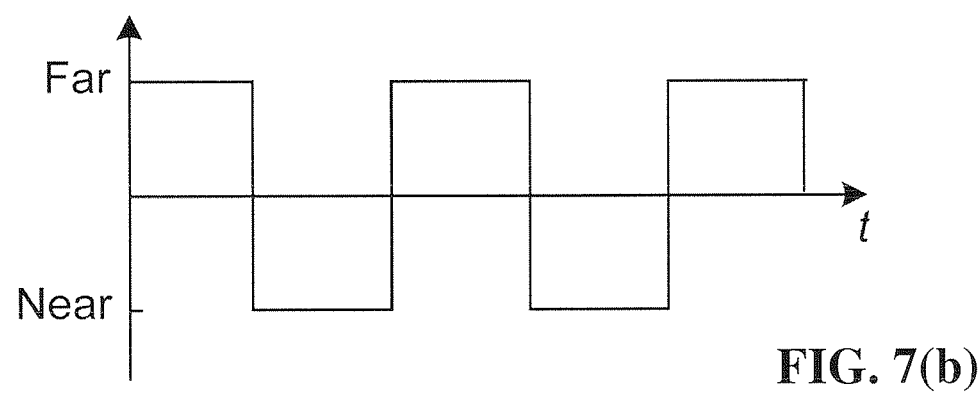

For an example display in a dual-focal-plane mode (as an example of a multi-focal-plane mode), the driving signal of the liquid lens 14a and an exemplary manner of driving the production of virtual objects are shown in FIGS. 7(a) and 7(b), respectively. Differently from the variable-single-focal-plane mode, in this mode the liquid lens 14a is fast-switched between two selected driving voltages, as shown in FIG. 7(a). Thus, the accommodation cue provided by the display 10 is consequently fast-switched between selected far and near distances. In synchrony with the signal driving the liquid lens 14a, far and near virtual objects are rendered on two or more separate image frames and displayed sequentially, as shown in FIG. 7(b). The two or more image frames can be separated from each other by one or more "blank" frames. If the switching rate is sufficiently rapid to eliminate "flicker," the blank frames are not significantly perceived. To create a substantially flicker-free appearance of the virtual objects rendered sequentially at the two depths, the added-image source 12 and graphics electronics driving it desirably have frame rates that are at least two-times higher than their regular counterparts. Also, the liquid lens 14a desirably has a compatible response speed. In general, the maximally achievable frame rate, $f_N$, of a display 10 operating in the multi-focal-plane mode is given by:

$$f_N = \frac{f_{min}}{N} \qquad (2)$$

where N is the total number of focal planes and $f_{min}$ is the lowest response speed (in Hz) among the added-image source 12, the active-optical element 14a, and the electronics driving these components. The waveforms in FIGS. 7(a)-7(b) reflect operation of all these elements at ideal speed.

Example 2

In this example, the liquid lens 14a (Varioptic "Arctic 320") was driven by a square wave oscillating between 49 $V_{rms}$ and 38 $V_{rms}$, respectively. Meanwhile, the accommodation cue provided by the display 10 was fast-switched between the depths of 100 cm and 16 cm. The period, T, of the driving signal was adjustable in the image-rendering program. Ideally, T should be set to match the response speed of the slowest component in the display 10, which determines the frame rate of the display operating in the dual-focal-plane mode. For example, if T is set at 200 ms, matching the speed ($f_{min}$) of the slowest component in the display 10, the speed of the display will be 5 Hz, and the virtual objects at the two depths will appear alternatingly to a user of the display. If T is set at 20 ms (50 Hz) faster than the slowest component (in one example the highest refresh rate of the electronics driving the added-image source 12 is 75 Hz), then the virtual objects will be rendered at a speed of about $f_{min}/2=37.5$ Hz. In another example, the control electronics driving the liquid lens 14a allows for a high-speed operational mode, in which the driving voltage is updated every 600 μs to drive the liquid lens. The response speed of this liquid lens 14a (shown in FIG. 8 as the curve formed with diamond-shaped markers) is approximately 75 ms. The maximum refresh rate of the added-image source 12 is 85 Hz and of the electronics driving it is 75 Hz. Hence, in this example the speed at which the liquid lens 14a can be driven is the limiting factor regarding the speed of the display 10.

Figure 8:
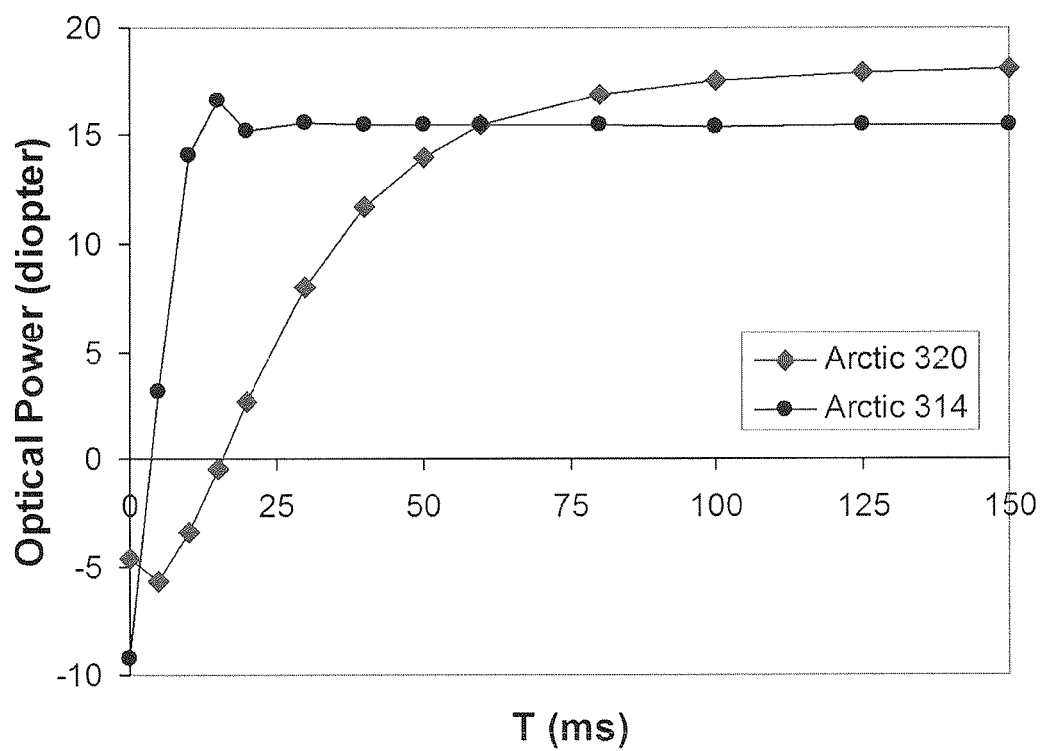
FIG. 8 is a plot of the time response of two liquid lenses.

This is shown in Table 1. In the left-hand column of Table 1, potential limiting factors to the maximum speed of the display operating in a dual-focal-plane mode are listed, including the liquid lens 14a, the added-image source 12, and the driving electronics ("graphics card"). For example, if the particular liquid lens 14a used in the display 10 is the "Arctic 320", then the maximum achievable frame rate in the dual-focal-plane mode is 7 Hz. A more recent type of liquid lens, namely the "Arctic 314" from Varioptic, has a purported 5-10 times faster response speed than the Arctic 320. In FIG. 8, the curve of data indicated by circles indicates a 9-ms rise-time of the Arctic 314 to reach 90% of its maximum optical power. With this liquid lens, the highest achievable frequency of the display operating in the dual-focal-plane mode would be 56 Hz if the liquid lens were the limiting factor of speed in the display. This frame rate is almost at the flicker-free frequency of 60 Hz.

TABLE 1

| Limiting Factor | Hardware Speed (ms) | Max. Display Speed (Hz) |
|---|---|---|
| Liquid Lens, Arctic 320 | 74 | 7 |
| Graphics Card, 75 Hz | 13.3 | 37.5 |
| OLED Micro-display, 85 Hz | 11.8 | 42.5 |
| Liquid Lens, Arctic 314 | 9 | 56 |
| Flicker-Free Frequency | 8.4 | 60 |

Second Representative Embodiment; Example 3

A display 30 according to this embodiment and example comprised a faster liquid lens 34a than used in the first embodiment. Specifically, the faster liquid lens 34a was the "Arctic 314" manufactured by Varioptic, Inc. This liquid lens 34a had a response speed of about 9 ms, which allowed the frame rate of the display 30 (operating in dual-focal-plane mode) to be increased to 37.5 Hz. Referring to FIG. 9(a), the display 30 (only the respective portion, termed a "monocular" portion, for one eye is shown; a binocular display would include two monocular portions for stereoscopic viewing) also included a spherical concave mirror 38, a 2-D added-image source 32, and a beam-splitter (BS) 36.

An alternative object-rendering scheme was used in this embodiment and example to reduce artifacts and further improve the accuracy of the convergence cues produced by the display 30. The liquid lens 34a had a clear aperture of 2.5 mm rather than the 3-mm clear aperture of the liquid lens 14a. To compensate for the reduced clear aperture, certain modifications were made. As shown in FIG. 9(a), the liquid lens 34a was offset from the center of the radius of curvature O of the mirror 38 by $\Delta$, thus the exit pupil of the display 30 was magnified by $$m_p = \frac{R}{R + 2\Delta}$$

to the size of the clear aperture of the liquid lens 34a. The focus cue is specified by the distance z from the virtual image to the exit pupil of the display 30, given as:

$$z = \frac{-R(u + \Delta + u\Delta\phi)}{2(u + \Delta + u\Delta\phi) + R(1 + u\phi)} + \frac{\Delta R}{R + 2\Delta} \quad (3)$$

The liquid lens 34a had a variable optical power ranging from −5 to +20 diopters by applying an AC voltage, ranging from 32 $V_{rms}$ to 60 $V_{rms}$, respectively. The other optical components (e.g., the beam-splitter 36 and singlet objective lens 34b) were as used in Example 1. The axial distance t between the objective lens 34b and the liquid lens 34a was 6 mm, the offset $\Delta$ was 6 mm, and the object distance (−u) was 34 mm. With these parameters, the display 30 exhibited a 24° diagonal field-of-view (FOV) with an exit pupil of 3 mm. A comparison of the Arctic 314 and Arctic 320 lenses is shown in Table 2.

TABLE 2

| Parameter | ARCTIC 320 | ARCTIC 314 |
|---|---|---|
| Applied voltage | 0-60 $V_{rms}$ | 0-60 $V_{rms}$ |
| Optical Power | −5D~20D | −5D~20D |
| Effective aperture | 3.0 mm | 2.5 mm |
| Response time | 75 msec (90% rise time) | 9 msec (90% rise time) |
| Operate wavelength | Visible | Visible |
| Linear range | 38~49 $V_{rms}$ | 38~49 $V_{rms}$ |
| Drive Freq. | 1 kHz | 1 kHz |
| Wavefront distort. | <0.5 μm | 80 nm (typ.) |
| Transmittance @ 587 nm | >90% rms | >97% rms |

Given the dependence of the optical power $\Phi$ upon the voltage U applied to the liquid lens 34a, FIG. 9(b) is a plot of the focus cue (z) as a function of the voltage U applied to the liquid lens (the focus cue was calculated per Eq. (3)). To produce a substantially flicker-free appearance of 3-D virtual objects rendered sequentially on multiple focal planes, the speed requirements for the liquid lens 34a, of the 2-D added-image source 32, and of the driving electronics ("graphics card") were proportional to the number of focal planes. Thus, this example operated at up to 37.5 Hz, which is half the 75-Hz frame rate of the driving electronics. FIG. 9(b) suggests that the dual focal planes can be positioned as far as 0 diopter or as close as 8 diopters to the viewer by applying respective voltages ranging between 51 $V_{rms}$ and 32 $V_{rms}$, respectively, to the liquid lens 34a. For example, in one experimental demonstration, two time-multiplexed focal planes were positioned at 1 diopter and 6 diopters with application of 49 $V_{rms}$ and 37 $V_{rms}$, respectively, to the liquid lens 34a.

As illustrated in FIG. 10(a), the liquid lens 34a was driven by a square wave, with a period T of fast-switching between 49 $V_{rms}$ and 37 $V_{rms}$ to temporally multiplex the focal planes at 1 diopter and 6 diopters, respectively. In synchrony with energization of the liquid lens 34a, two frames of images (I and II), corresponding to far and near objects, respectively, were rendered and displayed sequentially as shown in FIG. 10(b). Correct occlusion can be portrayed by creating a stencil mask for near objects rendered on the frame II. As an example, frame I in FIG. 10(b) shows the superposition of a sphere and the mask for a torus in front of the sphere. In this rendering, the duration $t_0$ of both the far- and near-frames is one-half of the period T. The refresh rate of the display 30 is given as $f = 1/T = 1/(2\ t_0)$, which specifies the speed at which the far and near focal states are rendered. Limited by the 75-Hz frame rate of the electronics in this example, the minimum value of $t_0$ was 13.3 ms, and the highest refresh rate of the display was 37.5 Hz to complete the rendering of both far and near focal states. A depth-weighted blending algorithm can be used to improve the focus-cue accuracy for objects located between two adjacent focal planes.

Figure 11A:
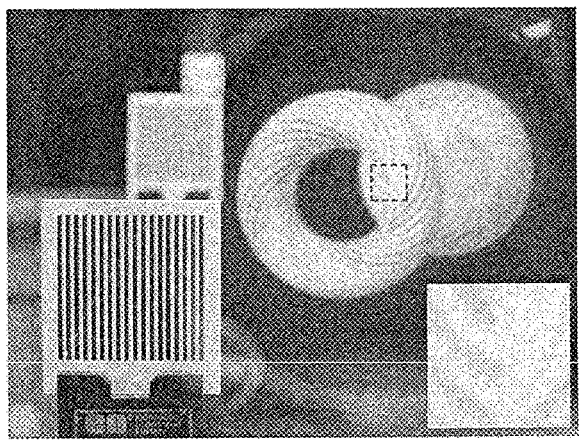
FIGS. 11(a) and 11(b) depict exemplary results of the display of the second representative embodiment operating at 37.5 Hz in the multi-focal-plane mode, according to the lens-driving scheme of FIGS. 10(a)-10(b).
Figure 11B:
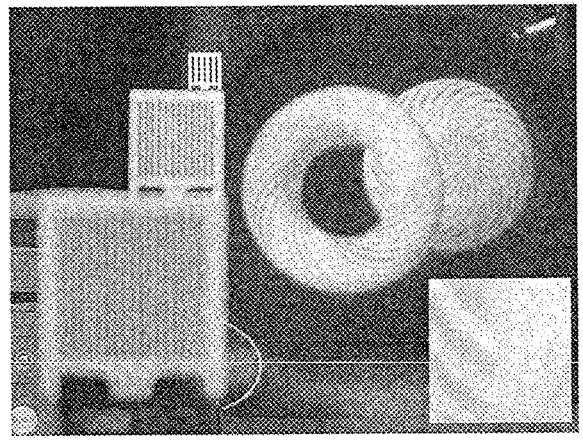

Using the lens-driving scheme of FIGS. 10(a) and 10(b), FIGS. 11(a) and 11(b) show experimental results produced by the display operating at 37.5 Hz in the multi-focal-plane mode. Three real bar-type resolution targets, shown on the left side of each of FIGS. 11(a)-11(d), were placed along the visual axis of the display. The targets at 6 diopters (large size) and 1 diopter (small size) were used as references for visualizing the focus cues rendered by the display. The target at 3 diopters (medium size) helped to visualize the transition of focus cues from far to near distances and vice versa. To obtain the respective picture shown in FIGS. 11(a)-11(d), a camera was mounted at the eye location shown in FIG. 9(a). Two virtual objects, a sphere and a torus, were rendered sequentially at 1 diopter and 6 diopters, respectively. As shown in FIG. 11(a), when the camera was focused on the bar target at 6 diopters, the torus (rendered at 6 D) appears to be in focus while the sphere shows noticeable out-of-focus blurring. FIG. 11(b) demonstrates a situation in which the camera was focused on the sphere at 1 diopter. The sphere appears to be in focus while the torus is not in focus. The virtual objects were animated in such a way that they both moved along the visual axis at a constant speed from either 6 diopters to 1 diopter, or vice versa. Synchronously, the voltage applied to the liquid lens 34a was adjusted accordingly such that the locations of the two focal planes always corresponded to the respective depths of the two objects. These results demonstrated correct correspondence of focus cues for the two virtual objects, matching with the focus-setting change of the camera.

In this example, since the response speed of the liquid lens 34a was about 9 ms, longitudinal shifts of the focal planes during the settling time of the liquid lens were expected as the driving signal was switched between the two voltages. This phenomenon can produce minor image blur and less than ideally accurate depth representations. A liquid lens (or other adaptive optical element) having a faster response speed can reduce these artifacts and render more accurate focus cues at high speed.

Experiments were also performed to investigate another scheme for image rendering. As shown in FIG. 10(c), a blank frame (having a duration $t_1$) was inserted to lead the rendering of each actual image frame (the duration of which being reduced to $t_2=t_0-t_1$) to maintain synchrony with the liquid lens 34a. Limited by the 75-Hz refresh rate of the graphics electronics, the minimum value for both $t_1$ and $t_2$ was 13.3 ms, and the highest refresh rate of the display 30 operating in the multi-focal-plane mode was $f=1/(2t_1+2t_2)=18.75$ Hz.

Figure 11C:
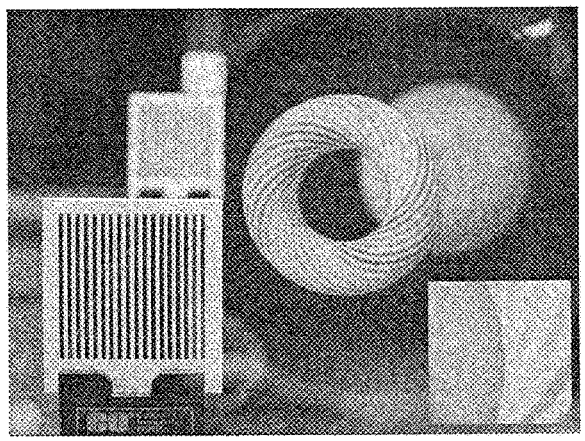
FIGS. 11(c) and 11(d) show operation of the display of the second representative embodiment according to the rendering scheme of FIG. 10(c), producing better focus cues.
Figure 11D:
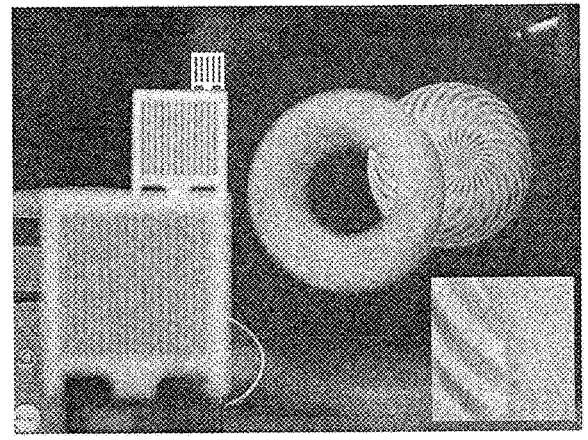

FIGS. 11(c) and 11(d) show operation of the display at near and far focus, respectively, using the rendering scheme of FIG. 10(c). Compared to FIGS. 11(a) and 11(b), the in-focus virtual objects in FIGS. 11(c) and 11(d) (i.e., the torus and the sphere, respectively) appear to be sharper than the out-of-focus objects (i.e., the sphere and the torus, respectively), matching well with the real reference targets at 1 diopter and 6 diopters. The insets of FIGS. 11(c) and 11(d), showing the same area as in FIG. 11(a), demonstrated improved focus cues. Furthermore, the occlusion cue became more prominent than shown in FIGS. 11(a) and 11(b), with a sharper boundary between the near torus and far sphere.

Due to the shortened duration of image frames, brightness level may be correspondingly lower, as quantified by:

$$B = \frac{t_2}{t_1 + t_2} \quad (4)$$

If $t_1=t_2=13.3$ ms, the relative brightness level in FIGS. 11(c) and 11(d) is B=0.5, which is half the brightness of FIGS. 11(a) and 11(b), with B=1. Another possible artifact is flicker which was more noticeable 18.75 Hz than at 37.5 Hz.

A faster liquid lens and/or added-image source and higher-speed driving electronics are beneficial for producing accurate focus cues at a substantially flicker-free rate. For less flicker the liquid lens can be driven in an overshoot manner with decreased time-to-depth-of-field in an auto-focusing imaging system. Other active-optical technologies, such as high-speed DMM and liquid-crystal lenses, could also be used in the time-multiplexed multi-focal-plane mode to reduce flicker.

In any event, by using a faster active-optical element, a display operating in the time-multiplexed multi-focal-plane mode was produced and operated in this example. The display was capable of rendering nearly correct focus cues and other depth cues such as occlusion and shading, and the focus cues were presentable within a wide range, from infinity to as close as 8 diopters.

We compared the effects of two rendering schemes having respective refresh rates; the first scheme having a higher refresh rate (e.g., f=37.5 Hz) and producing a brighter image (B=1.0) but with reduced image sharpness and focus-cue accuracy due to the limited response speed of the liquid lens, and the second scheme producing sharper images and more accurate focus cues but with compromised speed (e.g., f=18.75 Hz) and image brightness (B=0.5) due to the limited frame rate of the driving electronics.

Third Representative Embodiment

This embodiment is directed to a display that is gaze-contingent and that is capable of rendering nearly correct focus cues in real-time for the attended region of interest. The display addresses accommodation cues produced in the variable-single-focal-plane mode in synchrony with the graphical rendering of retinal blur cues and tracking of the convergence distance of the eye.

This embodiment is termed herein a "variable-focus gaze-contingent display" (VF-GCD). It can produce improved focus-cue presentation and better matching of accommodation and convergence in the single-variable-focal-plane. Thus, this embodiment utilizes a display operating in the variable-single-focal-plane mode and provides integrated convergence tracking to provide accurate rendering of real-time focus cues. Unlike conventional stereoscopic displays, which typically fix the distance of the focal plane in the visual space, the VF-GCD automatically tracks the viewer's current 3-D point-of-gaze (POG) and adjusts the focal plane of the display to match the viewer's current convergence distance in real-time. (In contrast, a display operating in the variable-single-focal-plane mode with user interface typically has a delay in feedback produced by the user mentally processing feedback information and utilizing that information in responding to accommodation and/or convergence cues.) Also, in contrast to volumetric displays that typically render the entire 3-D scene as a discretized space of voxels, the VF-GCD renders the projected 2-D image of the 3-D scene onto moving image planes, thereby significantly improving the rendering efficiency as well as taking full advantage of commercially available graphics electronics for rendering focus cues.

This embodiment incorporates three principles for rendering nearly correct focus cues: addressable accommodation cues, convergence tracking, and real-time rendering of retinal blur cues. Reference is made again to FIGS. 2(a)-2(d), discussed above.

By passively involving the viewer (user) for feedback purposes, the VF-GCD forms a closed-loop system that can respond in real-time to user feedback in the form of convergent or divergent eye rotations. See FIG. 12. In particular, by tracking the viewer's 3-D POG, the convergence distance can be computed, so that the accommodation cue rendered by the display can be matched accordingly. This tracking can be performed using an "eye-tracker" which obtains useful information from the subject's gaze. Likewise, the scene elements can be rendered with appropriately simulated DOF effects using the graphics electronics. The combination of eye-tracking together with an addressable active-optical element and DOF rendering provides visual feedback to the viewer in the form of updated focus cues, thereby closing the system in a feedback sense.

In this embodiment the focal plane moves in three dimensions, matching with the convergence depth of the viewer. In practice, the addressable accommodation cue is realized by an active-optical element having variable optical power. From a practical standpoint, the active-optical element should satisfy the following conditions: (1) It should provide a variable range of optical power that is compatible with the accommodative range of the human eye. (2) It should be optically conjugate to the entrance pupil of the viewer, making the display appearing to have a fixed FOV that is independent of focus changes. (3) It should have a response speed that substantially matches the speed of rapid eye movements.

The display of this embodiment comprises a liquid lens (Arctic 314 made by Varioptic), which has a variable optical power ranging from −5 diopters (−5 D) (1 diopter=1/meter) to 20 D, a clear aperture of −3 mm, and a response speed of about 10 msec.

To maintain proper focus cues, the VF-GCD computes changes in the viewer's convergence distance using a binocular eye-tracking system adapted from a pair of 2-D monocular eye-trackers. In general, current monocular eye-trackers utilize one or more of non-imaging-based tracking, image-based tracking, and model-based tracking methods. Among the image-based tracking methods, dark-pupil tracking is generally regarded as the simplest and most robust.

Figure 12:
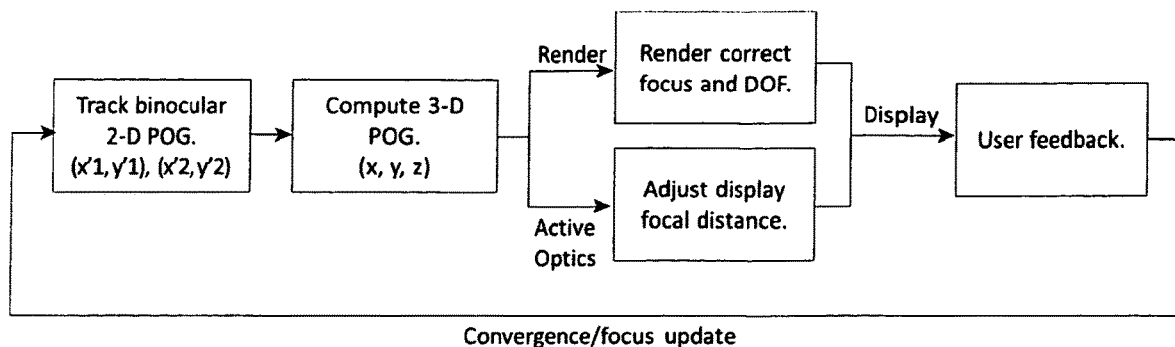
FIG. 12 is a control diagram of a variable-focus gaze-contingent display including real-time POG (point of gaze) tracking and DOF (depth of focus) rendering, in the third representative embodiment operating in the single-variable-focal-plane mode.
Figure 13:
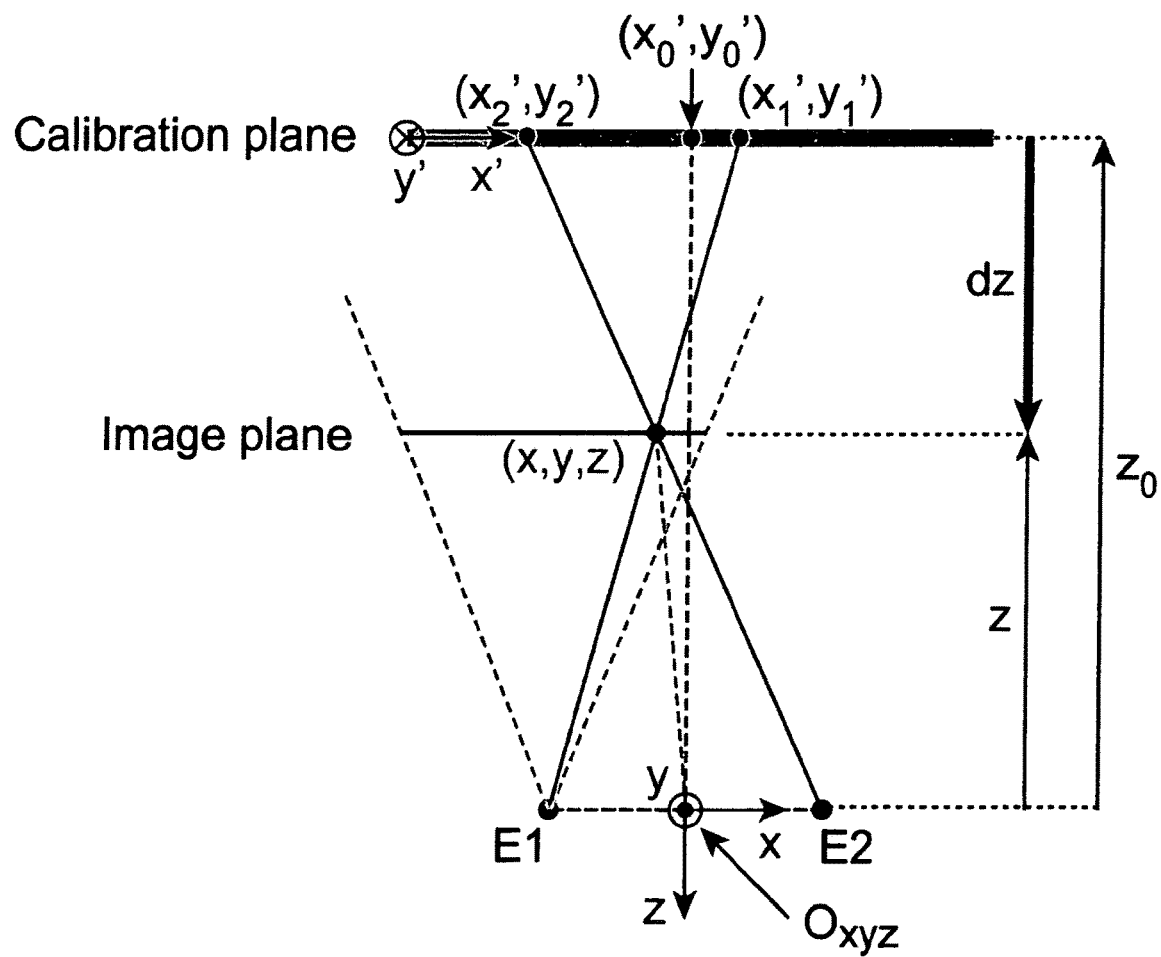
FIG. 13 is a schematic diagram of the eye-tracking as used in the third representative embodiment, wherein a pair of monocular trackers was used to triangulate the convergence point using respective lines of sight of a user's eyes.

To compute the viewer's convergence distance in 3-D space, a pair of monocular trackers was used to triangulate the convergence point using the lines of sight of both eyes, as shown in FIG. 13. Using multi-points calibration, the 2-D gaze points $(x_1', y_1')$ and $(x_2', y_2')$ for left (E1) and right (E2) eyes, respectively, are determined in the local coordinate system of a calibration plane (bold grey line in FIG. 12) at an established distance $z_0$ from the eye in 3-D space. The frame of reference of the 3-D space has its origin $O_{xyz}$, located at the mid-point between the eyes. By using the relative position $(x_0', y_0')$, which is the orthogonal projection of the world origin onto the calibration plane, the points $(x_i', y_i')$ may be transformed into their world-space correspondences $(x_i, y_i, z_0)$ so that the convergence point $(x, y, z)$ is given by:

$$\begin{cases} z = \dfrac{IPD}{IPD + x_1 - x_2} z_0 \\ x = \dfrac{x_1 + x_2}{2} \dfrac{z}{z_0} \\ y = \dfrac{y_1 + y_2}{2} \dfrac{z}{z_0} \end{cases} \quad (5)$$

where IPD is the inter-pupillary distance of the viewer. As shown in FIG. 13, as the eye-tracker tracks the 3-D POG in real-time, the convergence distance z is updated for the display optics and the image-rendering system, such that the image plane is translated to the same depth z for the presentation of the correct accommodation cue.

The VF-GCD also desirably includes an image-rendering system capable of simulating real-time retinal blur effects, which is commonly referred to as "DOF rendering." Depth-of-field effects improve the photo-realistic appearance of a 3-D scene by simulating a thin-lens camera model with a finite aperture, thereby inducing a circle of confusion into the rendered image for virtual objects outside the focal plane. Virtual scenes rendered with DOF effects provide a more realistic appearance of the scene than images rendered with the more typical pinhole-camera model and can potentially reduce visual artifacts. Real-time DOF has particular relevance in the VF-GCD since the focal distance of the display changes following the convergence distance of the viewer. Maintaining the expected blurring cues is thus important to preventing depth confusion as the viewer browses objects at varying depths in the scene.

Figure 14A:
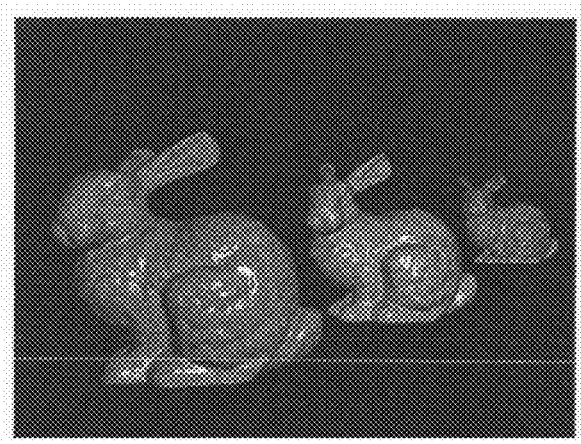
FIGS. 14(a)-14(f) are example results obtained with the third representative embodiment configured as a VF-GCD (variable-focus gaze-contingent display).
Figure 14B:
Figure 14C:
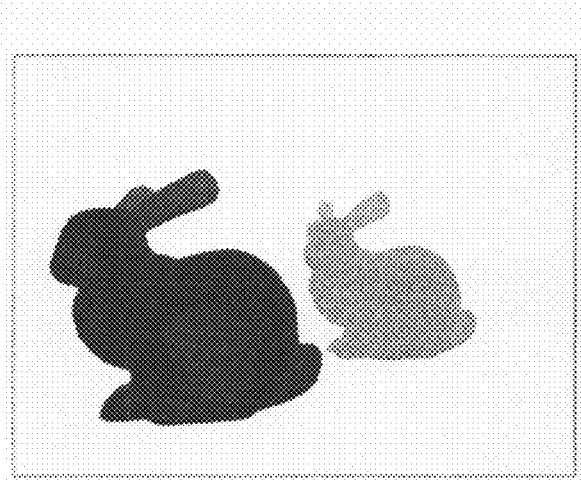
Figure 14D:
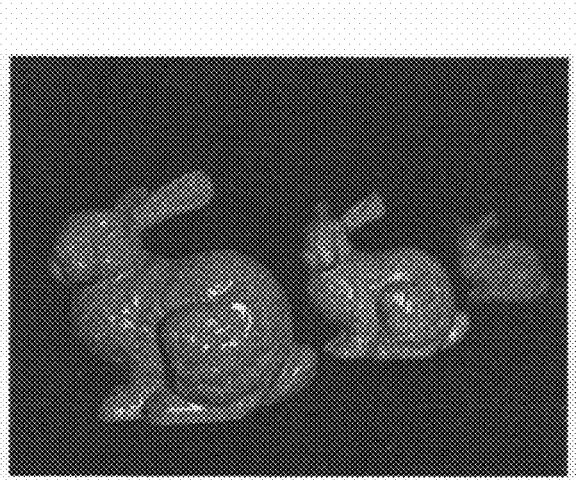
Figure 14E:
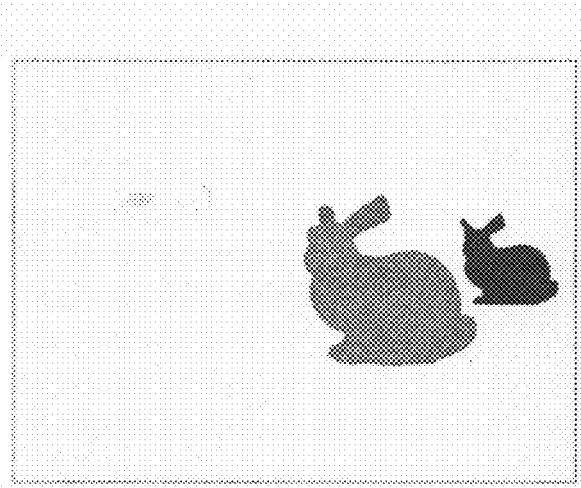
Figure 14F:
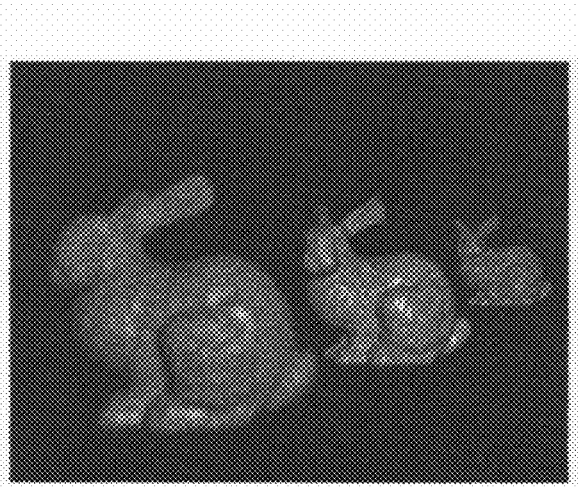

Graphically rendering DOF effects can be done in any of several ways that differ from one another significantly in their rendering accuracy and speed. For instance, ray-tracing and accumulation-buffer methods provide good visual results on rendered blur cues but are typically not feasible for real-time systems. Single-layer and multiple-layer post-processing methods tend to yield acceptable real-time performance with somewhat lesser visual accuracy. The latter methods are made computationally feasible due to the highly parallel nature of their algorithms; this feasibility is suitable for implementation on currently available high-performance graphics processing units (GPUs). We used a single-layer post-processing DOF method. To illustrate this DOF algorithm, note the rabbits rendered in FIGS. 14(a)-14(f). Nearly correct retinal blur cues can be derived by blending the image rendered by the pinhole camera model (FIG. 14(a)) with another down-sampled and post-blurred image (FIG. 14(b)) using a depth map (also known as a degree-of-blur map; FIGS. 14(c) and 14(e)) to weight the relative contributions of each image, formulated as $I'=I_0+(I_0-I_1) \times DOB$. The final blended images are given in FIGS. 14(d) and 14(f) for the eyes converging at 3 D and 1 D, respectively.

A key component of the DOF algorithm is the computation of the DOB (depth of blur) map, which is used for weighted blending of the pin-hole and blurred images. The DOB map is created by normalizing the depth values Z', which are retrieved from the z-buffer for the image, with respect to the viewer's current convergence distance Z given by the binocular eye-tracker:

$$DOB = \left| \dfrac{z' - z}{z_{near} - z_{far}} \right|, Z_{far} \le Z', Z \le Z_{near} \quad (6)$$

where $Z_{near}$ and $Z_{far}$ indicate the nearest and furthest depths, respectively, of the rendered 3-D space from the viewer's eyes. Note that all distances expressed in capital letters in Eq. (6) are defined in dioptric rather than Euclidian space. Taking FIG. 14(c) as an example, when the eye is focused at near distance of $Z=Z_{near}=3$ D, the rabbit at $Z'=3$ D appears totally black (indicating zero blur), while the rabbit at $Z'=1$ D appears to be white, indicating maximum blur.

We constructed a VF-GCD comprising a variable-focus display, convergence tracking, and real-time DOF rendering. The optical path for the VF-GCD was arranged perpendicularly, mainly due to ergonomic reasons, to prevent the spherical mirror from blocking the center FOV of both eyes. The key element for controlling focal distance in real-time was a liquid lens, which was coupled to an imaging lens to provide variable and sufficient optical power. The entrance pupil of the viewer was optically conjugate with the aperture of the liquid lens. As a result, without affecting the size of the FOV, the focus adjustment of the eye was optically compensated by the optical power change of the liquid lens, thus forming a closed-loop control system as shown in FIG. 12. In addition, two commercial eye-trackers (Viewpoint, Arlington Research, Inc.) were attached to the VF-GCD, one for each eye, by setting up two near-infrared (NIR) cameras, with NIR LED illumination attached to each camera. The NIR camera as a pixel resolution of 640×480 pixels at 30 frames per second (fps), which is capable of tracking 2-D POG in real-time.

Figure 15A:
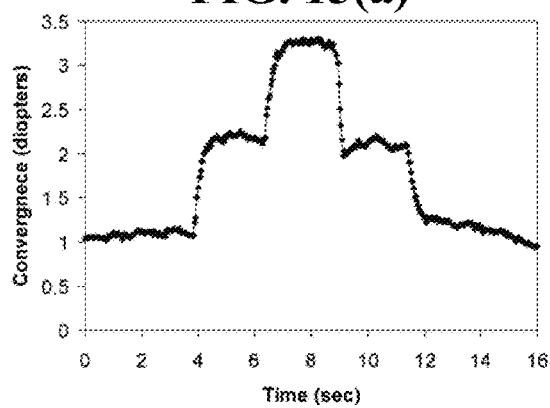
FIGS. 15(a)-15(d) are example results obtained with the third representative embodiment configured as a VC-GCD.
Figure 15B:
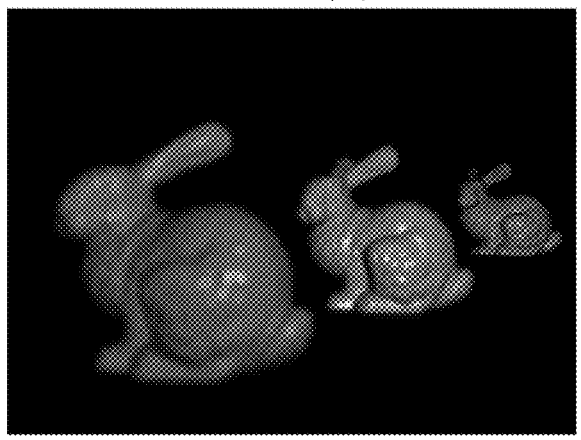
Figure 15C:
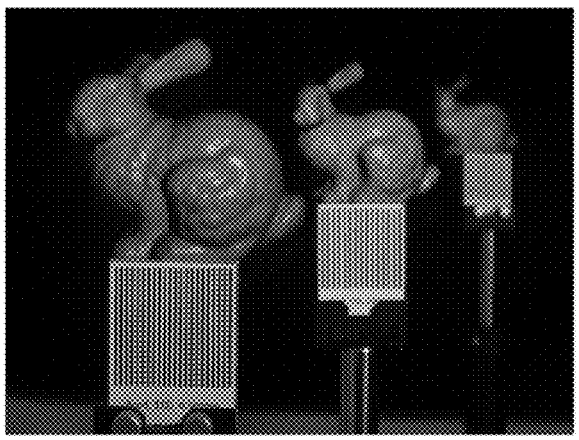
Figure 15D:
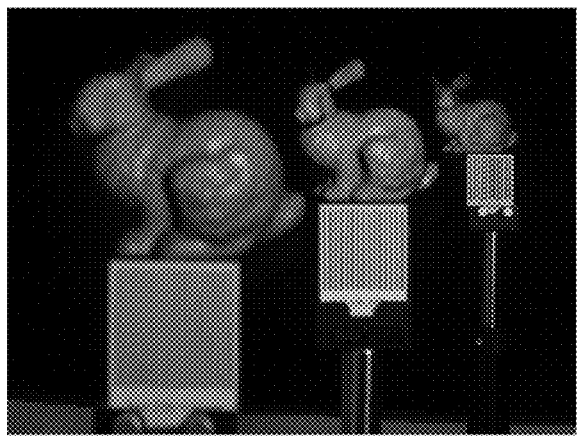

The capability of the VF-GCD was demonstrated in an experiment as outlined in FIGS. 15(a)-15(d). To stimulate convergence changes by the viewer, three bar-type resolution targets were arranged along the visual axis of the VF-GCD at 3-D, 2-D, and 1-D, respectively. Three rabbits were graphically rendered at these corresponding locations, as shown in FIGS. 15(c) and 15(d). During the experiment, the viewer alternatingly changed his focus from far (1 D) to near (3 D) distances and then from near to far. FIG. 15(a) shows the real-time tracking result on the convergence distance of the viewer, versus time. As shown in FIG. 15(a), the eye-tracked convergence distances approximately matched the distances of the real targets. (Any slight mismatch may be explained in part by the about 0.6 D depth-of-field of the eyes.) FIG. 15(b) shows the synthetic-focus-cues effects in the VF-GCD. Similar to the images shown in FIGS. 14(a)-14(f), as the eye was focused at the far distance 1 D, the rabbit at the corresponding distance was sharply and clearly rendered while the other two rabbits (at 2 D and 3 D, respectively) were out of focus and hence proportionately blurred with respect to the defocused distance from 1 D; vice versa when the eye was focused at either 2 D or 3 D. The rendering program ran on a desk-top computer equipped with a 3.20 GHz Intel Pentium 4 CPU and a Geforce 8600 GS graphics card, which maintained a frame rate of 37.6 fps for rendering retinal blur cues.

FIGS. 15(c) and 15(d) provide further comparison of the addressable focus cues rendered by the VF-GCD against the focus cues of real-world targets. A digital camera was disposed at the exit-pupil location of the VF-GCD. The camera was set at f/4.8, thereby approximately matching the speed of the human eye. As shown in FIG. 15(c), when the observer focused at the near distance 3 D, the rabbit at 3 D was rendered sharply and clearly while the rabbits at 2 D and 1 D were blurred. Meanwhile, the focal distance of the VF-GCD was adjusted to 3 D using the liquid lens, thereby matching with the viewer's convergence distance (and vice versa in FIG. 15(d)) as the viewer focused at 1 D. The images in FIGS. 15(c) and 15(d) simulate the retinal images of looking through the VF-GCD at different convergence conditions. The virtual rabbits located at three discrete depths demonstrated nearly correct focus cues similar to those of the real resolution targets. The results indicated a viewing situation with the VF-GCD that was analogous to the real-world, with nearly correct focus cues being rendered interactively by the display hardware (i.e., liquid lens) and software (i.e., graphics card).

This embodiment is directed to a variable-focus gaze-contingent display that is capable of rendering nearly correct focus cues of a volumetric space in real-time and in a closed-loop manner. Compared to a conventional stereoscopic display, the VF-GCD provided rendered focus cues more accurately, with reduced visual artifacts such as the conflict between convergence and accommodation. Compared to conventional volumetric displays, the VF-GCD was much simpler and conserved hardware and computational resources.

Although this embodiment and example were described in the context of a monocular system, the embodiment encompasses corresponding binocular systems that can provide both binocular and monocular depth cues.

Fourth Representative Embodiment

This embodiment is directed to the multi-focal-plane mode that operates in a so-called "depth fused" manner. A large number of focal planes and small dioptric spacings between them are desirable for improving image quality and reducing perceptual effects in the multi-focal-plane mode. But, to keep the number of focal planes to a manageable level, a depth-weighted blending technique can be implemented. This technique can lead to a "depth-fused 3-D" (DFD) perception, in which two overlapped images displayed at two different respective depths may be perceived as a single-depth image. The luminance ratio between the two images may be modulated to change the perceived depth of the fused image. The DFD effect can be incorporated into the multi-focal-plane mode. Another concern addressed by this embodiment is the choice of diopter spacing between adjacent focal planes.

In this embodiment a systematic approach is utilized to address these issues. It is based on quantitative evaluation of the modulation transfer functions (MTF) of DFD images formed on the retina. The embodiment also takes into account most of the ocular factors, such as pupil size, monochromatic and chromatic aberrations, diffraction, Stiles-Crawford effect (SCE), and accommodation; and also takes into account certain display factors, such as dioptric midpoint, dioptric spacing, depth filter, and spatial frequency of the target. Based on the MTFs of the retinal images of the display and the depth of field (DOF) of the human visual system under photopic viewing conditions, the optimal arrangement of focal planes was determined, and the depth-weighted fusing function between adjacent focal planes was characterized.

Figure 16:
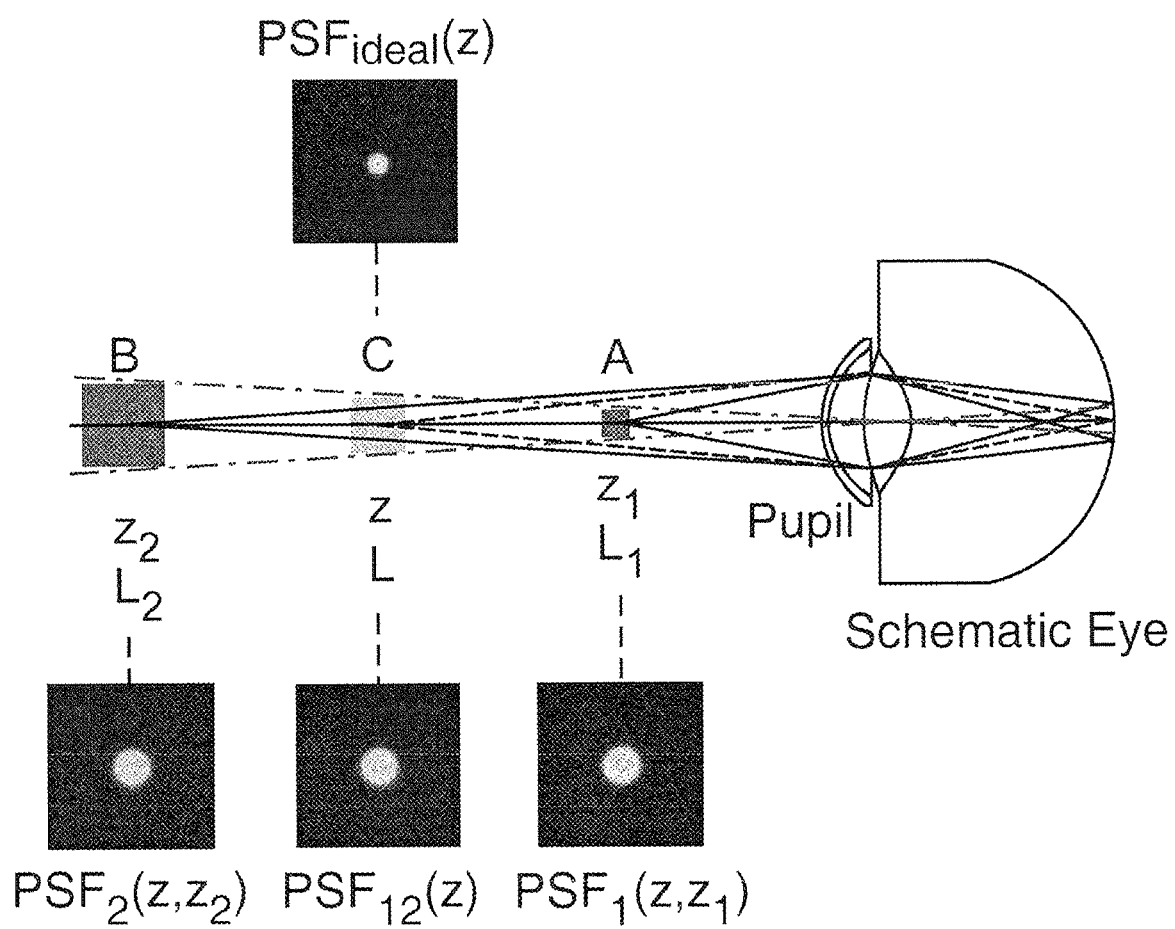
FIG. 16 is a schematic diagram of a depth-fused display operating in the multi-focal-plane mode, as described in the fourth representative embodiment. Pixels on the front (A) and back (B) focal planes are located at $z_1$ and $z_2$, respectively, from the eye, and the fused pixel (C) is located at z ($z_2<z<z_1$). All distances are in dioptric units.

FIG. 16 illustrates the depth-fusion concept of two images displayed on two adjacent focal planes separated by a dioptric distance of $\Delta z$. The dioptric distance from the eye to the front focal plane is $z_1$ and to the rear plane is $z_2$. When the images shown on the two-layer displays are aligned such that each pixel on the front and rear planes subtends the same visual angle to the eye, the front and back pixels (e.g., A and B, respectively) are viewed as completely overlapped at the viewpoint and fused as a single pixel (e.g., C). The luminance of the fused pixel (L) is summed from the front and rear pixels ($L_1$ and $L_2$, respectively), and the luminance distribution between the front and back pixels is weighted by the rendered depth z of the fused pixel. These relationships may be expressed as:

$$L = L_1(z) + L_2(z) = w_1(z)L + w_2(z)L \quad (7)$$

where $w_1(z)$ and $w_2(z)$ are the depth-weighted fusing functions modulating the luminance of the front and back focal planes, respectively. Typically, $w_1(z) + w_2(z) = 1$ is enforced such that the luminance of the fused pixel is $L_1$ when $w_1(z)=1$ and is $L_2$ when $w_2(z)=1$. We hereafter assume the peak luminance of individual focal planes is normalized to be uniform, without considering system-specific optical losses potentially in some forms of multi-focal plane displays (e.g., in spatially multiplexed displays where light may be projected through a thick stack of display panels). Optical losses of a system should be characterized to normalize non-uniformity across the viewing volume before applying depth-weighted fusing functions.

The depth-fused 3-D perception effect indicates that, as the depth-weighted fusing functions ($w_1$ and $w_2$) change, the perceived depth $\hat{z}$ of the fused pixel will change accordingly. This is formulated as:

$$\hat{z} = f(w_1, w_2) \quad (8)$$

For instance, when $w_1(z)=1$, the perceived depth should be $z_1$, and should be $z_2$ when $w_2(z)=1$. In a generalized n-focal plane DFD system, the dioptric distances from the eye to the n focal planes are denoted as $z_1, z_2, \ldots, z_n$ in distance order, where $z_1$ is the closest one to the eye. We assume that the 3-D scenes contained between a pair of adjacent focal planes are rendered only on this corresponding focal plane pair. Under this assumption, a given focal plane at $z_i$ will render all the 3-D scenes contained between the $(I-1)^{th}$ and the $(I+1)^{th}$ focal planes. Within the depth range of $z_{i-1} \geq z \geq z_{i+1}$, many scene points may be projected onto the same pixel of the $i^{th}$ focal plane, among which only the closest scene point to the eye is un-occluded and thus effectively determines the depth-weighted fusing function modulating the luminance of the specific pixel.

The closest scene point corresponding to a specific pixel can typically be retrieved from the z-buffer in a computer graphics renderer. Let us assume the depth of the closest 3-D scene point projected onto a given pixel of the $i^{th}$ focal plane is z. Based on the depth-fused 3-D perception described above, the luminance of the 3-D point is distributed between the $(I-1)^{th}$ and $i^{th}$ focal planes if $z_{i-1} \geq z \geq z_i$, otherwise between the $i^{th}$ and $(I+1)^{th}$ focal planes if $z_i \geq z \geq z_{i+1}$. The luminance attribution to the $i^{th}$ focal plane is weighted by the depth z. It may be characterized by the ratio of the luminance attribution $L_i(z)$ on the $i^{th}$ focal plane at $z_i$ to that of the total scene luminance $L(z)$, written as $g_i(z) = L_i(z)/L(z)$, where $L(z) = L_{i-1}(z) + L_i(z)$ if $z_{i-1} \geq z \geq z_i$ or $L(z) = L_i(z) + L_{i+1}(z)$ if $z_i \geq z \geq z_{i+1}$. In general, the depth-weighted fusing function, $w_1(z)$, of the $i^{th}$ focal plane can be defined as:

$$w_i(z) = \begin{cases} g_i(z), & z_i \geq z \geq z_{i+1}. \quad (1 \leq i < n) \\ 1 - g_{i-1}(z), & z_{i-1} \geq z \geq z_i. \quad (2 \leq i \leq n) \end{cases} \quad (9)$$

In summary, by knowing the rendered depth z of a 3-D virtual scene, the luminance levels of the multi-focal plane images can be modulated accordingly by the depth-weighted fusing functions in Eq. (9) to render pseudo-correct focus cues.

In displays comprising DFD operability, the adjacent focal planes are separated in space at a considerable distance. The retinal image quality is expected to worsen when the eye is accommodated at a distance in between the front and back focal planes than when focusing on the front or back focal planes. However, both the dioptric spacing between adjacent focal planes and the depth-weighted fusing functions can be selected such that the perceived depth of the fused pixel $\hat{z}$ closely matches with the rendered depth z and the image quality degradation is minimally perceptible as the observer accommodates to different distances between the focal planes.

The optical quality of a fused pixel in DFD displays may be quantitatively measured by the point spread function (PSF) of the retinal image, or equivalently by the modulation transfer function (MTF), which is characterized by the ratio of the contrast modulation of the retinal image to that of a sinusoidal object on the 3-D display. Without loss of generality, hereafter a dual-focal plane display is assumed and the results therewith can be extended to n focal planes. Based on Eq. (7), when the eye is accommodated at the rendered distance z, the PSF of the fused pixel, $PSF_{12}$, may be described as:

$$PSF_{12}(z) = w_1(z)PSF_1(z,z_1) + w_2(z)PSF_2(z,z_2) \quad (10)$$

where $PSF_1(z,z_1)$ and $PSF_2(z,z_2)$ are the point spread functions of the front and back pixels, respectively, corresponding to the eye accommodated distance z. The MTF of a DFD display can then be calculated via the Fourier Transform (FT) of the $PSF_{12}$ and subsequently the FT of the $PSF_1$ and $PSF_2$.

Multiple factors may affect the retinal image quality—$PSF_{12}$ and $MTF_{12}$—of a DFD display. Table 3 categorizes the parameters, along with their notation and typical range, into two types: ocular and display factors. Ocular factors are mostly related to the human visual system when viewing DFD images from a viewer's perspective. These variables, including pupil size, pupil apodization, reference wavelength, and accommodation state, should be carefully considered when modeling the eye optics. Display factors are related to the practical configuration of the display with DFD operability, such as the covered depth range, dioptric midpoint of two adjacent focal planes to the eye, dioptric spacing between two adjacent focal planes, depth-weighted fusing functions, as well as the spatial frequency of a displayed target.

TABLE 3

| Type of Factors | Factors | Notation | Typical range |
|---|---|---|---|
| Ocular | Pupil diameter | D | 2 mm~8 mm |
| | Stiles-Crawford effect | B | −0.116 mm$^{-2}$ |
| | Reference wavelength | Λ | F (486.1 nm), d (587.6 nm), C (656.3 nm) |
| | Accommodation | Z | $z_{i+1} < z < z_i$ |
| Display | Focal range | $z_1$-$z_n$ | 3D |
| | Medial focus | $z_{i,i+1} = (z_i + z_{i+1})/2$ | 0D~3D |
| | Dioptric spacing | $\Delta z = z_i - z_{i+1}$ | 0D~1D |
| | Depth filter | $w_i, w_{i+1}$ | $0 \leq w_i, w_{i+1} \leq 1$ |
| | Target spatial frequency | V | 1 cpd~30 cpd |

Instead of using observer- and display-specific measurements to evaluate the PSF and MTF of DFD displays, we adopted a schematic Arizona eye model to simulate and analyze the retinal image quality from simulated targets to derive generalizable results. In the fields of optical design and ophthalmology, various schematic eye models have been widely used to predict the performance of an optical system involved with human subjects. In this study, the Arizona eye model was set up in CODE V. The Arizona eye model is designed to match clinical levels of aberration, both on- and off-axis fields, and can accommodate to different distances. The accommodative distance z, as shown in FIG. 16, determines the lens shape, conic constant, and refractive index of the surfaces in the schematic eye. The distances of the front and back focal planes, $z_1$ and $z_2$, respectively, and their spacing z are varied to simulate different display configurations.

Ocular characteristics of the HVS, such as depth of field, pupil size, diffraction, Stiles-Crawford effect, monochromatic and chromatic aberrations, and accommodation, play important roles on the perceived image quality of a DFD display. Although there have been investigations of image-quality dependence upon pupil size, high-order aberration, and accommodation, the treatment to the aforementioned factors lacks generality to average subjects and to a full-color DFD display with different display configurations. For instance, only monochromatic aberrations specific to one user's eye were considered and a linear depth-weighted fusing function was assumed.

To simulate the PSF/MTF of the retinal images accurately in a DFD display, we firstly examined the dependence of the polychromatic MTF of a fused pixel upon eye-pupil diameter while fixing other ocular and display factors. Particularly, we examined the MTFs under the condition that the luminance of a rendered pixel is equally distributed between the front and back focal planes separated by 0.5 D, and the eye is accommodated at the midpoint between the two focal planes. The midpoint is generally expected to have the worst retinal image quality for a fused pixel. Assuming the same pupil size, we further compared the MTFs of the fused pixel against that of a real pixel that is physically placed at the dioptric midpoint between the two focal planes. For pupil diameters no larger than 4 mm, we found the MTF differences of the fused pixel from a real pixel at the same distance is acceptable for spatial frequencies below 20 cpd, while a considerable degradation is observed for larger pupils. Therefore, we set the eye pupil diameter of the eye model to be 4 mm, which in fact corresponded well to the pupil size viewing conventional HMD-like displays. Secondly, to account for the directional sensitivity of photoreceptors on the human retina, which commonly refers to the Stiles-Crawford effect (SCE), a Gaussian apodization filter was applied to the entrance pupil with an amplitude transmittance coefficient of $\beta=-0.116$ mm$^{-2}$ Consequently, SCE may induce a slightly contracted effective pupil, and thus reduce spherical aberration and improve MTF.

Furthermore, the image source in the model was set up with polychromatic wavelengths, including F, d, and C components as listed in Table 3, to simulate a full-color DFD display. To compensate the longitudinal chromatic aberration (LCA) that commonly exists in human eyes, we inserted a zero optical power achromat at 15 mm from the cornea vertex with the LCA opposite to the Arizona eye model. In a practical DFD display, instead of inserting an achromat directly in front of the eye, the display optics may be optimized to have an equivalent chromatic aberration to compensate the LCA of the visual system. Finally, the effect of diffraction was accounted for in the modeling software (CODE V) while simulating PSFs. The effect of accommodation is discussed below with depth filters.

Based on the model setup described above, for a given eye accommodation status and display settings, $PSF_1(z,z_1)$ and $PSF_2(z,z_2)$ for an on-axis point source are simulated separately in CODE V. Using the relationship in Eq. (9), a series of $PSF_{12}(z)$ are computed by varying $w_1$ from 1 to 0, which corresponds to varying the rendered depth z from $z_1$ to $z_2$. The corresponding $MTF_{12}(z)$ of the DFD display is derived by taking the FT of $PSF_{12}$.

To evaluate the retinal image quality of a depth-fused pixel against a physical pixel placed at the same distance, we further simulated the PSF of a real point source placed at distance z, $PSF_{ideal}(z)$, and computed the corresponding $MTF_{ideal}(z)$. The degradation of $MTF_{12}(z)$ from $MTF_{ideal}(z)$ was expected to vary with the dioptric spacing of the two adjacent focal planes, rendered depth z, as well as eye-specific parameters. Through comprehensive analysis of the retinal image quality of the DFD display, threshold values were established to ensure the degradation from a real display condition was minimally perceptible to average subjects. Optimal depth-weighted fusing functions were then obtained.

As mentioned earlier, a fused pixel that is rendered to be at the dioptric midpoint of two adjacent focal planes was expected to have the worst retinal image quality compared with other points between the focal planes. Therefore, in the following analysis, we used the retinal image quality of a fused pixel rendered at the midpoint of two adjacent focal planes as a criterion for determining appropriate settings for display designs.

In this study to determine optimal dioptric spacing, the overall focal range of a DFD display covers the depth varying from 3 D ($z_1$) to 0 D ($z_n$). Within this range, we further assumed a constant dioptric spacing between two adjacent focal planes (e.g., $z_i$ and $z_{i+1}$) independent of the dioptric midpoint of the focal plane pair relative to the eye noted as $z_{i,i+1}=(z_i+z_{i+1})/2$ in Table 3. Using the simulation method described above, we validated this assumption by examining the dependence of the MTF of a fused pixel at the midpoint of two focal planes upon the dioptric distance of the midpoint to the eye while fixing other ocular and display factors (i.e., $w_1=w_2=0.5$, $\Delta z=0.5$ D, $z=z_{i,i+1}$). As expected the MTF of a fused pixel at the midpoint varies as the midpoint gets closer to the eye due to ocular aberrations being highly correlated to accommodation. However, the average variation is less than 15% for spatial frequencies below 20 cpd for $z_{i,i+1}$ within the 0 D~3 D range.

Figure 17A:
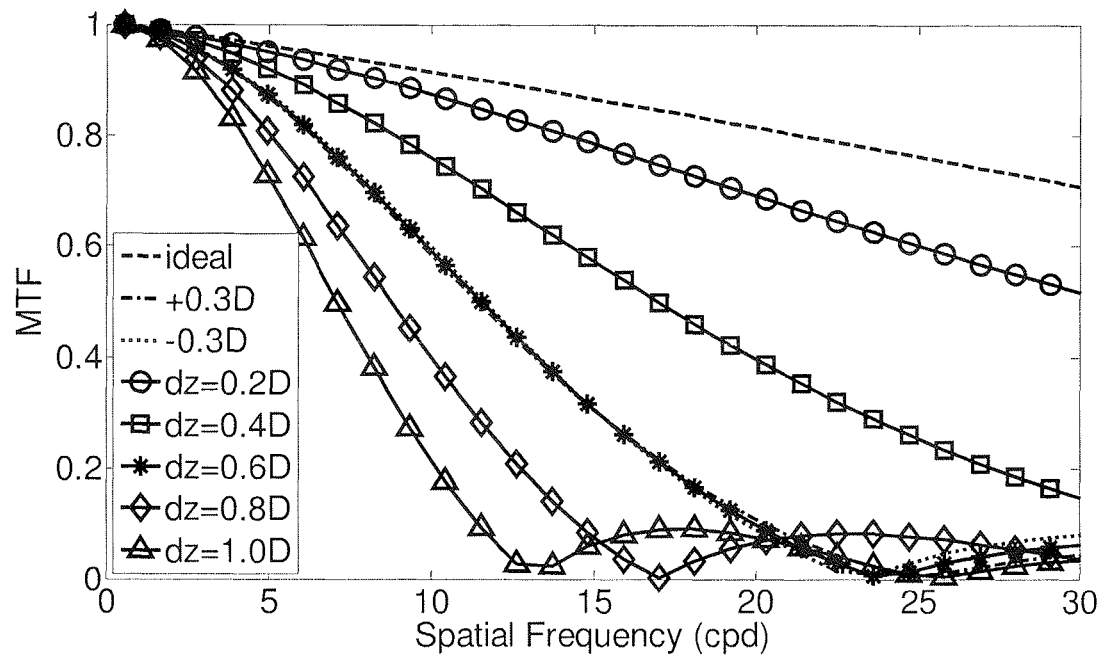
FIG. 17(a) is a plot of modulation transfer functions (MTF) of a depth-fused display (operating in the multi-focal-plane mode as described in the fourth representative embodiment) as a function of dioptric spacings of 0.2 D, 0.4 D, 0.6 D, 0.8 D, and 1.0 D. MTF of an ideal viewing condition is plotted as a dashed line. Also included are plots of defocused MTFs (+0.3 D) and (−0.3 D).

Under these assumptions, the effect of dioptric spacing on DFD displays can be evaluated by setting the midpoint of a pair of adjacent focal planes at an arbitrary position within the depth range without loss of generality. We thus chose 1 D as the midpoint of a focal-plane pair and varied their dioptric spacing $\Delta z$ from 0.2 D to 1 D at an interval of 0.2 D. For each dioptric spacing condition, the MTF of a fused pixel at the dioptric midpoint (i.e., $MTF_{12}$ $(z=z_{i,i+1})$) of the two focal planes was calculated with the assumption that the luminance level was evenly divided between front and back focal planes. FIG. 17(a) is a plot of the results corresponding to different dioptric spacings. For comparison, on the same figure are also plotted $MTF_{ideal}$, which corresponds to the MTF of a real pixel placed at the midpoint, and the $MTF_{+0.3D}$ and $MTF_{-0.3D}$, which correspond to the MTF of the eye model with +0.3 D and −0.3 D defocus from the midpoint focus, respectively. The ±0.3 D defocus was chosen to match the commonly accepted DOF of the human eye. As expected, $MTF_{12}$ consistently degraded with the increase of the spacing of the focal planes. However, when $\Delta z$ was no larger than 0.6 D, $MTF_{12}$ fell within the region enclosed by $MTF_{ideal}$ (green dashed line) and the ±0.3 D defocused MTFs (the overlapped blue and red dashed lines). The results indicated that the DOF of the human eye under photopic viewing conditions can be selected as the threshold value of the dioptric spacing in a display operating in the multi-focal-plane mode, which ensures the degradation of the retinal image quality of a DFD display from an ideal display condition is minimally perceptible to average subjects. If better retinal image quality is required for certain applications, a smaller $\Delta z$ may be used but at the expense of adding more focal planes. For instance, if $\Delta z=0.6$ D is selected, six focal planes would be sufficient to cover the depth range from 3.0 D to 0 D, while nine focal planes would be necessary to cover the same range if $\Delta z=0.4$ D were selected.

Figure 17B:
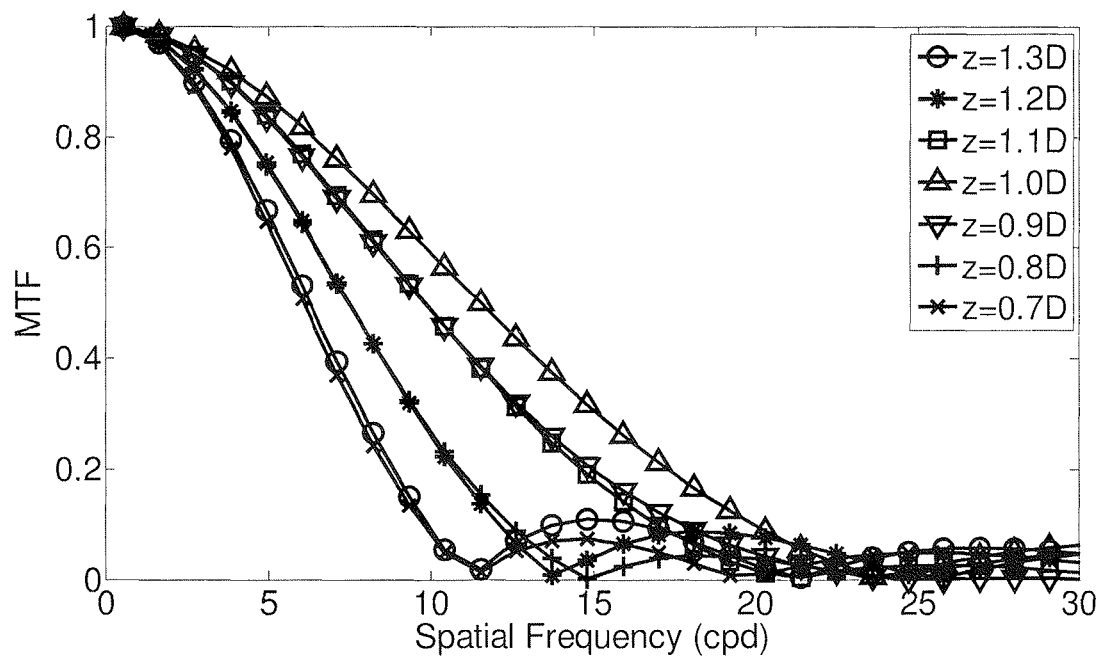
FIG. 17(b) is a plot of MTFs as a function of accommodations with z=1.3, 1.2, 1.1, 1.0, 0.9, 0.8, 0.7 D, obtained with the fourth representative embodiment. The medial focal plane is set up at 1 D and the luminance ratio is $L_1/L=0.5$.
Figure 18A:
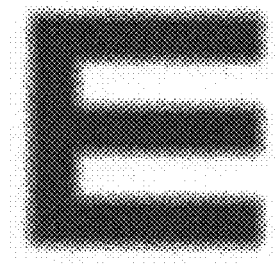
FIGS. 18(a)-18(l) are simulated retinal images of a Snellen E target in a display operated in the depth-fused multi-focal-plane mode, as described in the fourth representative embodiment, with $z_1=1.3$ D, $z_2=0.7$ D, and $w_1=0.5$. The accommodation distances are z=1.3 D in FIGS. 18(a), 18(d), 18(g), and 18(j); z=1.0 D in FIGS. 18(b), 18(e), 18(h), and 18(k); and z=0.7 D in FIGS. 18(c), 18(f), 18(i), and 18(l), respectively. The target spatial frequencies are v=2 cpd in FIGS. 18(a), 18(b), and 18(c); v=5 cpd in FIGS. 18(d), 18(e), and 18(f); v=10 cpd in FIGS. 18(g), 18(h), and 18(i); and v=30 cpd in FIGS. 18(j), 18(k), and 18(l), respectively. The sizes of the images are proportional to the relative sizes as viewed on the retina.
Figure 18B:
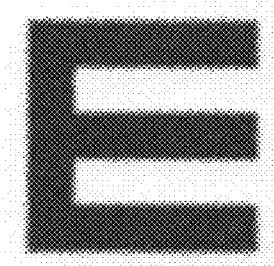
Figure 18C:
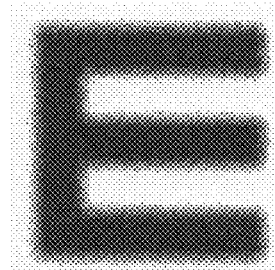
Figure 18D:
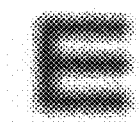
Figure 18E:
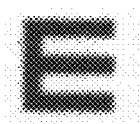
Figure 18F:
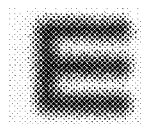
Figure 18G:
Figure 18H:
Figure 18I:
Figure 18J:
Figure 18K:
Figure 18L:

By setting a dioptric spacing of $\Delta z=0.6$ D and a dioptric midpoint of $z_{12}=1$ D from the eye, we further examined the MTF of a fused pixel while incrementally varying the eye accommodation distance from the front focal plane ($z_1=1.3$ D) to the back focal plane ($z_2=0.7$ D) at an increment of 0.1 D, as shown in FIG. 17(b). As expected, an accommodation distance at the dioptric midpoint ($z=z_{12}=1$ D) would maximize the MTF of the fused pixel, while shifting the accommodation distance toward either front or back focal planes will always decrease the MTF. For instance, the MTF values for a target spatial frequency of 10 cpd is reduced from 0.6 when $z=1$ D to nearly 0 when $z=1.3$ D or $z=0.7$ D. Past studies of the effects of stimulus contrast and contrast gradient on eye accommodation in viewing real-world scenes have suggested that the accommodative response attempts to maximize the contrast of the foveal retinal image, and the contrast gradient helps stabilize the accommodation fluctuation of the eye on the target of interest. Therefore, pseudo-correct focus cues can be generated at the dioptric midpoint by applying an appropriate depth-fusing filter even without a real focal plane.

To further demonstrate the pseudo-correct focus cues created using a DFD display, we configured a dual-focal plane display similarly to that used in the previous paragraph (i.e., $z_{12}=1$ D, and $\Delta z=0.6$ D). We simulated multiple retinal images of a Snellen E target by convolving the target with the $PSF_{12}(z)$ defined in Eq. (9), while the luminance of the target was evenly divided between the two focal planes (i.e. $w_1=w_2=0.5$). Thus, the fused target was expected to appear at the dioptric midpoint of the two focal planes. In FIG. 18, the left-to-right columns correspond to the eye accommodation distances of $z=1.3$, 1, and 0.7 D, respectively, while the top-to-bottom rows correspond to the target spatial frequencies of $v=2$, 5, 10, and 30 cpd, respectively. As predicted by the results in FIG. 17(b), the retinal image contrast was higher when the eye was focused at $z=1$ D rather than at either $z=z_1=1.3$ D or $z=z_2=0.7$ D. Meanwhile, at the same accommodation distance, the retinal-image contrast clearly depended on the spatial frequency of the target, where the targets with lower spatial frequencies (e.g., 2, 4, and 10 cpd) had better image contrast than the higher frequencies (e.g., v=30 cpd).

To derive the dependence of the rendered accommodation cue on the depth-weighted fusing function as described in Eq. (8), we extended the MTF simulation shown in FIG. 17(b) by incrementally varying $w_1$ from 1 to 0 at an increment of 0.01 while having $w_2=1-w_1$. For each $w_1$ increment, we simulated the $MTF_{12}$ of a fused pixel while incrementally varying the eye accommodation distance from the front focal plane ($z_1=1.3$ D) to the back focal plane ($z_2=0.7$ D) at an increment of 0.02 D. We selected the accommodation distance that maximizes the $MTF_{12}$ to be the rendered accommodation cue corresponding to the given depth-weighted fusing factor ($w_1$) of the front focal plane. The accumulated results yielded the optimal depth-weighted luminance ($L_1$ and $L_2$) of the front and back focal planes to the luminance of the fused target (L) as a function of the accommodation distance (z) for a focal-plane pair.

Figure 19:
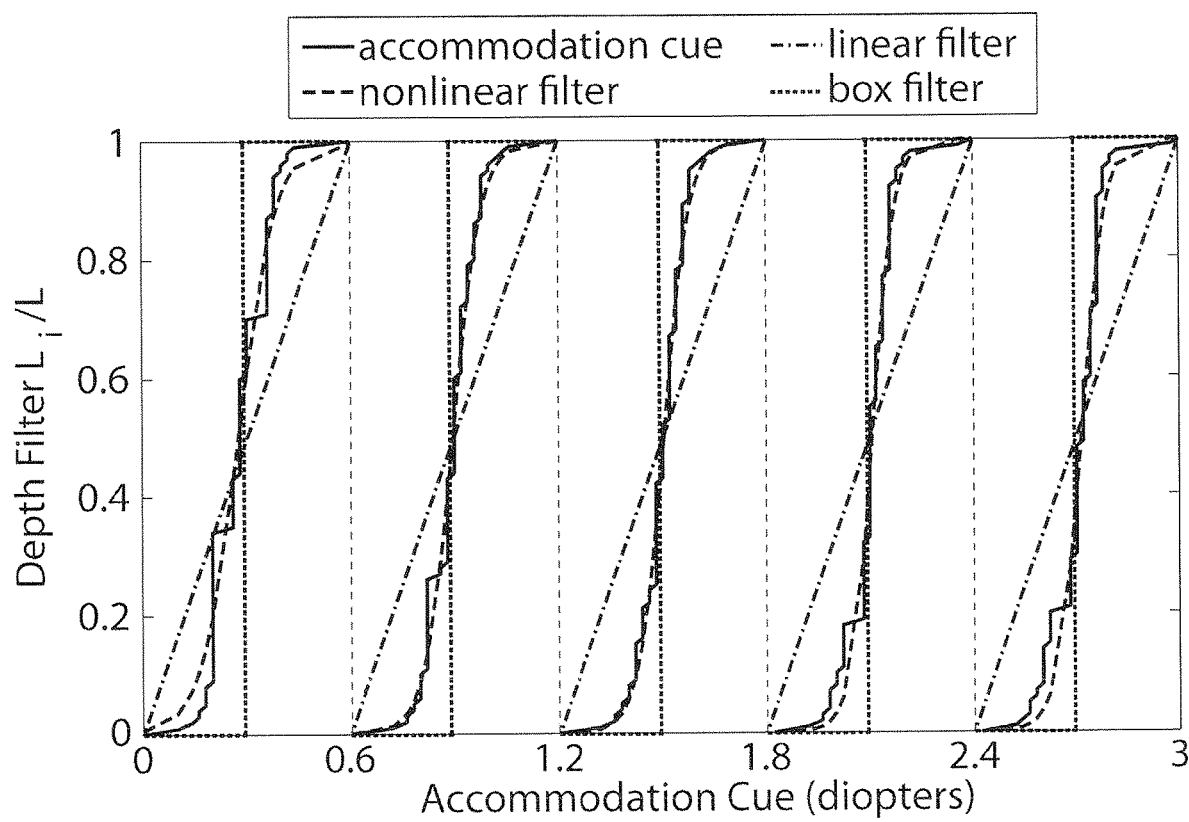
FIG. 19 provides plots of simulated filter curves of accommodation cue versus depth, obtained with the fourth representative embodiment. For a six-focal-plane display operating as a DFD, with $z_1=3$ D, $z_6=0$ D, and $\Delta z=0.6$ D.
Figure 20A:
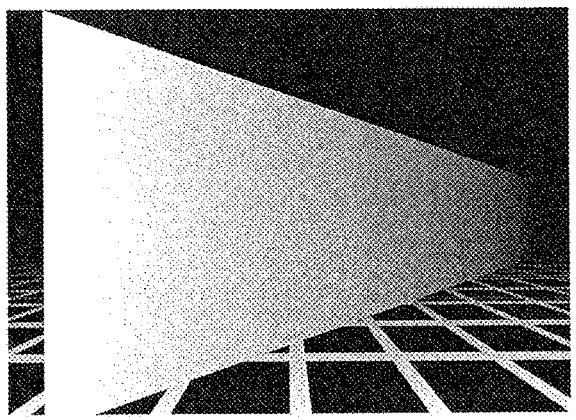
FIGS. 20(a)-20(d) show simulated retinal images, obtained as described in the fourth representative embodiment, of a 3-D scene through a six-focal-plane DFD display with depth-weighted non-linear fusing functions as given in Eq. (11), as well as the box filter (FIG. 20(b)), linear filter (FIG. 20(c)), and non-linear filter (FIG. 20(c)) shown in FIG. 19.
Figure 20B:
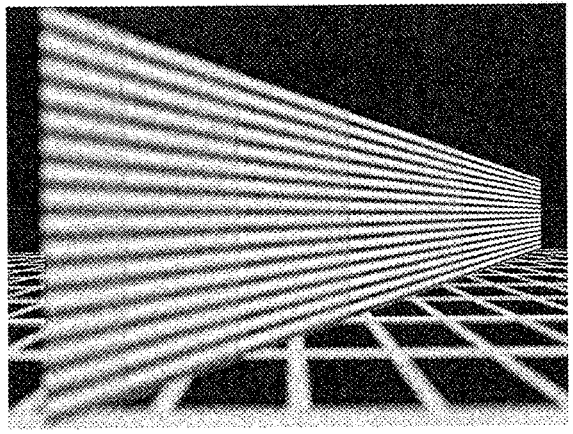
Figure 20C:
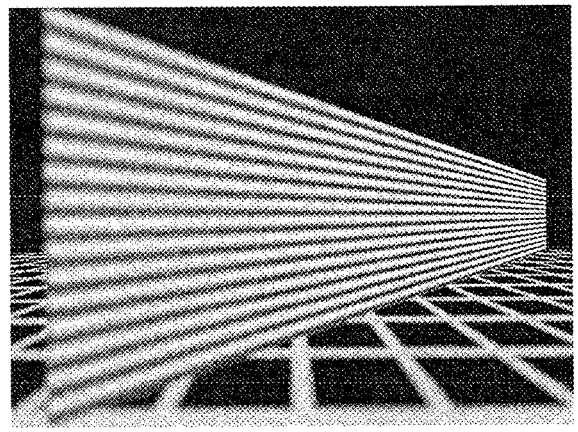
Figure 20D:
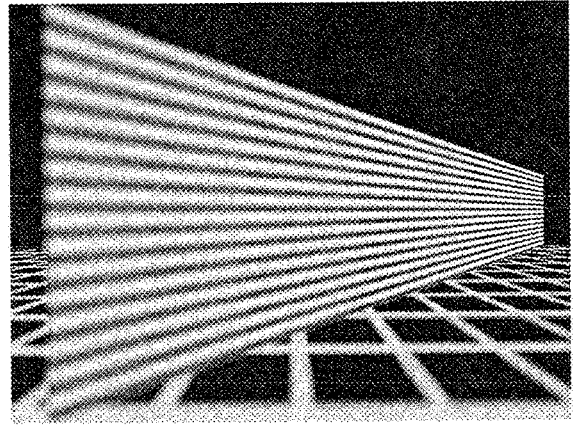

This evaluation can be extended to more than two focal planes covering a much larger depth range. As an example, we chose a 6-focal-plane DFD display covering a depth range from 3 D to 0 D. By assuming a 0.6 D dioptric spacing, six focal planes were placed at 3 D ($z_1$), 2.4 D ($z_2$), 1.8 D ($z_3$), 1.2 D ($z_4$), 0.6 D ($z_5$), and 0 D ($z_6$), respectively. In this display configuration, we repeated the above-described simulations independently to each adjacent pair of focal planes. The black solid curves in FIG. 19 are plots of the luminance ratio $g_i=L_i/L$ (i=1, 2, 3, 4, 5) of the front focal plane in each focal-plane pair of (i, i+1) as a function of the rendered accommodation cue z. Also plotted in the same figure is a typical box filter (blue dashed curves), which corresponds to multi-focal-plane displays in which depth-weighted fusing is not applied, and a linear depth-weighted filter (green dashed curves). The fusing functions based on the maximal $MTF_{12}$ values had some non-linearity. As mentioned above, since the retinal image quality is affected by defocus, the non-linearity could be due to the non-linear degradation of the retinal image quality with defocus.

Based on the simulated results shown in FIG. 19, a periodical function $g_i(z)$ can be used to describe the dependence of the luminance ratio of the front focal plane in a given pair of focal planes upon the scene depth:

$$g_i(z) = L_i(z)/L = 1 - \frac{1}{1 + \exp\left(\frac{z - z'_{i,i+1}}{\Delta z'}\right)}, \quad (11)$$

$$z_i \geq z \geq z_{i+1}. \quad (1 \leq i < 6)$$

where $z'_{i,i+1}$ represents the pseudo-correct accommodation cue rendered by a luminance ratio of $g_i(z=z'_{i,i+1})=0.5$, and $\Delta z'$ characterizes the nonlinearity of $g_i(z)$. Ideally, $z'_{i,i+1}$ is equal to the dioptric midpoint $z_{i,i+1}$. Table 4 lists detailed parameters of $g_i(z)$ for the six-focal-plane DFD display. As the distance of the focal planes from the eye increased from 2.7 D to 0.3 D, the difference between $z_{i,i+1}$ and $z'_{i,i+1}$ increased from −0.013 D to +0.024 D. The slight mismatch between $z'_{i,i+1}$ and $z_{i,i+1}$ may be attributed to the dependence of spherical aberration on eye-accommodation distances. The nonlinear fittings of the luminance ratio functions were plotted as red dashed curves in FIG. 19 with a correlation coefficient of 0.985 to the simulated black curves. The depth-weighted fusing function $w_i$, as defined in Eq. (9), for each focal plane of an N-focal plane DFD display was then obtained.

TABLE 4

Parameters of Eq. (15) for a 6-focal plane DFD display.

| I | 1 | 2 | 3 | 4 | 5 |
|---|---|---|---|---|---|
| $z_{i,\ i+1}$ (diopters) | 2.7 | 2.1 | 1.5 | 0.9 | 0.3 |
| $z'_{i,\ i+1}$ (diopters) | 2.7134 | 2.1082 | 1.5034 | 0.8959 | 0.2758 |
| $\Delta z'$ (diopters) | 0.0347 | 0.0318 | 0.0366 | 0.0408 | 0.0534 |

FIGS. 20(a)-20(d) show the simulated retinal images of a 3-D scene through a 6-focal plane DFD display with depth-weighted nonlinear fusing functions given in Eq. (11), as well as with the box and linear filters shown in FIG. 19. The six focal planes were placed at 3, 2.4, 1.8, 1.2, 0.6, and 0 D, respectively, and the accommodation of the observer's eye was assumed at 0.5 D. The 3-D scene consisted of a planar object extending from 3 D to 0.5 D at a slanted angle relative to the z-axis (depth-axis) and a green grid as ground plane spanning the same depth range. The planar object was textured with a sinusoidal grating subtending a spatial frequency of 1.5~9 cpd from its left (front) to right (back) ends. The entire scene subtended a FOV of 14.2×10.7 degrees. The simulation of the DFD images required five steps. We first rendered a regular 2-D perspective image of a 3-D scene using computer-graphics-rendering techniques. A 2-D depth map (FIG. 20(*a*)) in the same size as that of the 2-D perspective image is then generated by retrieving the depth (z) of each rendered pixel from the z-buffer in OpenGL shaders. Next, a set of six depth-weighted maps was generated, one for each of the focal planes, by applying the depth-weighted filtering functions in Eq. (11) to the 2-D depth map. In the fourth step, we rendered six focal-plane images by individually applying each of the depth-weighted maps to the 2-D perspective image rendered in the first step through an alpha-blending technique. Finally, the six focal-plane images were convolved with the corresponding PSFs of the eye determined by the specific accommodation distance (z=0.5 D) and the focal-plane distances. The resulting retinal images were then obtained by summing up the convolved images. FIGS. 20(*b*), 20(*c*), and 20(*d*) show the simulated retinal images of the DFD display by employing a box, linear, and non-linear depth-weighted fusing function, respectively. As expected, the 3-D scene rendered by the box filter (FIG. 20(*b*)) indicated a strong depth-discontinuity effect around the midpoint of two adjacent focal planes, while those rendered by linear and non-linear filters showed smoothly rendered depths. Whereas the non-linear filters were expected to yield higher image contrast in general than the linear filters, the contrast differences were barely visible by only comparing FIGS. 20(*c*) and 20(*d*), partially due to the low spatial frequency of the grating target.

To quantitatively evaluate the retinal-image quality differences between the linear and nonlinear fusing functions, we further evaluated the MTFs of the retinal images simulated with the method described above. A display operating in the dual-focal-plane mode, with $z_1$=1.8 D and $z_2$=1.2 D, was assumed in the simulation without loss of generality. The eye-accommodation distance z was varied from $z_1$ to $z_2$ at an interval of 0.1 D. For each eye-accommodation distance, FIGS. 21(*a*)-21(*g*) are plots of the respective MTFs of the retinal images simulated with the linear (green circle) and nonlinear (red square) depth-weighted fusing functions. As shown in FIGS. 21(*a*), 21(*d*), and 21(*g*), when the accommodation distance was at $z_1$, $z_2$, or $z_{12}$, the MTFs of using the linear depth filter were nearly identical to that of using the non-linear filters. Meanwhile, at all other accommodation distances, the MTFs of using the nonlinear filter were consistently better than when using the linear filter, as indicated by FIGS. 21(*b*), 21(*c*), 21(*e*), and 21(*f*). Whereas conventional thinking would have included the assumption that the worst image quality occurs at the dioptric midpoint by employing a linear depth filter, our quantitative analysis showed this assumption is not supported by a linear filter, while it appears to be true for the nonlinear filter. For instance, the green-colored MTF in FIG. 21(*b*) (as z=1.7 D) is even worse than that in FIG. 21(*d*) (as z=$z_{12}$=1.5 D).

In summary, the non-linear depth-weighted fusing functions shown in FIG. 19 can produce better retinal image quality compared to a linear filter. Consequently, a display incorporating these functions may better approximate the real 3-D viewing condition and further improve the accuracy of depth perception.

In this embodiment we presented an exemplary systematic method to address two issues in configuring a display for operation in the multi-focal-plane mode: (1) the appropriate dioptric spacing between adjacent focal planes; and (2) the depth-weighted fusing function to render a continuous 3-D volume. By taking account of both ocular and display factors, we determined the optimal spacing between two adjacent focal planes to be ~0.6 D to ensure the MTF of a fused pixel at the dioptric midpoint is comparable to the DOF effect of the HVS on the MTF of a real pixel at the same distance under photopic viewing conditions. We further characterized the optimal form of a set of depth-weighted fusing functions as a function of rendered accommodation cues. Based on simulation results, the non-linear form of depth filters appears to be better than a box filter in terms of improved depth continuity, and better than a linear filter in terms of retinal image contrast modulation. Although our evaluation did not take into account certain other ocular factors such as scattering on the retina and psychophysical factors such as the neuron response, it provides a systematic framework that can objectively predict the optical quality and guide efforts to configure DFD displays for operation in the multi-focal-plane mode.

Subjective Evaluations

To better understand how depth perception is affected by the displays disclosed herein, and how the human visual system responds to the addressable focal planes in the display, we performed two user studies. One was a depth judgment experiment, in which we explored the perceived depth of the displayed virtual object with respect to the variable accommodation cues rendered by the display. The other was an accommodative response measurement, in which we quantitatively measured the accommodative response of a user to a virtual object being presented at different depths. Both experiments were carried out using a display operating in the variable-single-focal-plane mode, configured as a monocular bench prototype.

The major purpose of the depth judgment experiment was to determine the relationship of the perceived depths of virtual objects versus the accommodation cues rendered by the active optical element. A depth-judgment task was devised to evaluate depth perceptions in the display in two viewing conditions. In Case A, a subject was asked to estimate subjectively the depth of a virtual stimulus without seeing any real target references. In Case B, a subject was asked to position a real reference target at the same perceived depth as the displayed virtual object.

Figure 22:
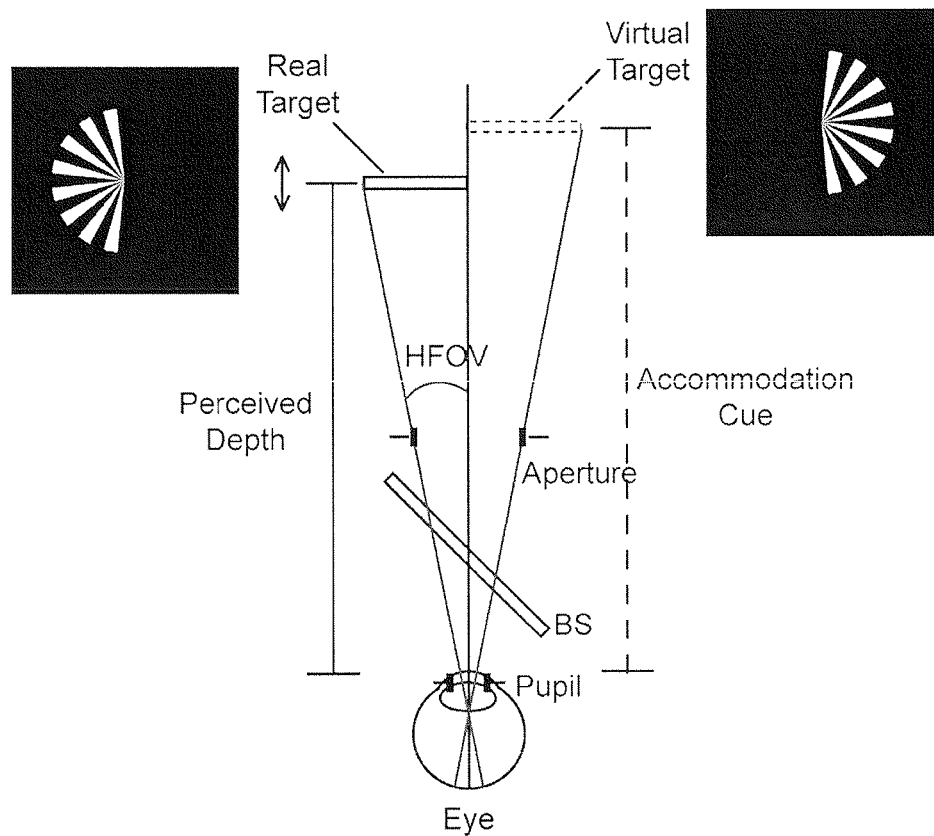
FIG. 22 is a schematic diagram of the experimental setup used in the depth-judgment subjective evaluations.

FIG. 22 illustrates the schematic setup of the experiment. The total FOV of the display is divided into left and right halves, each of which subtending about an 8-degree FOV horizontally. The left region was either blocked by a black card (Case A) or displayed a real target (Case B), while the right region displayed a virtual object as a visual stimulus. To minimize the influence of perspective depth cues on the depth judgment, a resolution target similar to the Siemens star in the ISO 15775 chart was employed for both the real and virtual targets, shown as the left and right insets of FIG. 22. An aperture was placed in front of the beam-splitter, limiting the overall horizontal visual field to about 16 degrees to the subject's eye. Therefore, if the real target was sufficiently large so that the subject could not see the edge of the real target through the aperture, the subtended angle of each white/black sector remained constant and the real target appeared unchanged to the viewer, in spite of the varying distance of the target along the visual axis. On the other hand, since the liquid lens is the limiting stop of the optics, the chief rays of the virtual display did not change as the lens changed its optical power. Throughout the depth-judgment task, the display optics, together with the subject, were enclosed in a black box. The subject positioned his or her head on a chin rest and only viewed the targets with one eye (dominant eye with normal or corrected vision) through the limiting aperture. Therefore, perspective depth cues were minimized for both the real and the virtual targets as they moved along the visual axis. The white arms in the real and virtual targets together divided the $2\pi$ angular space into 16 evenly spaced triangular sectors. Consequently, from the center of the visual field to the edge, the spatial frequency in the azimuthal direction dropped from infinity to about 1 cycle/degree. Gazing around the center of the visual field was expected to give the most accurate judgment on perceived depths.

On an optical bench, the real target was mounted on a rail to allow movement along the visual axis of the display. To avoid the accommodative dependence on the luminance, multiple light sources were employed to create a uniform illumination on the real target throughout the viewing space. The rail was about 1.5 meters long, but due to the mechanical mounts, the real target could be as close as about 15 cm to the viewer's eye, specifying the measurement range of perceived depths from 0.66 diopters to about 7 diopters. The accommodation distance of the virtual target was controlled by applying five different voltages to the liquid lens, 49, 46.8, 44.5, 42.3, and 40 $V_{rms}$, which corresponded to rendered depths at 1, 2, 3, 4 and 5 diopters, respectively.

Ten subjects, 8 males and 2 females, participated in the depth judgment experiments. The average age of all subjects was 28.6. Six subjects had previous experiences with stereoscopic displays, while the other four were from unrelated fields. All subjects had either normal or corrected vision.

The depth-judgment task started with a 10-minute training session, followed by 25 consecutive trials. The tasks were to subjectively (Case A) and objectively (Case B) determine the depth of a virtual target displayed at one of the five depths among 1, 2, 3, 4, and 5 diopters. Each of the five depths was repeated in five trials. In each trial, the subject was first asked to close his/her eyes. The virtual stimulus was then displayed and the real target was placed randomly along the optical rail. The experimenter blocked the real target with a black board and instructed the subject to open his/her eyes. The subject was then asked to subjectively estimate the perceived depth of the virtual target and rate its depth as Far, Middle, or Near, accordingly. (Case A). The blocker of the real target was then removed. Following the subject's instruction, the experimenter moved the real target along the optical rail in directions in which the real target appeared to approach the depth of the virtual target. The subject made a fine depth judgment by repeatedly moving the real target backward and forward from the initial judged position until he/she determined that the virtual and real targets appeared to collocate at the same depth. The position of the real target was then recorded as the objective measurement of the perceived depth of the virtual display in Case B. Considering that all the depth cues except the accommodation cue were minimized in the subjective experiment (Case A), we expected that the depth-estimation accuracy would be low. Therefore, the subjective depth estimations for stimuli at 2 and 4 diopters were disregarded to avoid low-confidence, random guessing. Only virtual targets at 1, 3, and 5 diopters were considered as valid stimuli, corresponding to Far, Middle, and Near depths, respectively.

To counter potential learning effects, the order of first five trials, with depths of 1 D, 2 D, 3 D, 4 D, and 5 D, respectively, were counter-balanced among the ten subjects using a double Latin Square design. The remaining twenty trials for each subject were then generated by random orders. An additional requirement was that two consecutive trials have different rendered depths. Overall, 10×25 trials were performed with 150 valid data points being collected for the subjective experiment and 250 data points for the objective experiment.

After completing all the trials, each subject was asked to fill out a questionnaire, asking how well he/she could perceive depth without (Case A) or with (Case B) seeing the real reference target. The subject was given three choices, ranking his/her sense of depth as Strong, Medium, or Weak in both Cases A and B.

Figure 23:
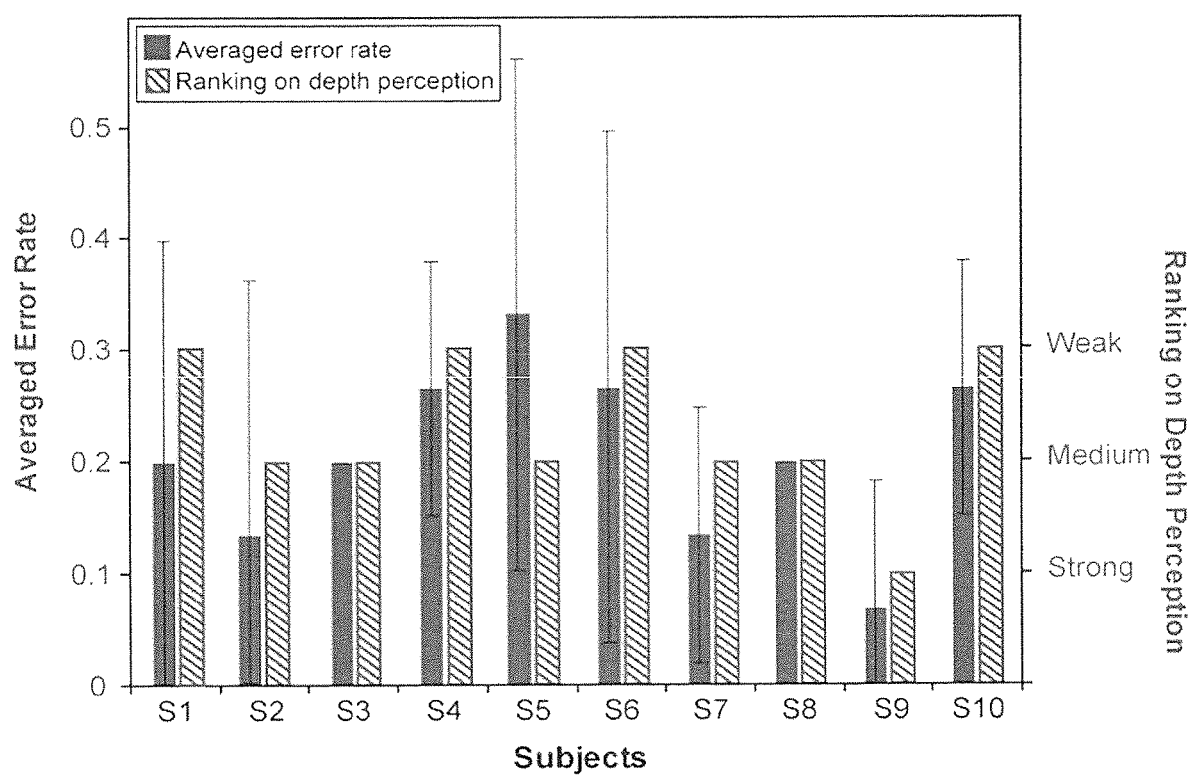
FIG. 23 is a bar graph of average error rate and subjective ranking on depth perception by all subjects under the viewing condition without presenting real reference targets (case A), as described in the subjective evaluations.
Figure 25:
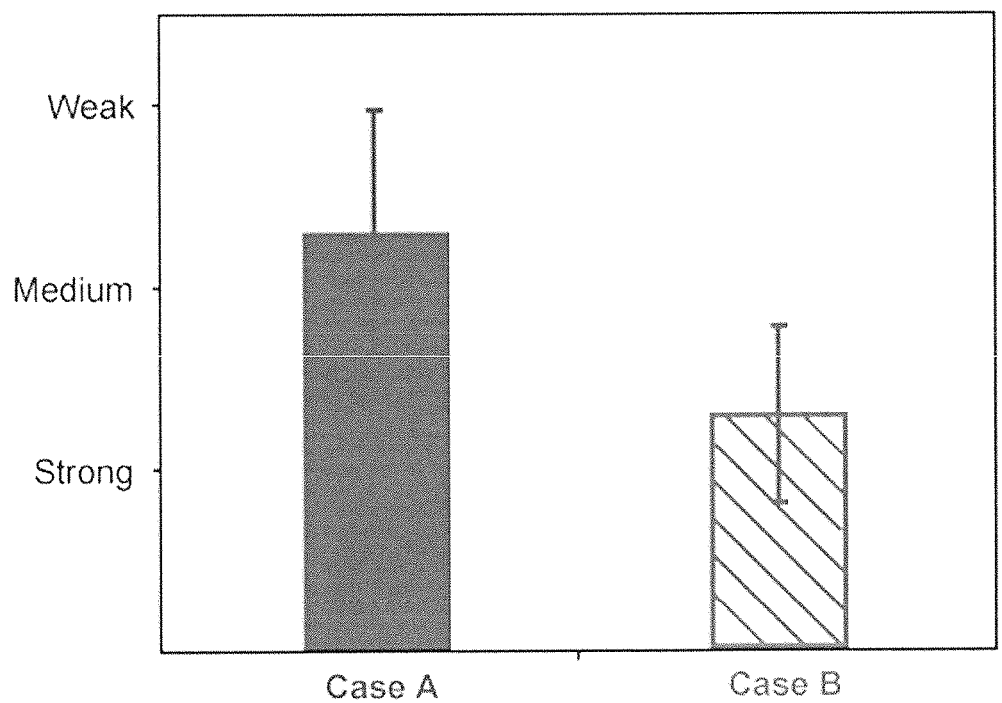
FIG. 25 is a plot of averaged rankings on depth perception when the real target reference was not presented (solid bar) and when the real target reference was presented (hatched bar), as described in the subjective evaluations.

We firstly analyzed the data of the subjective assessments of the perceived depth in the viewing condition without the real target references (Case A). For each subject, we counted the number of correct and incorrect depth estimations among the 15 trials to compute the error rate. For example, when the virtual target was presented at 5 diopters, the correct count would increase by 1 only if the subject estimated the perceived depth as Near; otherwise (either Middle or Far) the error count would increase by 1. Similar counting methods were applied to stimuli displayed at 3 diopters and at 1 diopter. The average error rate for each subject was quantified by the overall error count divided by 15. FIG. 23 is a plot of the error rate (blue solid bars with deviations) for each of the subjects. The error rates among ten subjects varied between 0.07 and 0.33, with an average value of 0.207 and a standard deviation of 0.08. This corresponded to about one error per every five estimates, on average. The standard deviation of the error rate, however, varied significantly among the subjects, ranging from 0 (S3 and S8) to 0.23 (S2, S5, and S6). In the same figure, we also plotted the subjective ranking (red textured bars) on the sense of depth in Case A, obtained from the questionnaire responses. Interestingly, although the subjects were unaware of their performances on the depth estimation through the experiment, in the end, some of the subjects ranked the difficulty level on depth estimation in agreement with their average error rates. For instance, in FIG. 23, subjects S4, S6, and S10 corresponded to relatively higher error rates of 0.27, 0.27, and 0.27, respectively, than other subjects, and they also gave lower ranking on depth perceptions (Weak, Weak, and Weak, respectively); Subject S9 had the lowest error rate of 0.07 and his rank on the perception of depth was Strong. Subjects S1 and S5, however, had somewhat conflicting perception rankings against their error rates. The average ranking among the ten subjects for depth estimation without real references was within the Weak to Medium range, as will be shown later (FIG. 25). Overall, based on a pool of ten subjects and due to the large standard deviation of the error rates in FIG. 23, the ranking on depth perception correlated at least to some extent with the error rate of the subjective depth estimations. The mean error rate for completing fifteen trials was 0.207 among ten subjects, corresponding to about one error on depth estimation within five trials on average. This indicated that the subjects could perceive the rendered depth to some extent of accuracy under the monocular viewing condition where all the depth cues except the accommodation cues were minimized.

Figure 24:
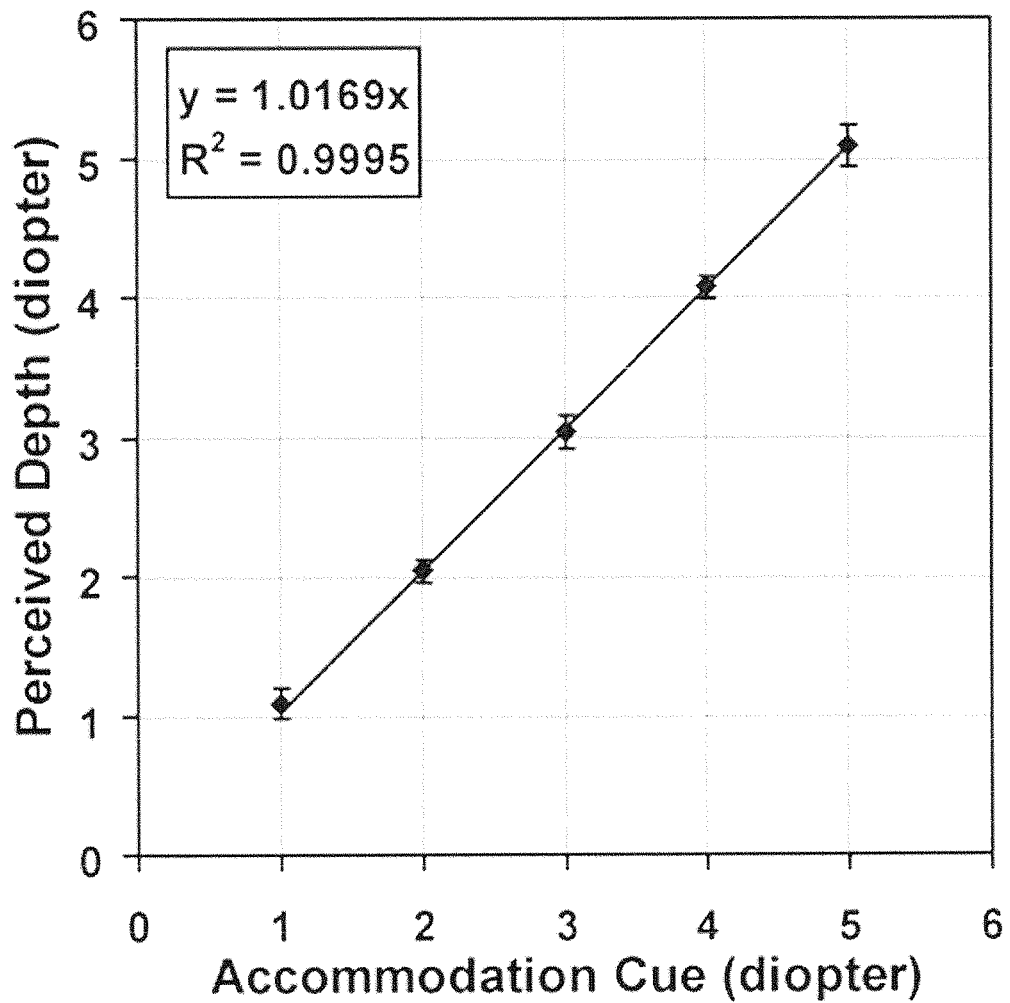
FIG. 24 is a plot of mean perceived depths among ten subjects as a function of accommodation cues rendered by the display operating in the variable-single-focal-plane mode, as described in the subjective evaluations.

The objective measurement results of the perceived depth were then analyzed. For each subject, the perceived depth at each rendered depth, such as 5, 4, 3, 2 and 1 diopter, was computed by averaging the measurements of the five repeating virtual stimuli among the 25 trials. Then, the results from ten subjects were averaged to compute the mean perceived depth among ten subjects. FIG. 24 is a plot of the averaged perceived depths versus the rendered accommodation cues of the display. The black diamonds indicate the mean value of the perceived depth at each of the accommodation cues. A linear relationship was found, by linearly fitting the five data points, with a slope of 1.0169 and a correlation factor ($R^2$) of 0.9995, as shown in the blue line in FIG. 24. The results suggest, with the presence of an appropriate real target reference, that the perceived depth varied linearly with the rendered depth, creating a viewing condition similar to the real world. The depth perception was accurate, with an average standard deviation of about 0.1 diopters among the ten subjects. For a single subject, however, the standard deviation was a bit larger, around 0.2 diopters, which agreed with the DOF of the human visual system of 0.25~0.3 diopters. The much lower standard deviation in Case B may be explained by the presence of the real reference target, which added an extra focus cue (i.e., blurring) and helped subjects to judge finely the depth of the rendered display. Compared to Case A without presenting real references, subjects appeared to perceive depth better using the display in an augmented viewing configuration.

Finally, we compared the subjective ranking data on depth perception in two cases: without (Case A) and with (Case B) a real target reference. To analyze the ranking data from different users, we assigned values of 1, 2, and 3 to the rankings of Strong, Medium, and Weak, respectively. Thus, the average ranking and the standard deviation for each viewing condition could be computed for ten subjects. The results are plotted in FIG. 25. Indicated by a blue solid bar with an average ranking of 2.3 and with a standard deviation of 0.67, the impression on depths was within the Weak to Medium range in Case A. However, as indicated by a textured red bar with an average ranking of 1.3 and with a standard deviation of 0.48, the impression on depths is within the Medium to Strong range in Case B.

Despite the fact that only the focus cues were primarily relied upon for the depth-judgment tasks, the results indicated that, under the monocular viewing condition without presenting perspective and binocular depth cues, the perceived depth in Case A matched with the rendered accommodation cue with good accuracy, and in Case B matched well with the rendered accommodation cues. In contrast to the usability studies on traditional stereoscopic displays that have suggested distorted and compressed perceived depths by rendering conflicting binocular disparity and focus cues, the user studies reported herein suggest that depth perception is improved by appropriately rendering accommodation cues in this display with addressable focal planes. The depth-judgment task described above proved the potential that this optical see-through display with addressable focus cues can be applied for mixed and augmented reality applications, approximating the viewing condition in the real world.

The major purpose of the accommodative response measurements was to quantify accommodative response of the human visual system to the depth cues presented through the subject display. In this experiment, the accommodative responses of the eye were measured by a near-infrared (NIR) auto-refractor (RM-8000B, Topcon). The auto-refractor has a measurement range of the refractive power from −20 to 20 diopters, a measurement speed of about 2 sec and an RMS measurement error of 0.33 diopters. The eye relief of the auto-refractor is about 50 mm. In the objective measurement, the auto-refractor was placed right in front of the beam-splitter, so that the exit pupil of the auto-refractor coincided with that of the display. Throughout the data-acquisition procedure, the ambient lights were turned off to prevent their influences on accommodation responses.

Figure 26:
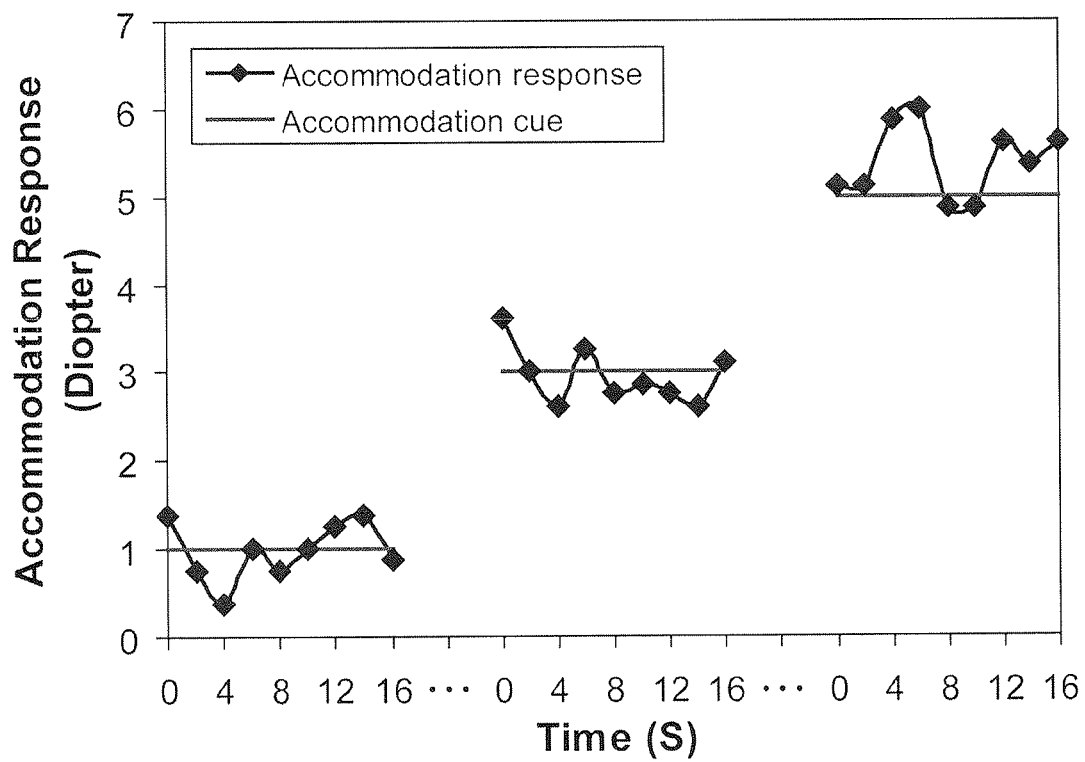
FIG. 26 is a plot of objective measurements of the accommodative responses to the accommodation cues presented by the see-through display, as described in the subjective evaluations.

During the test, a subject with normal vision was asked to focus on the virtual display, which was presented at 1 diopter, 3 diopters, and 5 diopters, respectively, in a three-trial test. At each trial, after the subject set his or her focus on the virtual display, the accommodative response of the subject's eye was recorded at every 2 sec for up to nine measurement points. The results for one subject are plotted in FIG. 26 for the three trials corresponding to three focal distances of the virtual display. The data points are shown as three sets of blue diamonds. The red solid lines in FIG. 26 correspond to the accommodation cues rendered by the liquid lens. Although the measured accommodative response of the user fluctuated with time, the average value of the nine measurements in each trial was 0.97 diopters, 2.95 diopters, and 5.38 diopters, with standard deviations of 0.33 diopters, 0.33 diopters, and 0.42 diopters, respectively. The averages of the accommodative responses of the user matched with the accommodation cue stimuli presented by the display.

Whereas the invention has been described in connection with various representative embodiments, it will be understood that it is not limited to those embodiments. On the contrary, it is intended to cover all alternatives, modifications, and equal limits as may be included within the spirit and scope of the invention as defined by the appended claims.

What is claimed is:

1. A method for displaying, to a person via a see-through display, an image of a virtual 3-D scene containing objects located at differing 3-D depths within the scene, comprising:
   providing a 2-D display physically extending in two directions away from an optical axis of the see-through display;
   providing an active-optical element at a location to receive a light pattern emitted by the 2-D display, the active-optical element having an addressable and variable optical power;
   switching the optical power of the active-optical element to provide multiple respective focal planes at respective focal distances corresponding to the differing 3-D depths within the virtual 3-D scene, such that the focal distance of the light pattern produced by the 2-D display is modulated in a time-sequential manner;
   creating a plurality of perspective views of the virtual 3-D scene, each perspective view containing respective virtual objects at distances associated with respective accommodation cues being provided by the 2-D display; and
   synchronously with switching of the focal planes, updating the light pattern on the 2-D display to render a selected one of the plurality of perspective views matched to the respective accommodation cues being provided by the 2-D display, wherein a switching rate of the focal planes is sufficiently fast to avoid flicker.

2. The method according to claim 1, wherein the active-optical element is switched to change the optical power to produce a corresponding change in perceived distance at which an intermediate image is formed.

3. The method according to claim 2, wherein the intermediate image is added to a real-world scene observable through the see-through display.

4. The method according to claim 2, wherein a distance at which the intermediate image is formed can serve as an accommodation cue for the person with respect to the intermediate image.

5. The method according to claim 2, wherein the step of switching the optical power includes correspondingly moving the intermediate image along an optical pathway relative to the focal plane to produce a corresponding change in distance of the image relative to the person's eye.

6. The method according to claim 1, wherein, in synchrony with a signal driving the active-optical element, far and near virtual objects are rendered on two or more separate image frames and displayed sequentially.

7. The method according to claim 1, wherein the switching rate, $f_N$, is given by $$f_N = \frac{f_{min}}{N},$$

where N is the total number of focal planes and $f_{min}$ is a lowest response speed (in Hz) among the 2-D display, the active-optical element, and electronics driving the 2-D display and active-optical element.

8. The method according to claim 1, wherein the 2-D display comprises a 2-D array of light-producing pixels.

9. The method according to claim 1, wherein the step of switching the optical power includes controlling dioptric spacing between adjacent focal planes and an overall range of accommodation cues.

10. A see-through display for placement in an optical pathway extending from an entrance pupil of a person's eye to a real-world scene beyond the eye for displaying to the person via the see-through display, an image of a virtual 3-D scene containing objects located at differing 3-D depths within the virtual 3-D scene, the display comprising:
a 2-D display physically extending in two directions away from an optical axis of the see-through display, the 2-D display addressable to produce at least two light patterns corresponding to respective virtual objects;
an active-optical element disposed at a location to receive the at least two light patterns emitted by the 2-D display, the active-optical element having an addressable and variable optical power;
a controller in communication with the 2-D display and the active-optical element, and configured to switch the optical power of the active-optical element to provide multiple respective focal planes at respective focal distances corresponding to the differing 3-D depths within the virtual 3-D scene, such that the focal distances of the at least two light patterns produced by the 2-D display is modulated in a time-sequential manner, the controller also configured to create a plurality of perspective views of the virtual 3-D scene, each perspective view containing respective virtual objects at distances associated with respective accommodation cues being provided by the 2-D display and configured to update the at least two patterns on the 2-D display, synchronously with switching of the focal planes, to render a selected one of the plurality of perspective views matched to the respective accommodation cues being provided by the 2-D display.

11. The see-through display of claim 10, wherein the 2-D display comprises a 2-D array of light-producing pixels.

12. The see-through display of claim 10, comprising a spherical mirror disposed on the optical axis in optical communication with the active-optical element and at a location such that the active-optical element is disposed between the spherical mirror and the 2-D display.

13. The see-through display of claim 12, wherein the active-optical element is offset along the optical axis from the center of a radius of curvature of the spherical mirror.

14. The see-through display of claim 13, wherein the active-optical element is offset by $\Delta$, and an exit pupil of the 2-D display is magnified by an amount $m_p$, $$m_p = \frac{R}{R + 2\Delta}.$$

15. The see-through display of claim 10, wherein the active-optical element comprises a refractive active-optical element.

16. The see-through display of claim 15, wherein the refractive active-optical element comprises a liquid lens.

* * * * *